(12) United States Patent
Zhang et al.

(10) Patent No.: US 12,400,302 B2
(45) Date of Patent: Aug. 26, 2025

(54) IMAGE PROCESSING METHOD, IMAGE PROCESSING APPARATUS, ELECTRONIC DEVICE AND COMPUTER-READABLE STORAGE MEDIUM

(71) Applicant: SAMSUNG ELECTRONICS CO., LTD., Suwon-si (KR)

(72) Inventors: Dafeng Zhang, Beijing (CN); Yanjun Gao, Beijing (CN); Bin Dai, Beijing (CN); Zhezhu Jin, Beijing (CN); Wei Wen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 402 days.

(21) Appl. No.: 17/582,211

(22) Filed: Jan. 24, 2022

(65) Prior Publication Data

US 2022/0230282 A1    Jul. 21, 2022

Related U.S. Application Data

(63) Continuation of application No. PCT/KR2022/000550, filed on Jan. 12, 2022.

(30) Foreign Application Priority Data

Jan. 12, 2021 (CN) .......................... 202110036289.2
Mar. 12, 2021 (CN) .......................... 202110272336.3
Jul. 30, 2021 (CN) .......................... 202110875207.3

(51) Int. Cl.
*G06T 5/75* (2024.01)
*G06T 5/70* (2024.01)
*G06V 10/764* (2022.01)
*G06V 10/80* (2022.01)
*G06V 10/82* (2022.01)

(52) U.S. Cl.
CPC .................. *G06T 5/75* (2024.01); *G06T 5/70* (2024.01); *G06V 10/764* (2022.01);
(Continued)

(58) Field of Classification Search
CPC ...................... G06N 3/045; G06N 3/08; G06T 2207/20084; G06T 2207/30168;
(Continued)

(56) References Cited

U.S. PATENT DOCUMENTS

| 10,593,021 | B1 | 3/2020 | Shen et al. |
| 10,776,671 | B2 * | 9/2020 | Lin .......................... G06N 3/084 |
| 2020/0090322 | A1 * | 3/2020 | Seo .......................... G06N 3/084 |

FOREIGN PATENT DOCUMENTS

| CN | 108898557 A | 11/2018 |
| CN | 109146820 A | 1/2019 |

(Continued)

OTHER PUBLICATIONS

Abuolaim et al: "Defocus Deblurring Using Dual-Pixel Data", 2020, (Year: 2020).*

(Continued)

*Primary Examiner* — Ruiping Li
(74) *Attorney, Agent, or Firm* — Sughrue Mion, PLLC

(57) ABSTRACT

An image processing method, an image processing apparatus, an electronic device, and a computer-readable storage medium, relating to the technical field of image processing are provided. The image processing method may include performing blur classification on pixels of an image to obtain a classification mask image; and determining a blurred area of the image based on the classification mask image.

16 Claims, 46 Drawing Sheets

(52) U.S. Cl.
CPC .......... *G06V 10/806* (2022.01); *G06V 10/809* (2022.01); *G06V 10/82* (2022.01)

(58) Field of Classification Search
CPC .......... G06T 5/70; G06T 5/75; G06T 7/0002; G06V 10/764; G06V 10/806; G06V 10/809; G06V 10/82; G06V 10/993
See application file for complete search history.

(56) References Cited

FOREIGN PATENT DOCUMENTS

| | | |
|---|---|---|
| CN | 111105379 A | 5/2020 |
| CN | 112215780 A | 1/2021 |
| CN | 113034392 A | 6/2021 |
| KR | 10-2016-0069804 A | 6/2016 |

OTHER PUBLICATIONS

Liu et al: "Facial Expression Restoration Based on Improved Graph Convolutional Networks", 2019 (Year: 2019).*

Tang et al: "DeFusionNET: Defocus Blur Detection via Recurrently Fusing and Refining Multi-scale Deep Features", CVPR, 2019 (Year: 2019).*

Chang Tang et al., "R2MRF: Defocus Blur Detection via Recurrently Refining Multi-Scale Residual Features", The Thirty-Fourth AAAI Conference on Artificial Intelligence (AAAI-20), 2020, 8 pages total.

Abdullah Abuolaim et al., "Defocus Deblurring Using Dual-Pixel Data", arXiv:2005.00305v3, Jul. 2020, 27 pages total.

Diego Valsesia et al., "Deep Graph-Convolutional Image Denoising", arXiv:1907.08448v1, Jul. 2019, 12 pages total.

Communication dated Apr. 22, 2022, issued by the International Searching Authority in counterpart International Application No. PCT/KR2022/000550 (PCT/ISA/220, 210, 237).

Fan et al., "Image Blur Classification and Blur Usefulness Assessment," Proceedings of the IEEE International Conference on Multimedia and Expo Workshops (ICMEW) 2017, pp. 531-536, Jul. 10, 2017, Total 8 pages.

Alvarez-Gila et al., "Self-supervised Blur Detection from Synthetically Blurred Scenes," arXiv:1908.10638v1, pp. 1-13, Aug. 28, 2019, Total 15 pages.

Jin et al., "Learning to Extract a Video Sequence from a Single Motion-Blurred Image," arXiv:1804.04065v1, pp. 1-9, Apr. 11, 2018, Total 11 pages.

* cited by examiner

IMAGE PROCESSING METHOD, IMAGE PROCESSING APPARATUS, ELECTRONIC DEVICE AND COMPUTER-READABLE STORAGE MEDIUM

CROSS-REFERENCE TO RELATED APPLICATION

This is a bypass continuation application of International Patent Application No. PCT/KR2022/000550, filed on Jan. 12, 2022, which claims priority from Chinese Patent Application No. 202110036289.2 filed on Jan. 12, 2021, Chinese Patent Application No. 202110272336.3 filed on Mar. 12, 2021, and Chinese Patent Application No. 202110875207.3 filed on Jul. 30, 2021, in the China National Intellectual Property Administration, the disclosures of which are incorporated herein by reference in their entireties.

TECHNICAL FIELD

The present disclosure relates to image processing, and in particular to an image processing method, an image processing apparatus, an electronic device, and a computer-readable storage medium using one or more neural networks.

BACKGROUND

With the popularization of digital cameras and other popular imaging devices, there are more and more digital images around us. There are already tens of thousands of images in the personal electronic photo album of an ordinary user, and many of them have a variety of distortions. Blurred distortion is an important one of such distortions. Blurred image detection, as a new technical demand in recent years, may be applied to a variety of scenarios. For example, blurred images may be automatically identified in a large number of image libraries to remove low-quality images. Moreover, after blurred image detection, the user may be guided to take photos correctly or to recover images.

At present, traditional gradient algorithms and deep convolutional neural network-based classification algorithms may be used for image blur detection. This is more suitable for globally blurred images. Therefore, it is necessary to optimize the existing image blur detection methods.

SUMMARY

One or more example embodiments provide an image processing method, an image processing apparatus, an electronic device, and a computer-readable storage medium.

According to an aspect of the present disclosure, an image processing method may include: performing blur classification on pixels of an image to obtain a classification mask image; and determining a blurred area of the image based on the classification mask image.

The performing the blur classification may include: performing feature extraction on the image via a plurality of cascaded first feature extraction layers of a feature extraction neural network to obtain at least one first feature image; performing feature extraction on the at least one first feature image via a second feature extraction layer of the feature extraction neural network, based on a relationship between different pixels in the first feature image, to obtain a second feature image; and generating the classification mask image based on the second feature image.

The performing the feature extraction on the at least one first feature image may include: dividing the at least one first feature image into at least two image blocks; extracting, by a graph convolutional network, local features of each of the at least two image blocks and global features between adjacent image blocks; fusing the local features and the global features to obtain a second fused feature; and generating the second feature image based on the second fused feature.

The dividing the first feature image into the at least two image blocks may include: determining a confidence score of each of the at least two image blocks, the confidence score representing a possibility that each of the at least two image blocks is a clear block; and continuously dividing the at least two image blocks based on the confidence score being within a preset range, until the confidence score becomes outside the preset range.

Each of the at least two image blocks may include only blurred pixels or only clear pixels.

The extracting the global features may include: performing dimension reduction on each of the at least two image blocks to obtain dimension reduced image blocks; and extracting from the dimension reduced image blocks the global features between the adjacent image blocks.

The method may further include: deblurring the image to obtain a first recovery image based on a determination of the blurred area of the image; extracting clear pixels in clear areas in the image based on the classification mask image; and replacing pixels corresponding to clear areas in the first recovery image with the clear pixels to obtain a second recovery image.

The deblurring the image may include: performing feature extraction on the image to obtain a first extracted feature; and performing recovery, by at least one recovery neural network and based on the first extracted feature, to obtain the first recovery image.

The performing the recovery may include: selecting a scale from a plurality of preset scales based on an input feature of the at least one recovery neural network; based on the input feature, performing the feature extraction according to the selected scale to obtain a scale feature; and determining and outputting a recovery feature based on the scale feature.

The determining and outputting the recovery feature may include: selecting a channel from a plurality of channels based on the scale feature; and determining and outputting the recovery feature based on a channel feature corresponding to the selected channel.

The performing the recovery may include: performing dimension raising on a recovery feature output from the least one recovery neural network to obtain the first recovery image.

The method may further include: determining a similar matrix based on a similarity between pixels in the first extracted feature; determining a mask matrix based on clear pixels and blurred pixels in the classification mask image; and determining a mask feature based on the similar matrix and the mask matrix, and inputting the mask feature to a recovery neural network for recovery of the image.

A value in the mask matrix may represent a relationship between a first pixel and a second pixel in the classification mask image, and the value in the mask matrix may be 0 when the first pixel is a clear pixel and the second pixel is a blurred pixel.

The deblurring the image may include: obtaining a twin image of the image; performing feature extraction on the image and the twin image based on a twin network to obtain a first extracted feature and a second extracted feature; aligning the first extracted feature and the second extracted feature to obtain an aligned feature; and deblurring the image based on the aligned feature to obtain the first recovery image.

The aligning the first extracted feature and the second extracted feature may include: setting any one of the first extracted feature and the second extracted feature as a query feature and the other one as a key-value feature; and fusing the query feature into the key-value feature to obtain the aligned feature.

According to another aspect of the present disclosure, an image processing method may include: deblurring an image to obtain a first recovery image; extracting clear pixels in clear areas in the image; and replacing pixels corresponding to clear areas in the first recovery image with the clear pixels to obtain a second recovery image.

The deblurring the image may include: performing feature extraction on the image to obtain a first extracted feature; and performing recovery, by at least one recovery neural network and based on the first extracted feature, to obtain the first recovery image.

The performing the recovery may include: selecting a scale from a plurality of preset scales based on an input feature of the at least one recovery neural network; based on the input feature, performing the feature extraction according to the selected scale to obtain a scale feature; and determining and outputting a recovery feature based on the scale feature.

The determining and outputting the recovery feature based on the scale feature may include: selecting a channel from a plurality of channels based on the scale feature; and determining and outputting the recovery feature based on a channel feature corresponding to the selected channel.

The performing the recovery may include: performing dimension raising on a recovery feature output by the at least one recovery neural network to obtain the first recovery image.

According to another aspect of the present disclosure, an image processing apparatus may include: a memory storing one or more instructions; and at least one processor configured to execute the one or more instructions to: perform blur classification on pixels of an image to obtain a classification mask image; and determine a blurred area of the image based on the classification mask image.

According to another aspect of the present disclosure, an image processing apparatus may include: a memory storing one or more instructions; and at least one processor configured to execute the one or more instructions to: deblur an image to obtain a first recovery image; extract clear pixels in clear areas in the image; and replace pixels corresponding to clear areas in the first recovery image with the clear pixels to obtain a second recovery image.

According to another aspect of the present disclosure, a non-transitory computer-readable storage medium may store a program that is executable by at least one processor to perform an image processing method including: performing blur classification on pixels of an image to obtain a classification mask image; and determining a blurred area of the image based on the classification mask image.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
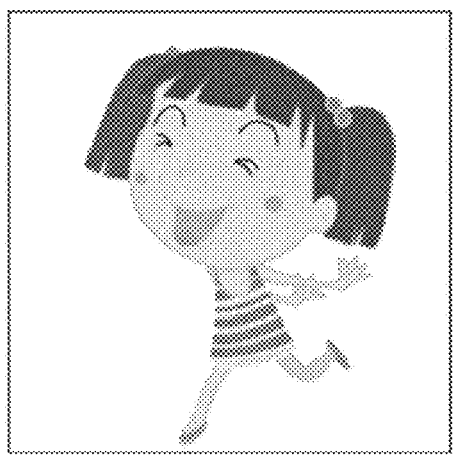
FIG. 1 is a clear image obtained according to an example embodiment of the present application.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It should be understood by those skilled in the art that, as used herein, singular forms "a", "an", "the" and "said" may include plural forms, unless otherwise specifically stated. It should also be understood that the word "include/including" used in the specification of the present application specifies the presence of the stated features, integers, steps, operations, elements and/or components, and does not exclude the presence or addition of one or more other features, integers, steps, operations, elements, components, and/or combinations thereof. It should be understood that, when a component is referred to as being "connected to" or "coupled to" another component, this element may be directly connected or coupled to the other element, or there may be intervening elements. In addition, the "connection" or "coupling" as used herein may include wireless connection or coupling. As used herein, the word "and/or" includes all or any unit and all combinations of one or more associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The blur detection algorithm is an algorithm that detects blurred areas in an image by computer technologies, image processing and analysis technologies. As one of the important ways to evaluate image quality, determining whether an image is blurred is commonly applied in photo management, image quality evaluation and other fields.

Figure 2:
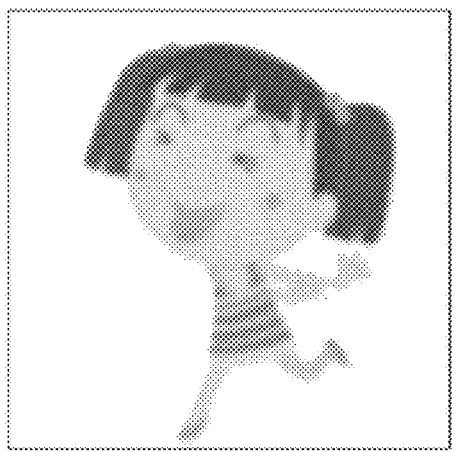
FIG. 2 is an out-of-focus blurred image in an example embodiment of the present application.
Figure 3:
FIG. 3 is a moving blurred image in an example of the present application.

When a person takes pictures with an SLR camera or a mobile phone, it is desirable to shoot high-quality clear images, as shown in FIG. 1. However, if the shot object is out of focus, the shot pictures are often blurred, which is called image out-of-focus blur, as shown in FIG. 2. Meanwhile, motion blur often occurs in the shot images due to the camera shake or the motion of the shot object, as shown in FIG. 3.

Figure 4:
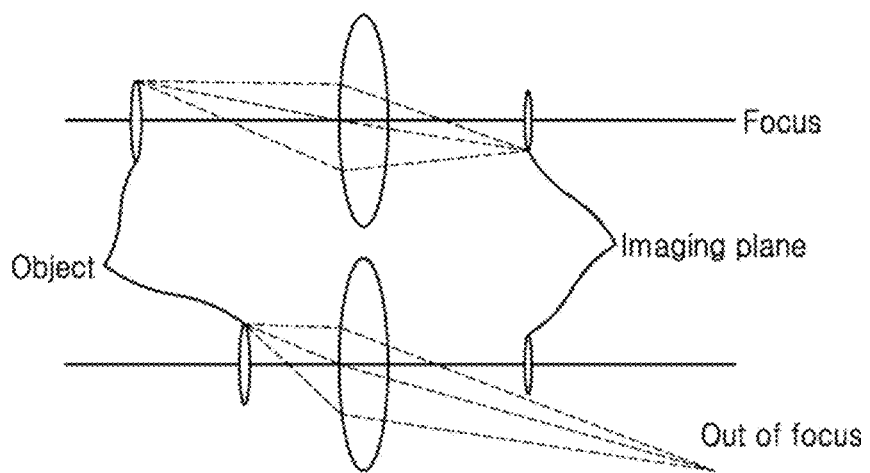
FIG. 4 is a schematic diagram of an imaging principle of the out-of-focus blurred image.

For an object in the real scene, the object is focused onto an imaging plane by a convex lens of a camera. If the object is in the focus on the focal length of the camera, clear pictures can be produced in the imaging plane. However, if the object is beyond or within the focal length, the light from the object will appear in front of or behind the focused imaging plane, so that the images generated in the imaging plane are out of focus and blurred, the imaging quality is affected, and low shooting experience is caused. As shown in FIG. 4, the upper half part shows the focused state, and the lower half part shows the out-of-focus blurred state.

The image blur detection has a wide range of applications, and is also one of the most common indicators for image quality evaluation. For example, since motion or out-of-focus blur often occurs in the shot pictures due to the camera shake or realization when a person takes pictures, and it is very time-consuming and labor-intensive to screen these blurred pictures from a large number of pictures, by automatically screening blurred pictures using the artificial intelligence technology, a lot of time will be saved and the automatic album and picture management function is realized. When a person takes pictures, if the picture in the camera is blurred, the camera will automatically inform the user whether the picture is blurred and guide the user to take pictures correctly, thereby improving the imaging quality of pictures and the shooting experience of the user. In order to shoot high-quality images, the focal length of the camera may be designed to be very large. In this case, when nearby objects are to be shot, it is very likely that the nearby objects are focused while distant objects are out of focus and blurred. Methods for recovering a blurred area of the image have been actively researched, but it is necessary to know the position of the blurred area in the image before recovery. Therefore, blur detection is the prerequisite of image recovery.

Figure 5:
FIG. 5 is a partial out-of-focus blurred image in an example embodiment of the present application.
Figure 6:
FIG. 6 is a blur detection result of the image of FIG. 5.
Figure 7:
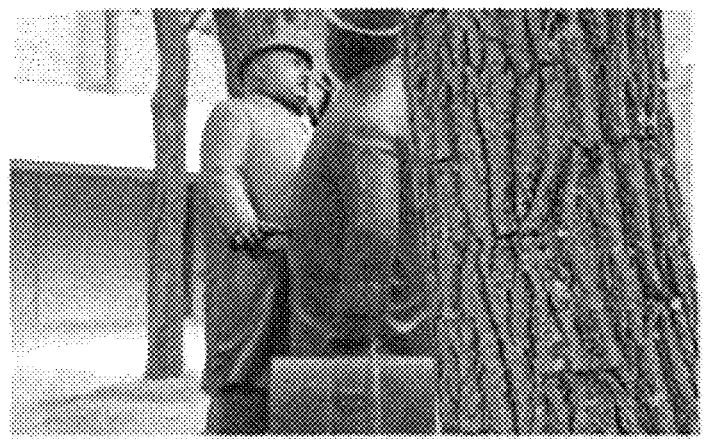
FIG. 7 is the image of FIG. 5 after deblurring.

As shown in FIG. 5, the trunk is on the local length of the camera, the shot trunk is very clear. However, since the characters and building behind are not on the local length of the camera, they are out of focus and blurred. In order to make the blurred area in the image clear, it is necessary to determine the position of the blurred area in the image. FIG. 6 shows the result of blur detection of FIG. 5, where the black area represents the out-of-focus blurred area in FIG. 5, and the white area represents the clear area. Finally, the result shown in FIG. 7 is obtained by a deblurring algorithm.

Figure 8:
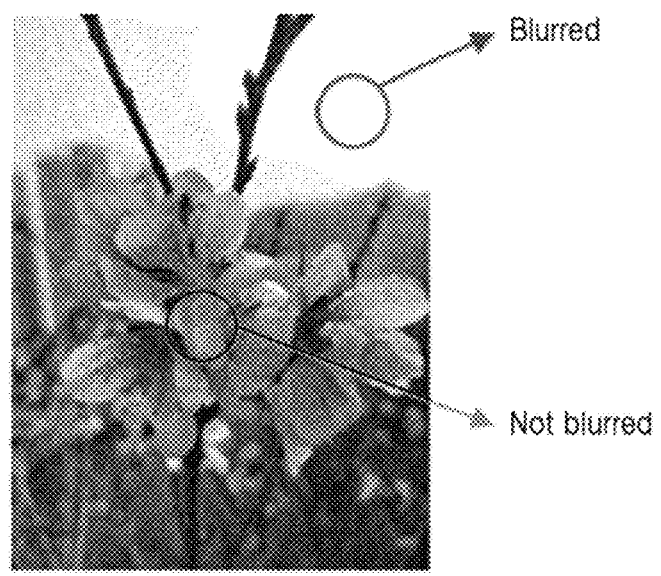
FIG. 8 is a partial blurred image in an example embodiment of the present application.

The blurred pictures greatly affect the visual experience of the viewer, so blurred pictures with low shooting quality are removed by performing blur determination on the shot pictures, so that the experience of both the photographer and the viewer is improved. The existing blur determination includes global blur determination and local blur determination. The global blur determination means determining whether the image is blurred or clear if the whole image is blurred. For example, as shown in FIGS. 2 and 3 above, FIG. 2 shows that the whole image is in an out-of-focus blurred state, and FIG. 3 shows that the whole image is in a motion blurred state. However, the images are often locally blurred in the real scene. The local blur detection means that only part of the image is blurred while the remaining part thereof is clear. As shown in FIG. 8, the main objects in the image are clear, while the background is blurred, which belongs to (local) partial blur.

The existing blur determination algorithms include gradient-based conventional algorithms, classification algorithms based on the deep convolutional neural network, and segmentation algorithms based on the deep convolutional neural network.

(1) Image Blur Detection Algorithms Based on Laplace Transformation

The image blur detection algorithms based on Laplace transformation are one kind of common conventional blur detection algorithms. The blur detection is realized based on the assumption that a clear image has clear texture while a blurred image has unobvious texture information. In other words, there is a large gradient between adjacent pixels of a clear image, while there is a particularly small gradient between two pixel values of a blurred image. The Laplace algorithm is to solve the second derivative of the image, which can emphasize an area in the image where the density changes rapidly. The texture in the clear image is relatively clear and rich, so the variance is relatively large; however, there is less boundary and texture information contained in the blurred image, so the variance is relatively small.

Figure 9:
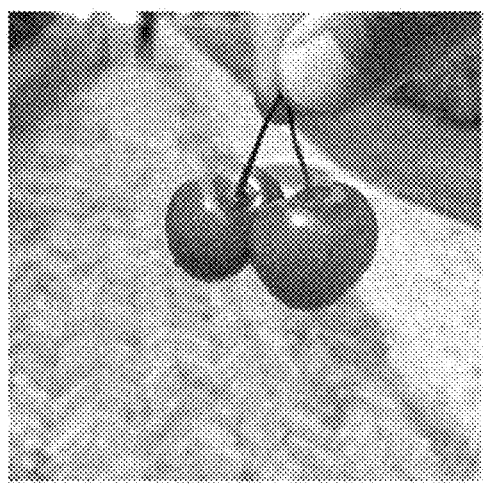
FIG. 9 is a partial blurred image in an example embodiment of the present application.

The image blur detection algorithms based on Laplace transformation have fast computing speed, but its performance is greatly affected by external factors (e.g., illumination, reflection, etc.), resulting in poor algorithm robustness and low identification rate. Meanwhile, the images containing blurred areas will be determined by mistake. As shown in FIG. 9, in the image, the foreground object is very clear, while the background is out of focus and blurred. However, in human perception, FIG. 9 is a clear image, but this image will be determined to be blurred by the image blur detection algorithm based on Laplace transformation due to the blurred area. Therefore, the algorithm has a low identification rate. Particularly for the partially blurred image, the determination result will be ambiguous.

(2) Classification Algorithms Based on Deep Convolutional Neural Network

The convolutional neural network (CNN) has achieved good effects in various fields, and has better performance than conventional algorithms. Therefore, in the existing schemes, the blurred image is determined by using the convolutional neural network. Each input image is scored in advance by using the convolutional neural network. If the score is greater than 0.5, it is considered that the image is a clear image; however, if the score is less than 0.5, it is considered that the image is a blurred image.

Figure 10:
FIG. 10 is a partial blurred image in an example embodiment of the present application.

The blur detection algorithms based on the convolutional neural network have higher robustness and higher identification accuracy than the gradient-based conventional algorithms. In FIG. 8, if the input image is globally blurred, the accuracy is high; and, for a partially blurred image, the identification rate is also high. However, for an image with few blurred areas, like FIG. 10, the identification result may be wrong.

(3) Segmentation Algorithms Based on Deep Convolutional Neural Network

On one hand, both the gradient-based conventional algorithms and the classification algorithms based on the convolutional neural network are only suitable for the globally blurred images, but often have unsatisfactory identification results for the partially blurred images. On the other hand, in the two methods, for the partially blurred images, the size of the blurred area and the position of the blurred area in the image cannot be determined. For example, in the image deblurring task, it is necessary to determine whether the image is blurred, and it is also necessary to know the position of the blurred area in the image. Then, the blurred area is deblurred to recover an image with better quality. If the whole image is processed when the position of the blurred area is unknown, an originally clear area may be degraded in quality.

Since the position of the blurred area in the image cannot be determined by the gradient-based conventional algorithms and the classification algorithms based on the deep convolutional neural network, the current operation is to convert the blur detection problem into an image segmentation problem. The image segmentation algorithms can not only determine the size of the blurred area in the image, but also determine the position of the blurred area in the image.

In the real scene, the background of the blurred image is complex and brings a great challenge to the blur detection task. Meanwhile, the scale sensitivity and the lack of boundary information of the blurred area also bring difficulties to the blur detection algorithm.

For DeFusionNET, in order to solve the above problems, a feature fusing and refining module (FFRM) is proposed to improve the accuracy of blur detection. DeFusionNET believes that the features of shallow layers contain detailed information and the features of high layers contain semantic information. Therefore, the detailed information of the blurred area can be refined by fusing the features of shallow layers into the features of high layers, and the positioning of the blurred area can be assisted by fusing the features of high layers into the features of shallow layers.

The existing technical problems or places to be improved are described below.
(1) Both the gradient-based conventional algorithms and the classification algorithms based on the convolutional neural network are only suitable for the globally blurred images, but often have unsatisfactory identification results for the partially blurred images.
(2) For the partially blurred images, the size of the blurred area and the position of the blurred area in the image cannot be determined by the gradient-based conventional algorithms and the classification algorithms based on the convolutional neural network.
(3) When there is a hole in the image, the position of the blurred area cannot be determined by DeFusionNET.

Figure 11:
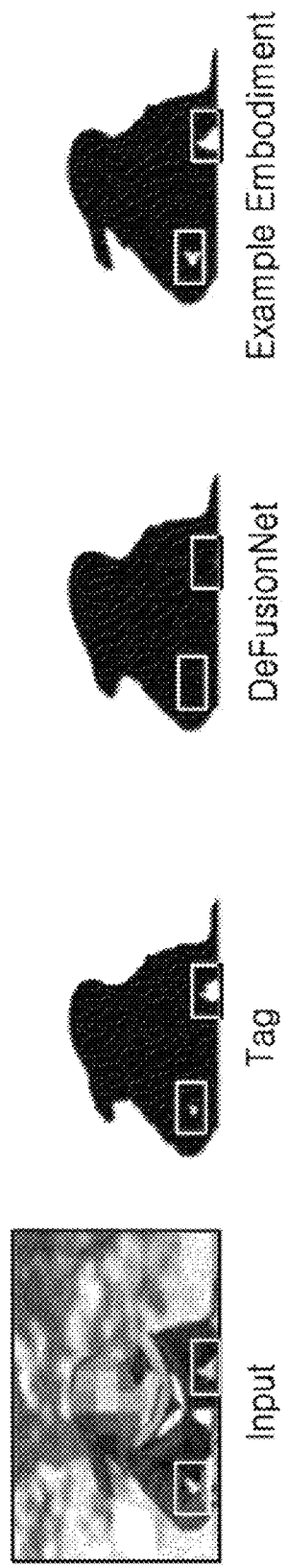
FIG. 11 is a schematic diagram showing positions where burred areas cannot be determined by the existing method.

As shown in FIG. 11, when there is a hole in the input image on the left of FIG. 11, the tag in FIG. 11 shows the true classification on whether the image is blurred, DeFusionNET cannot determine the position of the burred area, and the present application can determine the position of the blurred area.

Figure 12:
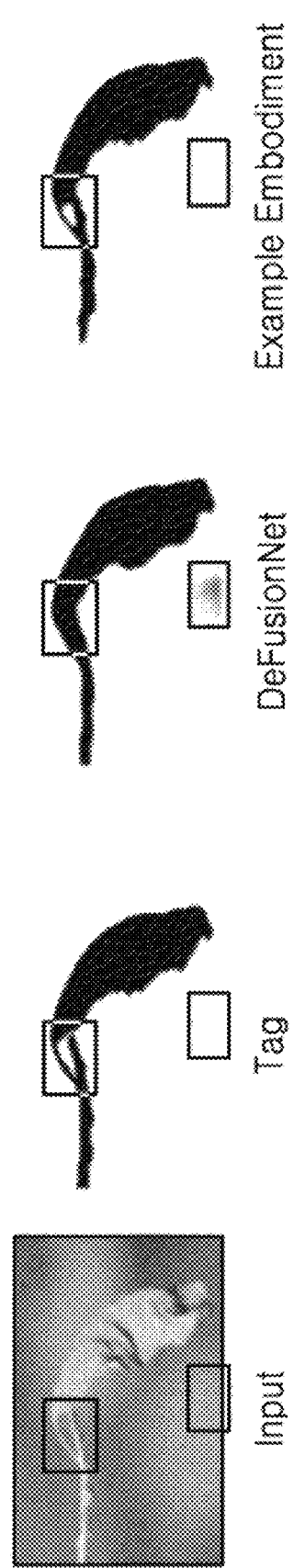
FIG. 12 is a schematic diagram showing low identification accuracy of the existing method.

As shown in FIG. 12, for the input image in FIG. 12, the tag in FIG. 12 shows the true classification on whether the image is blurred, DeFusionNET has low identification accuracy, and the present application can identify the blurred area in the image more accurately.

Figure 13:
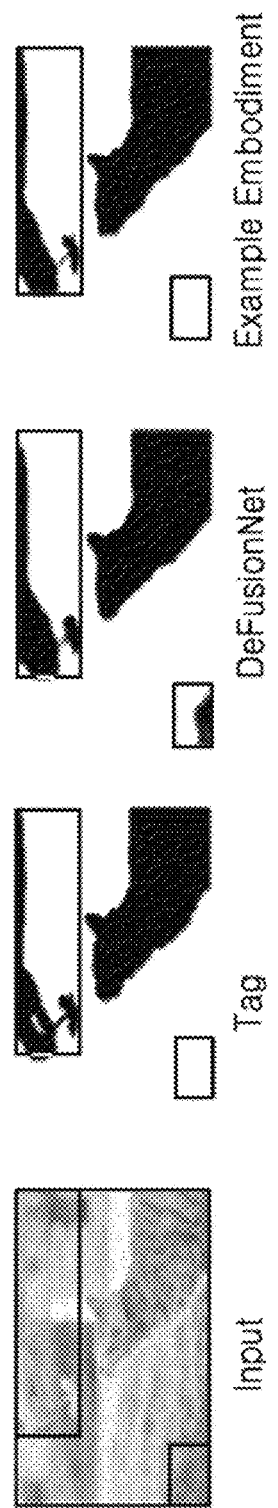
FIG. 13 is a schematic diagram showing that it is difficult to determine a blurred boundary by the existing method.

As shown in FIG. 13, for the input image in FIG. 13, the tag in FIG. 13 shows the true classification on whether the image is blurred, DeFusionNET is difficult to determine the blurred boundary, and the present application can determine the blurred boundary more accurately.

Blur detection is a very challenging task. It is necessary not only to determine whether the image is blurred, but also to detect the position and area of the blurred area in the image. Moreover, the conventional algorithms are greatly affected by the external environment, so misjudgment will often occur. Compared with the conventional algorithms, the blur detection algorithms based on the deep learning classification model have improved performances to a certain extent, but cannot determine the position of the blurred area in the image, so that the application scenarios are very limited. Although the existing blur detection algorithms based on the segmentation model solve the problems in the above schemes, the identification accuracy needs to be improved, the blurred area in the hole cannot be determined, and it is very difficult to determine the blurred boundary.

Based on the above problems, the present application provides a blur detection algorithm based on a graph convolutional network. This scheme can not only accurately determine the position and area of the blurred area in the image, but also has a higher identification rate and can segment the blurred boundary more accurately, so that the robustness and accuracy of the algorithm are improved. The core ideal of the present application will be described below: (1) a blur detection model based on graph convolution is proposed, where an implicit graph structure is established for all pixels on features of difference scales, and the respective field is expanded to a global receptive field, thereby globally determining whether the pixel area is blurred. (2) The graph convolutional network module provided by the present application is a graph convolutional network module based on an attention mechanism. In the present application, the cosine distance between pixel features is used to represent the connection weight between two pixels. In the graph convolution propagation process, the features of pixels with greater correlation with itself are more taken into consideration during feature aggregation. The above process is also an implicit clustering process, which makes the difference between features of the same category smaller and smaller and the difference between features of difference categories larger and larger, thereby improving the accuracy of blur detection. (3) The graph convolutional network provided by the present application is a method based on inductive learning, and has a high generalization ability. (4) With the increasing number of layers of the convolutional neural network and the down-sampling operation, for a deeper layer, the features have a larger receptive field, but lots of detailed information will be lost. For example, small holes will gradually disappear with down-sampling, resulting in a decrease in the accuracy of blur detection. Therefore, in the present application, the input image is not down-sampled multiple times to preserve richer detailed features. Meanwhile, in order to realize a larger receptive field, in the present application, the receptive field of the convolution kernel is expanded by dilated convolution, so that the accuracy of blur detection is improved. (5) The neural network of the present application adopts a U-shaped design having a U-Net structure. The features of the deep layers contain richer semantic features, and the features of the shallow layers contain richer detailed information. By using the U-shaped design, the information exchange and fusion between the semantic features of the high layers and the detailed features of the shallow layers is realized, and the expression ability of features is improved.

The present application provides a blur detection algorithm based on a graph convolutional network. This algorithm converts the blur detection problem into an image semantic segmentation problem. Thus, it can be accurately determined whether the image is blurred, and the area and position of the blurred area in the image can also be determined. Meanwhile, by the graph convolutional network, the feature expression of each pixel is improved, and the accuracy of blur detection is improved.

(1) A blur detection algorithm based on a graph convolutional network is provided. Compared with the existing blur detection algorithms, a higher accuracy is realized in the present application.
(2) The provided algorithm can accurately determine whether the image is blurred, and can also determine the area and position of the blurred area in the image.
(3) The scheme provided by the present application can effectively solve the detection of the blurred area in the hole in the image.
(4) Compared with the existing schemes, the scheme provided by the present application is more accurate in determining the blurred boundary.

The technical solutions of the present application and how to solve the above technical problems by the technical solutions of the present application will be described in detail below by specific embodiments. The following specific embodiments may be combined with each other, and the same or similar concepts or processes may not be repeated in some embodiments. The embodiments of the present application will be described below with reference to the drawings.

Figure 14:
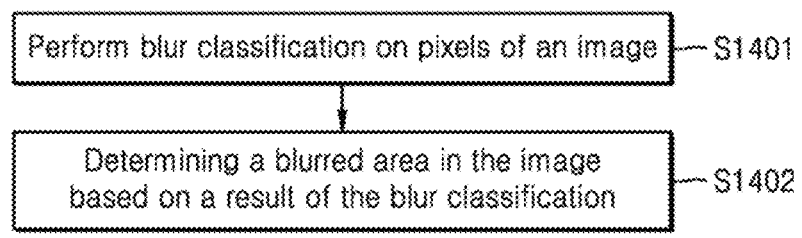
FIG. 14 is a flowchart of an image processing method according to an embodiment of the present application.

An embodiment of the present application provides a possible implementation. As shown in FIG. 14, an image processing method is provided, which may include the following steps.

S1401: Blur classification is performed on pixels of an image.

In one embodiment, blur classification may be performed on pixels of an image to obtain a classification mask image.

The image may include clear pixels and blurred pixels, and different color areas in the corresponding classification mask image represent different types of pixels to distinguish blurred pixels from clear pixels.

Figure 15:
FIG. 15 is a schematic diagram of an image to be processed in an example embodiment of the present application.
Figure 16:
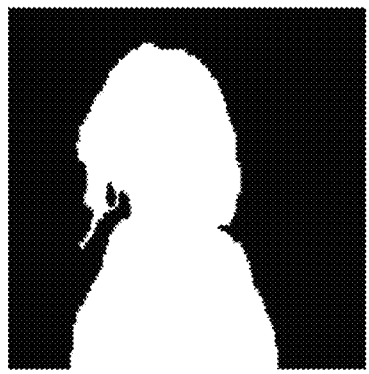
FIG. 16 is a classification mask image obtained based on FIG. 15.

The image shown in FIG. 15 is converted into the classification mask image shown in FIG. 16. The classification mask image may be a binary image composed of 0 and 1. In FIG. 16, the black part represents a blurred area, and the white part represents a clear area.

Specifically, step S1401 may include classifying the pixels of the image to be processed, and determining clear pixels and blurred pixels in the image.

In one embodiment, step S1401 may include:
(1) classifying the pixels of the image to be processed, and determining clear pixels and blurred pixels in the image; and
(2) generating a classification mask image based on the determined clear pixels and blurred pixels.

Specifically, there are many ways to classify the pixels of the image to be processed to obtain the classification mask image. Each pixel in the image may be classified to determine whether each pixel in the image to be processed is blurred. If the pixel is blurred, this pixel is converted into a preset color, for example, black; and, if the pixel is clear, this pixel is converted into another preset color, for example, white.

During a specific implementation, the image to be processed may be input into the trained neural network to obtain the classification mask image. The trained neural network may be a graph convolutional network. The graph convolutional network will be described in detail below. It is also possible to improve the structure of the graph convolutional network and then generate the classification mask image by the improved graph convolutional network. The specific process of generating the classification mask image will be described in detail below.

S1402: Determining a blurred area in the image based on a result of the blur classification.

In one embodiment, the blurred area may be determined based on a result of the blur classification.

In one embodiment, the blur detection result of the image is determined based on the classification mask image.

The blur detection result includes the image being a blurred image or a clear image.

Specifically, it is possible to count the area of the blurred area of the image according to the classification mask image, and then determine, according to the proportion of the area of the blurred area in the image, whether the image is a blurred image. For example, if the proportion is greater than a preset threshold, the image is a blurred image; and, if the proportion is less than or equal to the preset threshold, the image is a clear image. The specific process of determining the blur detection result will be described in detail below.

In the above embodiment, by classifying pixels in the image to be processed to determine the pixels in the image as clear pixels or blurred images, generating a classification mask image according to the classification result of the pixels, and determining, based on the classification mask image, whether the image is a clear image or a blurred image, the classification is realized in the pixel level, and the accuracy of the blur detection result can be improved.

In a possible implementation of the embodiment of the present application, in S1401, classifying pixels of the image to obtain a classification mask image may include:
(1) acquiring the image to be processed, and preprocessing the image to obtain a first image, the preprocessing including at least one of resizing or cropping; and
(2) performing blur classification on pixels of the first image to obtain a classification mask image.

Specifically, the image to be processed may have a large amount of data. For example, the raw image may be a 2K or 4K high-definition picture, and it will take a lot of time in the directly input neural network, so the size can be reduced first to reduce the amount of data, thereby improving the processing speed of the image. In addition, the edge area of the image may not need to participate in the blur detection process. For example, when a user takes a photo, the user often pays more attention to the center of the photo instead of the edge area of the photo. The image may be cropped first. The edge area of the image can be cropped, and the central area of the image is reserved. For example, the central position of the image can be determined first, a central area in a preset range can be determined based on the central position, and the edge area outside the central area can be cropped.

Figure 17:
FIG. 17 is a schematic diagram of an image to be processed in an example embodiment of the present application.
Figure 18:
FIG. 18 is a schematic diagram after the size of the image of FIG. 17 is adjusted.
Figure 19:
FIG. 19 is a schematic diagram after the image of FIG. 18 is cropped.

By taking FIGS. 17-19 as examples, FIG. 17 is an image to be processed, and the size of the image may be adjusted first to obtain the image shown in FIG. 18. The image shown in FIG. 18 may be cropped to obtain the first image shown in FIG. 19.

In the above embodiment, by firstly resizing or cropping the image, the processing speed of the image can be increased.

Figure 20:
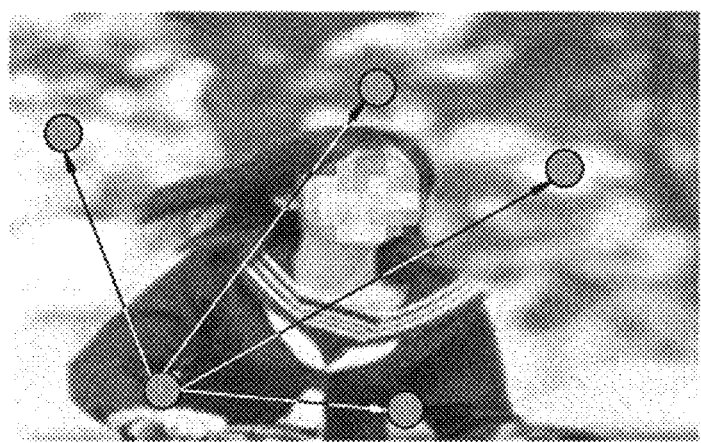
FIG. 20 is a schematic diagram of a European space construction image.

A graph convolutional network (GCN) has a very good modeling ability for data in a no-Euclidean space. The Euclidean spatial data can be regarded as a special case, and the graph convolutional network can also be used for modeling. As shown in FIG. 20, in the present application, each pixel in the image is regarded as a node of the graph. The similarity between pixel features is use as the weight of the edge, i.e., the value of the adjacent matrix of the graph.

The specific process of obtaining the classification mask image will be further described in detail below by embodiments with reference to the drawings.

Figure 21:
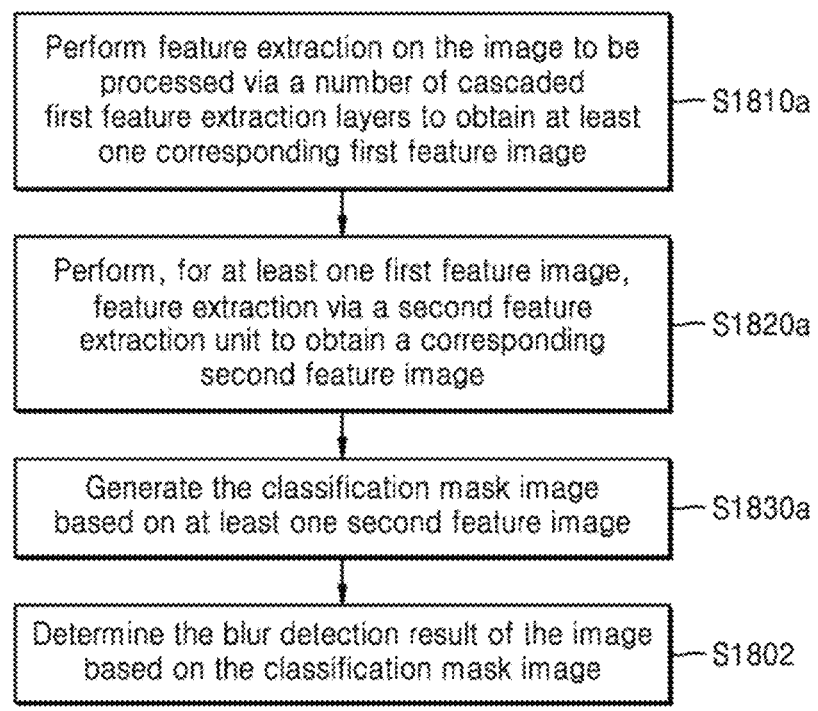
FIG. 21 is a flowchart of an image processing method according to an embodiment of the present application.

In a possible implementation of the embodiment of the present application, as shown in FIG. 21, step S1801 of performing blur classification on pixels of an image to be processed to obtain a classification mask image may include the following steps.

S1810a: Feature extraction is performed on the image to be processed via a number of cascaded first feature extraction units (e.g., first neural network layers) to obtain at least one corresponding first feature image.

The first feature extraction units are configured to perform feature extraction on the image. For example, the features may be extracted from the image by performing down-sampling or dilated convolution on the image to obtain a first feature image.

In one implementation, the first feature extraction units may be configured to dawn-sample the image to be processed to obtain at least one first feature image.

In another implementation, the at least one first feature image includes a down-sampling feature image and a convolution feature image.

Step S1810a of performing feature extraction on the image may include:
(1) down-sampling the input image or feature image via at least one feature extraction unit to obtain a down-sampling feature image; and
(2) performing dilated convolution on the input down-sampling feature image via at least one feature extraction unit to obtain a convolution feature image.

S1820a: For at least one first feature image, feature extraction is performed via a second feature extraction unit (e.g., second neural network layers) to obtain a corresponding second feature image.

The second feature image is determined based on the relationship between different pixels on the first feature image.

Specifically, the second feature extraction unit may be a graph convolutional network, and step S1820a of performing the feature extraction may include the following steps.
(1) For at least one first feature image, a corresponding intimacy image is constructed.

The intimacy image includes a plurality of nodes and a plurality of edges. Each of the plurality of nodes represents a pixel of the first feature image, and each of the plurality of edges represents the similarity between the two pixels connected by the edge.
(2) Feature extraction is performed according to the constructed intimacy image by using the graph convolutional network to obtain a corresponding second feature image.

Specifically, performing, according to the constructed intimacy image, by using the graph convolution network, feature extraction to obtain a corresponding second feature image may include A1-C1:
A1: using at least one node in the intimacy image as a central node, and aggregating features of neighboring nodes of the central node to obtain an aggregated feature;
B1: fusing the aggregated feature and the feature of the central node to obtain a first fused feature; and
C1: updating the feature of the central node in the first feature image to the corresponding first fused feature to generate a second feature image.

In the embodiment of the present application, considering that the constructed intimacy image and the graph convolutional network are performed on the whole image, a large amount of calculation is required, and the adaptability is low in some scenarios with high real-time requirements. Therefore, in the embodiment of the present application, a lighter adaptive grid graph convolution network (AGGCN) is designed for the distributed characteristics of the blurred image in order to improve the running speed of the neural network.

Figure 22:
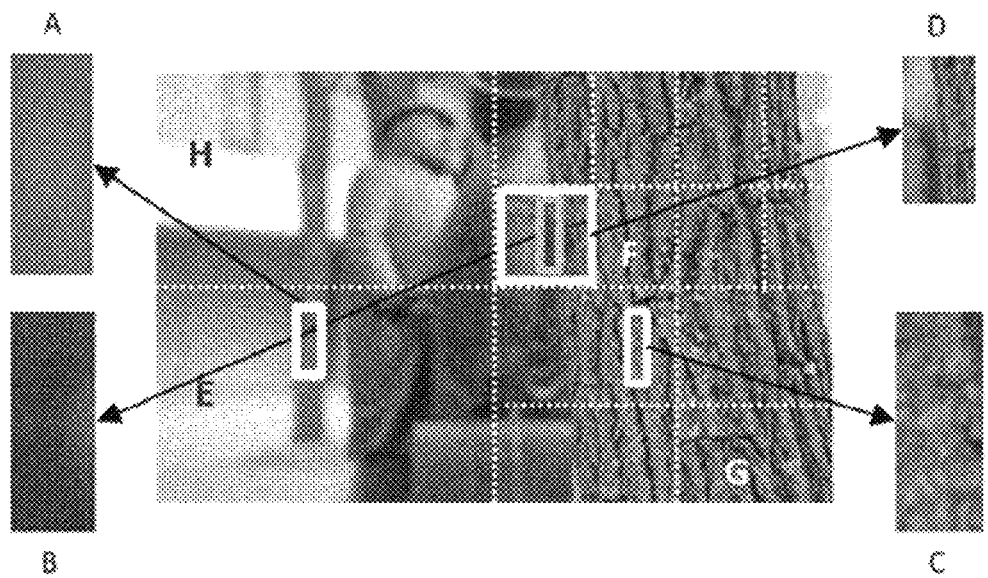
FIG. 22 is a schematic diagram of an image to be processed in an example embodiment of the present application.

Convolution is a local operation and has a very small receptive field, so it is unable to accurately determine the blurred boundary. For example, in FIG. 22, B is a blurred boundary containing clear pixels and blurred pixels, A contains blurred pixels, and C contains clear pixels. However, from a local perspective, B will be determined as a blurred area, resulting in a blur detection error. Therefore, in the embodiment of the present application, whether the area is blurred is determined from a larger perspective to realize accurate determination, as shown by H in FIG. 22.

Figure 23:
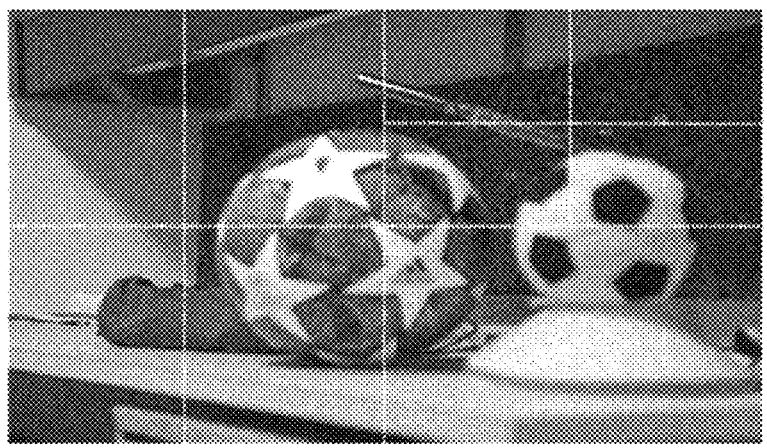
FIG. 23 is a schematic diagram of an image to be processed in an example embodiment of the present application.

The characteristics of the blurred image will be described below.
(1) As a local operation, convolution can correctly determine whether the whole image is a clear or blurred image, but the blurred boundary cannot be determined accurately. For example, in FIG. 22, B is a blurred boundary, and its corresponding area contains clear pixels and blurred pixels. However, it will be regarded as a blurred image by convolution.
(2) The blurred area appears in blocks. For example, in FIG. 22, H and E are blurred areas, and F and G are clear areas.
(3) Different images have different blur distributions. For example, FIGS. 22 and 23 have different blur distributions.

According to the above possible phenomenon of the blurred image, an embodiment of the present application provides an adaptive graph convolutional network, including:
(1) According to the blur distribution in the image, an adaptive partitioning strategy is proposed to expand the receptive field.
(2) By using the graph convolutional network (GCN) in each block, it is determined from a larger perspective that a pixel is clear or blurred, thereby improving the accuracy of blur detection.

Specifically, performing, for at least one first feature image, feature extraction to obtain a corresponding second feature image may include A2-C2:
A2: dividing the first feature image into at least two image blocks;
B2: extracting, by using a graph convolutional network, local features of each image block and global features between adjacent image blocks;
C2: fusing the local features and the global features to obtain a second fused feature; and
D2: generating a second feature image based on the second fused feature.

Figure 24:
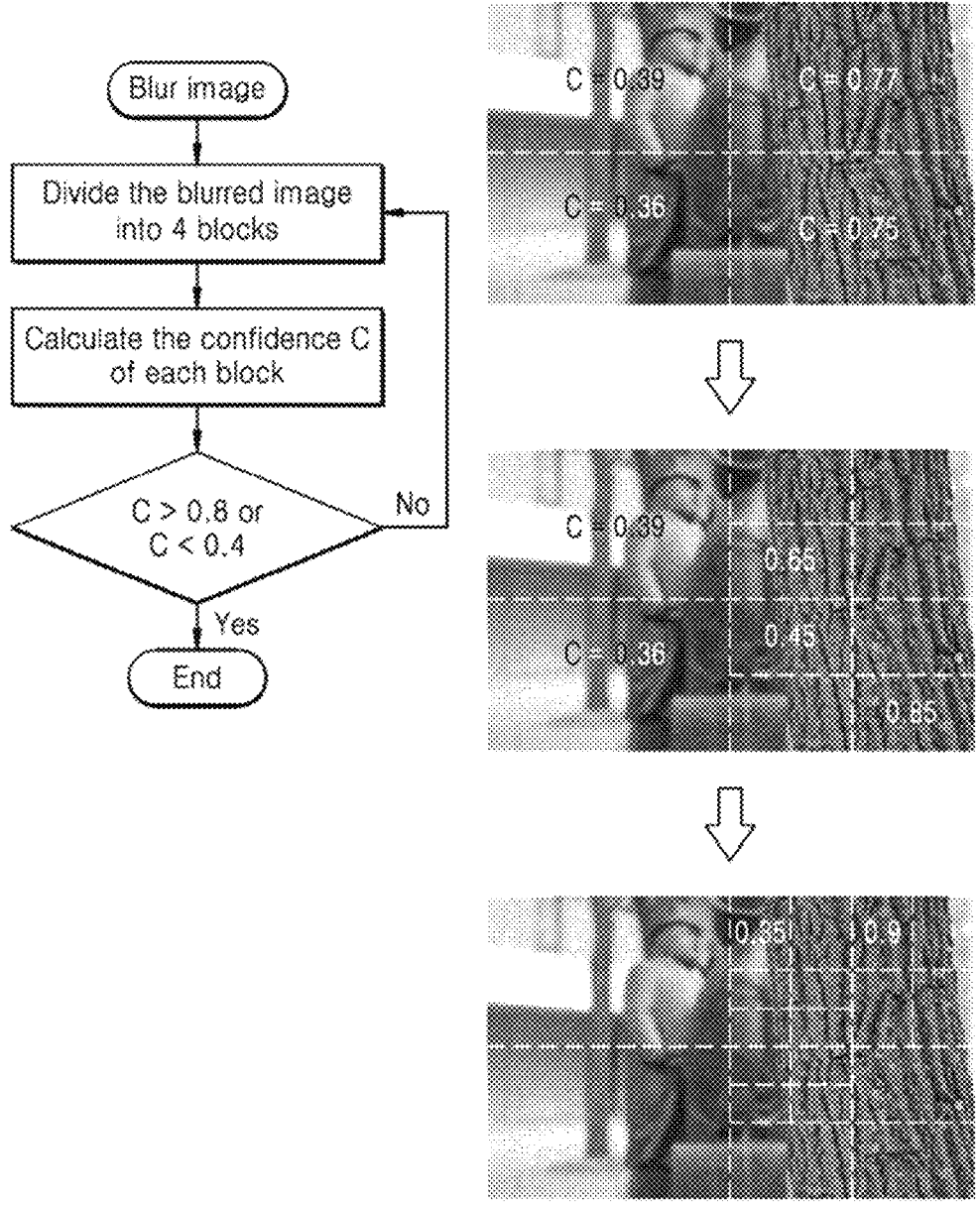
FIG. 24 is a flowchart of an adaptive partitioning strategy in an example of the present application.

In A2, the adaptive partitioning strategy shown in FIG. 24 is used for processing, wherein dividing the first feature image into at least two image blocks includes A21-A22:
A21: The first feature image is divided into at least two image blocks, and the confidence of each image block is determined, the confidence being used to represent the clarity of the image block.

Specifically, the first feature image may be divided into four (4) or another number of image blocks. In order to facilitate the description of the embodiments of the present application, the following description is given by dividing the first feature image into four (4) image blocks.

Specifically, the input feature (blurred image, i.e., the first feature image) is divided into 4 blocks, and the confidence C of feature in each image block is calculated. The greater the confidence C is, the clearer the corresponding image block is.

A22: The image blocks with the confidence within a preset range are continuously divided until the confidence corresponding to any image block obtained by the division is outside the preset range.

Specifically, a determination step is executed to determine whether the confidence corresponding to each image block is within a preset range. If the confidence corresponding to each image block is within the preset range, it is indicated that the image block contains both blurred pixels and clear pixels. At this time, the image block needs to be continuously divided into 4 blocks until the confidence corresponding to each image block obtained by the division is outside the preset range.

For example, the preset interval may be set to [0.4, 0.8]. If the confidence is between 0.4 and 0.8, the image block is continuously divided into 4 blocks, and the determination step is continuously executed. As shown in FIG. 24, the image blocks with a confidence C of 0.77 and 0.75 are continuously divided into 4 image blocks. When A22 is continuously executed, the image block with a confidence C of 0.65 is continuously divided into 4 image blocks. By that analogy, the processing is cyclically performed.

Specifically, each of the at least two image blocks obtained by the division includes only blurred pixels or only clear pixels, wherein the image block with a confidence greater than the maximum value of the preset interval includes only clear pixels, and the image block with a confidence less than the minimum value of the preset interval includes only blurred pixels.

In A2, the dividing the first feature image into at least two image blocks further includes:
comparing the size of the image block with a preset size; and, based on the result of comparison, dividing the image block based on the preset size.

The description is continuously given with reference to the above example. That is, the image block with a confidence greater than 0.8 or less than 0.4 is processed. If the size of the image block is greater multiple times than the preset size (set minimum size), the image block is divided according to the set minimum size.

The specific process of extracting local features and global features in B2-C2 will be described below with reference to FIG. 25.

Specifically, after adaptive partitioning is performed on the blurred image (the first feature image), a graph convolutional network can be used in each block to determine whether pixels are blurred. Since the partitioned image has a larger receptive field than the convolution operation, the blur detection is more accurate.

Figure 25:
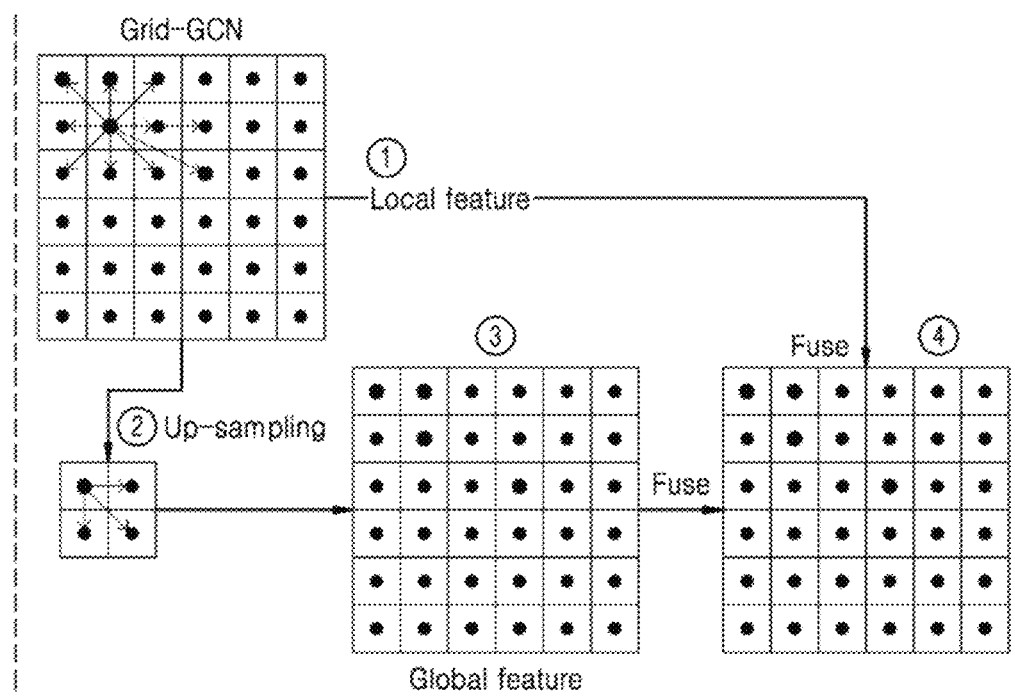
FIG. 25 is a schematic diagram of extracting local features and global features in an example of the present application.

Firstly, for each image block, local features are extracted by a graph convolutional network, as shown in the area ① in FIG. 25. Since the local features do not consider the relationship between blocks, the block area is represented by using a feature vector through pooling in the present application, the relationship between blocks is learnt between blocks by using a graph convolutional network, and global features of the image are extracted, as shown in the areas ② and ③ in FIG. 25 (the process may include down-sampling and up-sampling processes). Finally, the local features and the global features are fused to improve the expression ability of features, as shown in the area ④ in FIG. 25.

As shown in the area ① in FIG. 25, for each image block, the features named local features in each image block in the embodiments of the present application are learnt by GCN; the area ② shows that each image block is represented by a vector, the relationship between image blocks is learnt by GCN and local features are extracted; the area ③ shows that the extracted global features are recovered to the original size; and, the area ④ shows that the local features and the global features are fused to improve the representation ability of features. In the area ②, each image block is a grid; and, in the area ①, each image block contains a plurality of grids, each of which represents one pixel.

In a feasible embodiment, in step B2, extracting, by using a graph convolutional network, global features between adjacent image blocks includes:
performing dimension reduction on the features of each image block; and
extracting, based on the features of each image block after the dimension reduction, by using a graph convolutional network, global features between adjacent image blocks.

Specifically, as shown in the area ② in FIG. 25, before the extraction of the global features, dimension reduction (e.g., pooling) can be performed on each image block to effectively reduce the amount of data and simplify the complexity of the graph convolutional network during calculation, thereby improving the efficiency of extracting the global features by using the graph convolutional network.

The complexity of the AGGCN provided in the embodiments of the present application will be analyzed below, specifically referring to the following formulas (3)-(5).

$$O(GCN) = 4hwC^2 + 2(hw)^2 C \tag{3}$$

$$O(AGGCN) = 4hwC^2 + 2M^2 hwC \tag{4}$$

$$\frac{O(AGGCN)}{O(GCN)} \approx \frac{M^2}{hw} \tag{5}$$

The formula (3) is a formula for calculating the complexity of the GCN, the formula (4) is a formula for calculating the complexity of the adaptive partitioning GCN provided in the embodiments of the present application, and the formula (5) is the ratio of the both. Where, h represents the height of the image, w represents the width of the image, C represents the number of channels of the image, and M represents the size (which may be the preset size) of the specified block in the embodiments of the present application. Since M is far less than h and w, it can be known from the formula (5) that the time consumption of the method provided in the embodiments of the present application is far less than the time consumption of the GCN scheme.

Figure 26:
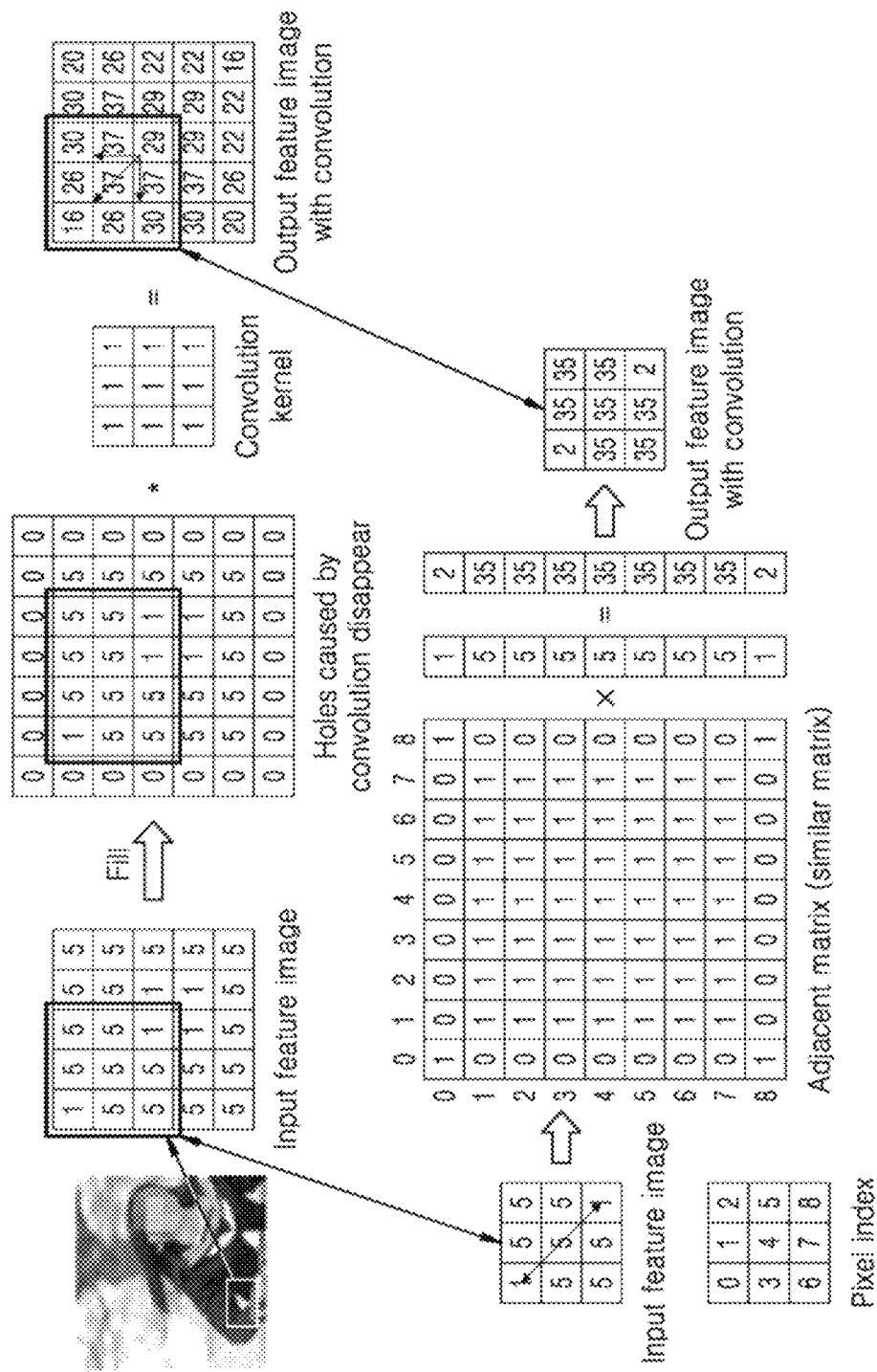
FIG. 26 is a schematic diagram showing the comparison of feature extraction between the related art and the present application.

In an embodiment of the present application, a graph embedding module based on an AGGCN is provided. It calculates the correlation of all instances (pixels) in each image block and clusters the instances with similar attributes, so that the difference between blurred pixels and clear pixels is increased and the accuracy of blur detection is improved. As shown in FIG. 26, the upper half part of FIG. 26 shows the GCN scheme, where the pixels of the holes are assimilated, resulting in errors in blur detection, and the lower half part of FIG. 26 is a schematic diagram of the AGGCN scheme according to the embodiment of the present application, where the pixels in the holes still have corresponding features, so that the blur detection can be more accurate. The area filled with gray in FIG. 26 represents blurred pixels. The values in the adjacent matrix represent the similarity between pixels, where 0 indicates that it is not similar, and 1 indicates that it is similar.

S1830a: A classification mask image is generated based on at least one second feature image.

Specifically, step S1830a of generating a classification mask image based on at least one second feature image may include the following steps.

The at least one second feature image is decoded via a number of cascaded decoding units to obtain a classification mask image, wherein the decoding units perform feature transformation on the input feature image, and then fuse the feature image after the feature transformation with the second feature image with the same dimension for outputting.

If the first feature extraction unit performs down-sampling on the image to obtain first feature images of different scales and then performs feature extraction on the first feature images of difference scales to obtain corresponding second feature images, the second feature images can be up-sampled via decoding units, and the second feature images with the same dimension are fused to generate a fused feature image.

If the first feature extraction unit performs down-sampling and dilated convolution on the image to obtain first feature images and then performs feature extraction on the first feature images to obtain corresponding second feature images, the second feature images can be up-sampled and resized via decoding units, and the second feature images with the same dimension are fused to generate a fused feature image. The specific process of generating a classification mask image based on the second feature image will be described in detail below.

In the above embodiment, in the process of extracting second feature images by a graph convolutional network, by fusing the aggregated feature with the features of the central node, it can be ensured that the features of the central node have original information and are assimilated as few as possible, so that the accuracy of the blur detection result is improved.

Figure 27:
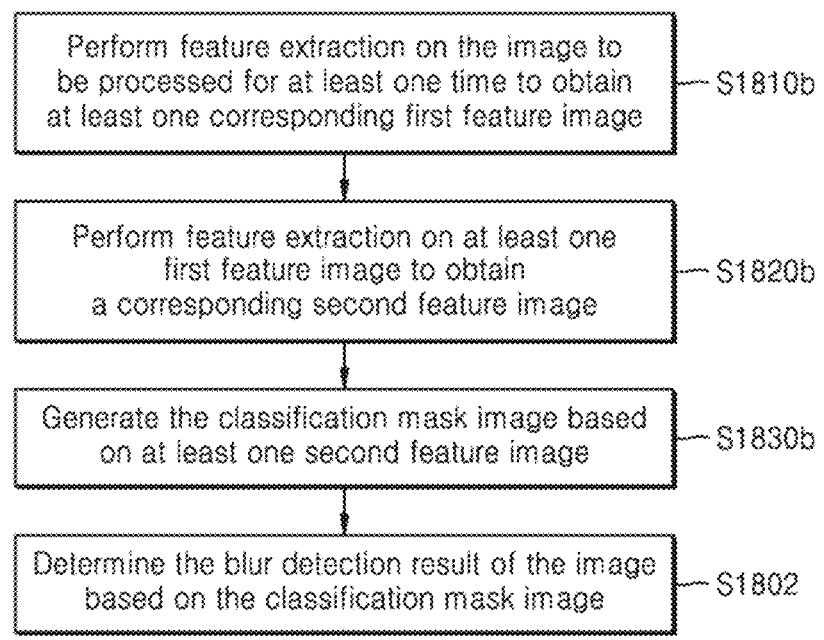
FIG. 27 is a flowchart of an image processing method according to an embodiment of the present application.

In a possible implementation of the embodiment of the present application, as shown in FIG. 27, step S1801 of performing blur classification on pixels of an image to be processed to obtain a classification mask image may include the following steps.

S1810b: Feature extraction is performed on the image to be processed for at least one time to obtain at least one corresponding feature image.

Specifically, multiple down-sampling can be performed on the image by using a multilayer neural network to obtain first feature images of different scales.

For example, down-sampling may be performed three times. The image having a size of w×h×3 is down-sampled twice to obtain a feature image in 1/4w×1/4h×c; and, the feature image in 1/4w×1/4h×c is then down-sampled to obtain a feature image in 1/8w×1/8h×c1. After three times of down-sampling, no down-sampling is performed, so that more detailed features of the image can be reserved.

S1820b: Feature extraction is performed on at least one first feature image to obtain at least one corresponding second feature image.

The second feature image is determined based on the relationship between different pixels on the first feature image.

During a specific implementation, the pixels of all feature images are regarded as nodes of the image, and the features of the nodes of the same category are closer, and the features of different categories are more distant. Thus, implicit pixel-level clustering is realized to a certain extent, and the accuracy of identification can be effectively improved.

The specific process of obtaining the second feature image will be described in detail below.

S1830b: A classification mask image is generated based on at least one second feature image.

Specifically, different second feature images can be fused to generate a classification mask image.

In a possible implementation of the embodiment of the present application, step S1830b of generating a classification mask image based on at least one second feature image may include the following steps.

(1) At least one corresponding fused feature image is obtained based on at least one second feature image.

Specifically, obtaining at least one corresponding fused feature image based on at least one second feature image may include the following steps.

a. For any first feature image, the first feature image obtained after performing down-sampling or dilated convolution on the first feature image is set as a next-level feature image of this feature image.

b. For the first feature image of any scale, if the feature image does not have any next-level feature image, a second feature image corresponding to the first feature image is set as a fused feature image of this feature image.

c. If this first feature image has a next-level feature image, the fused feature image of the next-level feature image is fused with the second feature image of the first feature image to obtain a fused feature image of the first feature image.

(2) The fused feature image of the largest scale is up-sampled to obtain a classification mask image, the size of the classification mask image being the same as that of the image to be processed.

In one implementation, the image is down-sampled to obtain first feature images of different scales, and feature extraction is performed on the first feature images of different scales to obtain corresponding second feature images. The second feature images of different scales are fused to generate a fused feature image.

Figure 28:
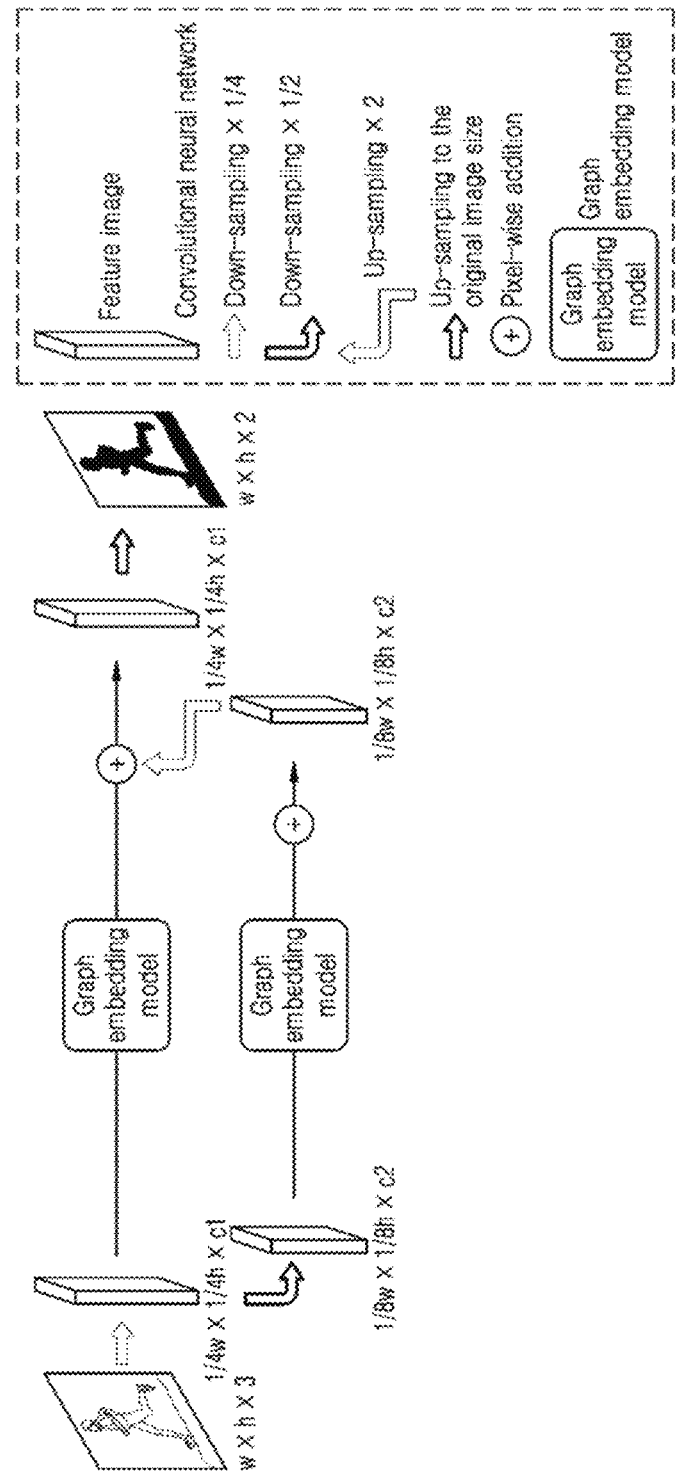
FIG. 28 illustrates a neural network structure for obtaining a classification mask image in an example embodiment of the present application.

As shown in FIG. 28, the image (e.g., an image in w×h×3) is down-sampled (e.g., using a convolutional neural network at a down-sampling rate of 1/4) to obtain a first feature image in 1/4w×1/4h×c1. The first feature image in 1/4w×1/4h×c1 is down-sampled (e.g., a down-sampling rate of 1/2) to obtain a first feature image in 1/8w×1/8h×c2, and feature extraction is performed on the first feature image in 1/4w×1/4h×c1 to generate a second feature image in 1/4w×1/4h×c1. That is, the first feature image in 1/4w×1/4h×c1 is input into a graph embedding model. Feature extraction is performed on the first feature image in 1/8w×1/8h×c2 to generate a second feature image in 1/8w×1/8h×c2. That is, the first feature image in 1/8w×1/8h×c2 is input into the graph embedding model to generate a second feature image in 1/8w×1/8h×c2. The second feature image in 1/8w×1/8h×c2 is up-sampled (corresponding to the shown up-sampling*2) to obtain a size of 1/4w×1/4h×c1 and then fused with the second feature image in 1/4w×1/4h×c1, i.e., shown pixel-wise addition, to obtain a fused feature image in 1/4w×1/4h×c1. The fused feature image in 1/4w×1/4h×c1 is up-sampled to the original image size to generate a classification mask image.

In another implementation, the image is down-sampled to obtain down-sampled feature images of different scales, and dilated convolution is performed on the down-sampled feature image of the smallest scale for at least one time to obtain at least one convolution feature image. Feature extraction is performed on the down-sample feature image and the convolution feature image to obtain corresponding second feature images. Different second feature images are fused to generate a fused feature image.

Figure 29:
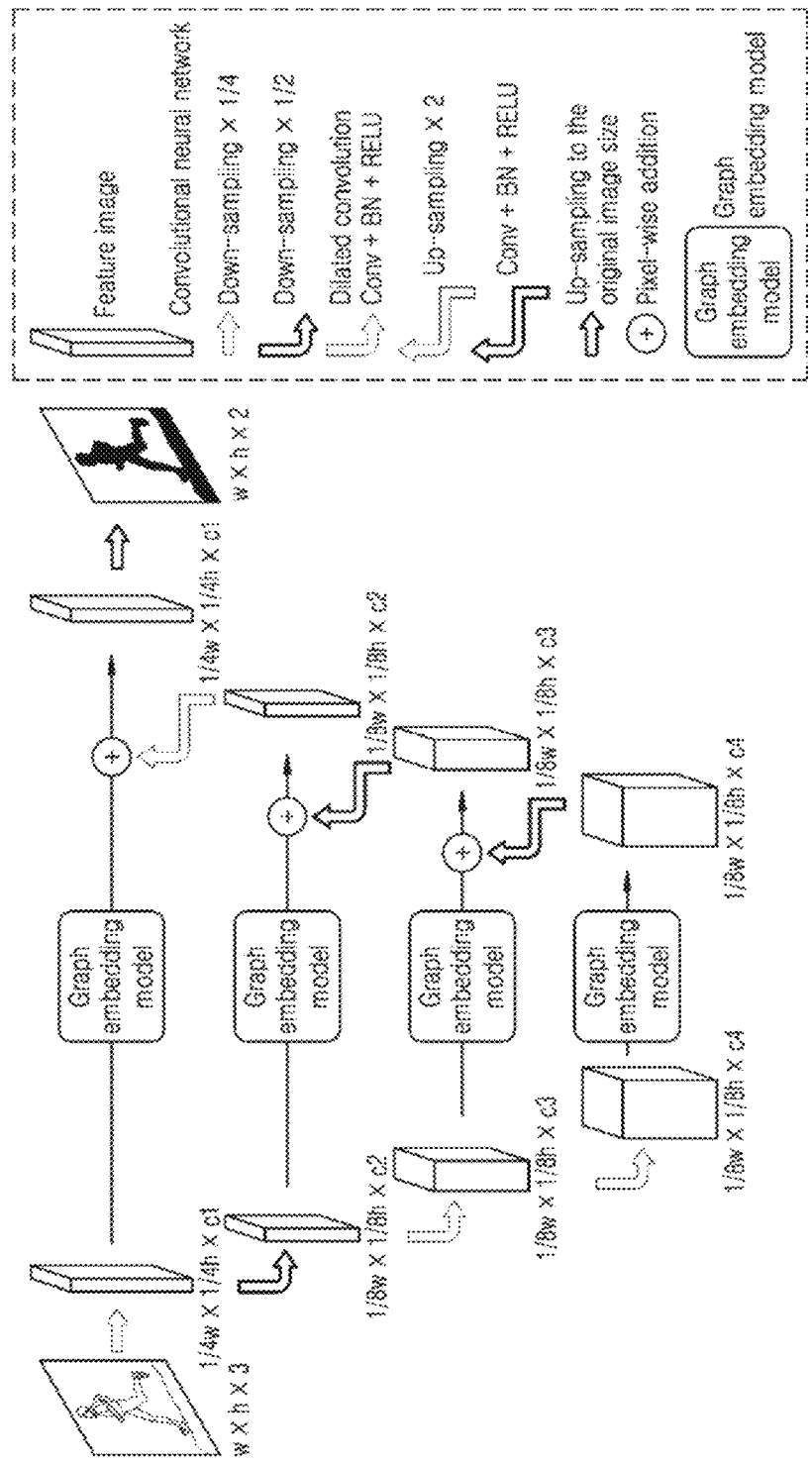
FIG. 29 illustrates another neural network structure for obtaining a classification mask image in an example embodiment of the present application.

As shown in FIG. 29, the image (e.g., an image in w×h×3) is down-sampled (e.g., using a convolutional neural network at a down-sampling of 1/4) to obtain a down-sampled feature image (also referred to as a first feature image) in 1/4w×1/4h×c1. The first feature image in 1/4w×1/4h×c1 is down-sampled (e.g., a down-sampling of 1/2) to obtain a down-sampled feature image (also referred to as a first feature image) in 1/8w×1/8h×c2, and dilated convolution (e.g., dilated convolution Conv+BN+RELU) is performed on the down-sampled feature image 1/8w×1/8h×c2 to generate a first dilated convolution image (also referred to as a first feature image. One dilated convolution (e.g., e.g., dilated convolution Conv+BN+RELU) is performed on the first dilated convolution image to obtain a second dilated convolution image (also referred to as a first feature image). Feature extraction is performed on the first feature image in 1/4w×1/4h×c1 to generate a second feature image in 1/4w×1/4h×c1. That is, the shown first feature image in 1/4w×1/4h×c1 is input into a graph embedding model. Feature extraction is performed on the first feature image in 1/8w×1/8h×c2 to generate a second feature image in 1/8w×1/8h×c2. That is, the shown first feature image in 1/8w×1/8h×c2 is input into the graph embedding model. Feature extraction is performed on the first dilated convolution image to obtain a corresponding second feature image. Similarly, the first dilated convolution image is input into the graph embedding model. Feature extraction is performed on the second dilated convolution image to obtain a corresponding second feature image, and the second dilated convolution image is input into the graph embedding model to obtain a corresponding second feature image. The second feature image corresponding to the second dilated convolution image is resized (corresponding to the shown Conv+BN+RELU), and the resized second feature image is fused with the second feature image corresponding to the first dilated convolution image, i.e., shown pixel-wise addition, to obtain a fused feature image corresponding to the first dilated convolution image. The fused feature image corresponding to the first dilated convolution image is resized (corresponding the shown Conv+BN+RELU) and then fused with the second feature image in 1/8w×1/8h×c2, i.e., shown pixel-wise addition, to obtain a fused feature image corresponding to the first feature image in 1/8w×1/8h×c2. The fused feature image in 1/8w×1/8h×c2 is up-sampled (e.g., an up-sampling of 2), and then fused with the second feature image in 1/4w×1/4h×c1, i.e., shown pixel-wise addition, to obtain a fused feature image in 1/4w×1/4h×c1. The fused feature image in 1/4w×1/4h×c1 up-sampled to the original image size to generate a classification mask image.

The graph embedding models shown in FIGS. 28 and 29 are improved graph convolutional networks. The graph embedding model will be specifically described in detail below.

In the above embodiment, features of different scales can be fused by at least one down-sampling, thereby improving the expression ability of features. In addition, by a multi-stage fusion method, the calculation amount of low-scale features is much less than the calculation amount of high-scale features. Thus, multi-scale features can be fused, and the calculation amount is lower.

In the above embodiment, the image is down-sampled to obtain a down-sampled feature image, the down-sampled feature image is then classified to obtain a classification feature image, and a classification mask image is generated based on the classification feature image of different scales. In other implementations, after the image is down-sampled, dilated convolution may be performed.

In a possible implementation of the embodiment of the present application, the feature image of at least one scale includes a down-sampled feature image and a convolution feature image. Step S1810b of performing down-sampling on the image to be processed for at least one time to obtain a corresponding feature image of at least one scale may include the following steps.

(1) The image to be processed is down-sampled for at least one time to obtain at least one down-sampled feature image.

(2) Dilated convolution is performed on the down-sampled feature image of the smallest scale for at least one time to obtain at least one convolution feature image.

Dilated/Atrous convolution is widely applied in tasks such as semantic segmentation and target detection. Multiple times of down-sampling will cause the features of deep layers to lose rich detailed information, particularly greatly affecting the holes in the original image. Therefore, in the present application, a subsequent down-sampling operation may be omitted after at least one down-sampling is performed on the original image, so that the size of the feature image is fixed, and more detailed features can be reserved. In the present application, spatial convolution is performed on the feature images of the deep layers to obtain a larger receptive field. Images (a)-(c) in FIG. 20 show schematic diagrams of dilated convolution.

Figure 30:
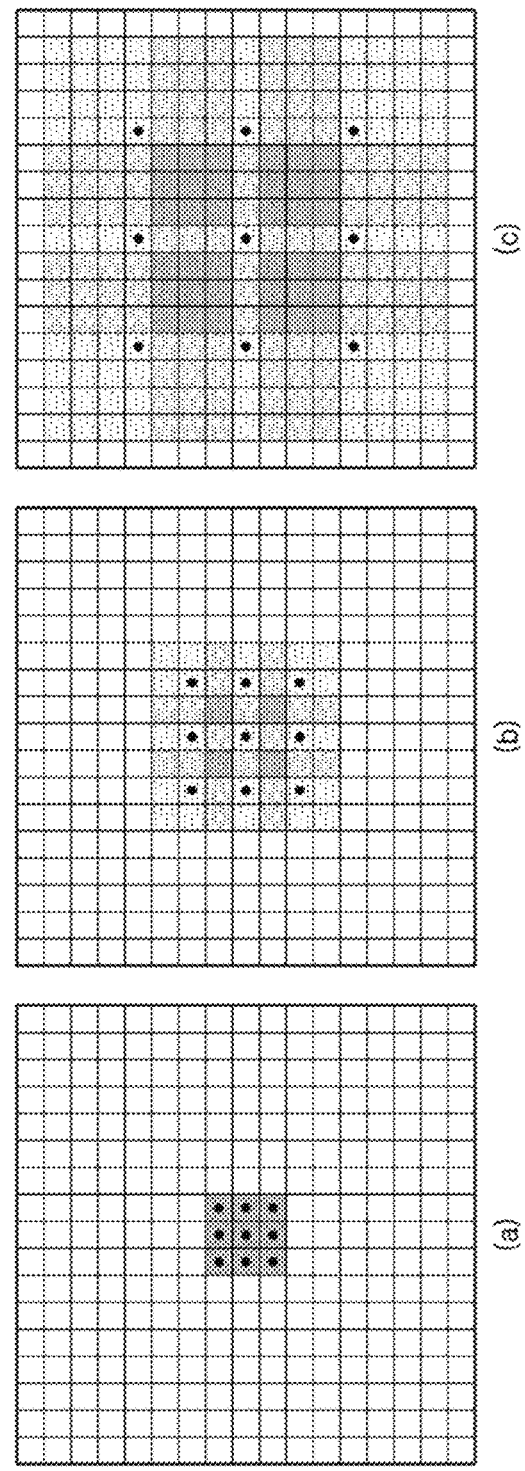
FIG. 30 is a schematic diagram of dilated convolution in an example embodiment of the present application.

Image (a) of FIG. 30 shows the conventional 3×3 convolution, where the receptive field is a 3×3 area; and, FIG. 30(b) shows 3×3 convolution with 1 hole. It can be known from Image (b) of FIG. 30 that, although the size of the convolution kernel is 3×3, the receptive field is 7×7. Thus, it can be known that the dilated convolution can increase the receptive field of convolution. Image (c) of FIG. 30 shows dilated convolution with 3 holes, where the receptive field has a larger range.

In this embodiment, by using dilated convolution, the receptive field can be increased without performing down-sampling to lose detailed information, and the extracted features are richer.

Figure 31:
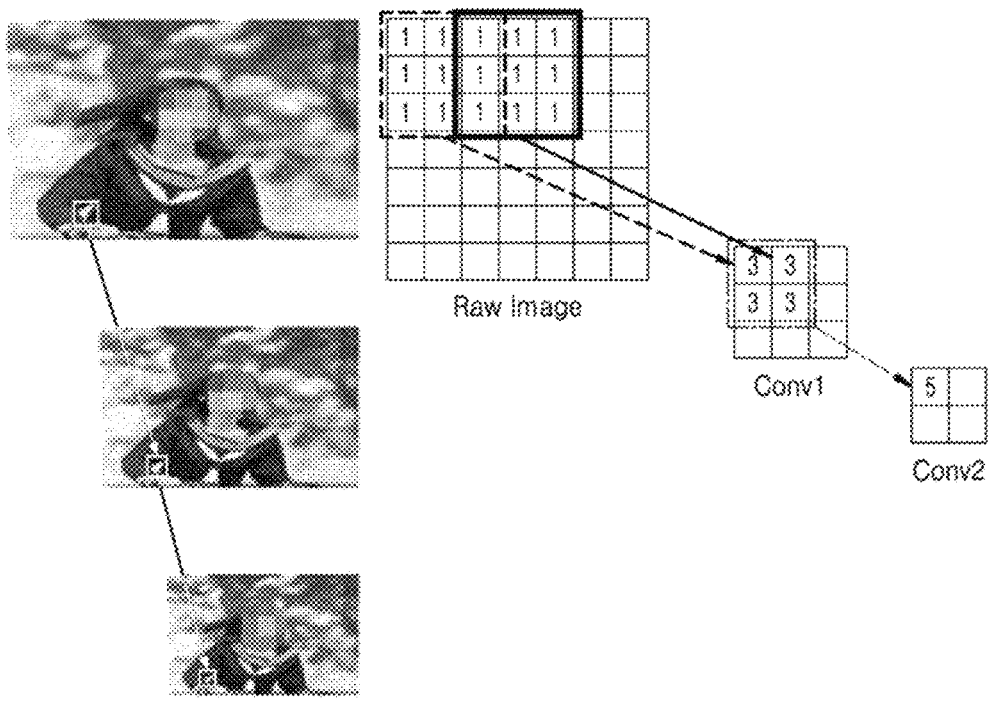
FIG. 31 is a schematic diagram of a multi-scale image receptive field in an example embodiment of the present application.

As shown in FIG. 31, the features of different scales have different receptive fields. The smaller the scale of the feature is, the larger the receptive field is. In FIG. 31, one pixel of conv1 is mapped to the raw image and corresponds to 9 pixels. If 3×3 convolution is used in the conv1, that is, there are 9 pixel values, the area corresponding to the raw image is 7×7; and, if 3×3 convolution is used in the conv2, that is, there are 9 pixel values, the area corresponding to the raw image is 15×15. Thus, as the depth of the neural network layer and the number of the down-sampling operations increase, the receptive field of the extracted features becomes larger, and it is possible to determine whether a pixel is blurred from a larger perspective.

Although the receptive field of the features increases with the deepening of the network layer, the 3×3 convolution kernel is still a local receptive field. Determination errors may occur if the holes of the image are determined from a local perspective. The blurred boundary is a smooth transition process from clear to blurred, rather than a cliff-like boundary problem. Therefore, the local perspective field is unable to accurately determine the blurred boundary. Therefore, the present application provides a graph embedding model based on a graph convolutional network, which establishes a global image structure for each pixel of the image according to the similarity between features and determines whether a certain pixel is a blurred pixel from a global perspective. If a small convolution kernel is used for each feature image, the respective field is very small, as shown by the box in the image of FIG. 31. By using the local receptive field, it is very difficult to determine whether the pixel is a blurred pixel category. However, by using the global receptive field based on the image, the accuracy of identification can be improved by the feature similarity between pixels. Thus, the problem that the blurred area in the hole cannot be identified can be effectively solved, and the blurred boundary can be determined more accurately.

The existing graph convolutional network is improved in the present application, and the specific process of generating a classification feature image based on the improved graph convolutional network will be further described below by embodiments.

In a possible implementation of the embodiment of the present application, performing, for at least one first feature image, feature extraction to obtain a corresponding second feature image may include the following steps.

(1) A connection relationship between pixels on the first feature image is determined, and an adjacent matrix corresponding to the first feature image is generated based on the determined connection relationship.

Specifically, determining a connection relationship between pixels on the first feature image and generating an adjacent matrix corresponding to the first feature image based on the determined connection relationship may include the following steps.

a. Channel dimension reduction is performed on the first feature image to obtain a dimension-reduced feature image.

b. The dimension-reduced feature image is adjusted at different dimensions to obtain a fourth feature image and a fifth feature image, the fourth feature image and the fifth feature image being transposed matrices.

c. Matrix multiplication is performed on the fourth feature image and the fifth feature image to obtain the adjacent matrix.

Specifically, a 1×1 convolution operation can be performed on the input feature to realize channel dimension reduction, so that the model parameters and calculation amount are reduced.

(2) A second feature image is determined based on the adjacent matrix and the first feature image.

Specifically, determining a second feature image based on the adjacent matrix and the first feature image may include the following steps.

e. The dimension of the first feature image is adjusted to obtain a third feature image.

f. A second feature image is determined based on the adjacent matrix and the third feature image.

For example, for the first feature image having a size of w×h×c, the dimension can be adjusted as (w*h)×c, where (w*h) can be regarded as an entire dimension.

Specifically, determining a second feature image based on the adjacent matrix and the third feature image may include the following steps.

f1: Matrix multiplication is performed on the adjacent matrix and the third feature image to obtain a sixth feature image.

f2: The third feature image and the sixth feature image are concatenated in a channel dimension to obtain a concatenated feature image.

f3: The second feature image is generated based on the concatenated feature image.

Specifically, generating the second feature image based on the concatenated feature image may include the following steps.

The concatenated feature image is multiplied by a preset weight and biased to obtain the second feature image.

The improved graph convolutional network will be further described below by specific examples.

Figure 32:
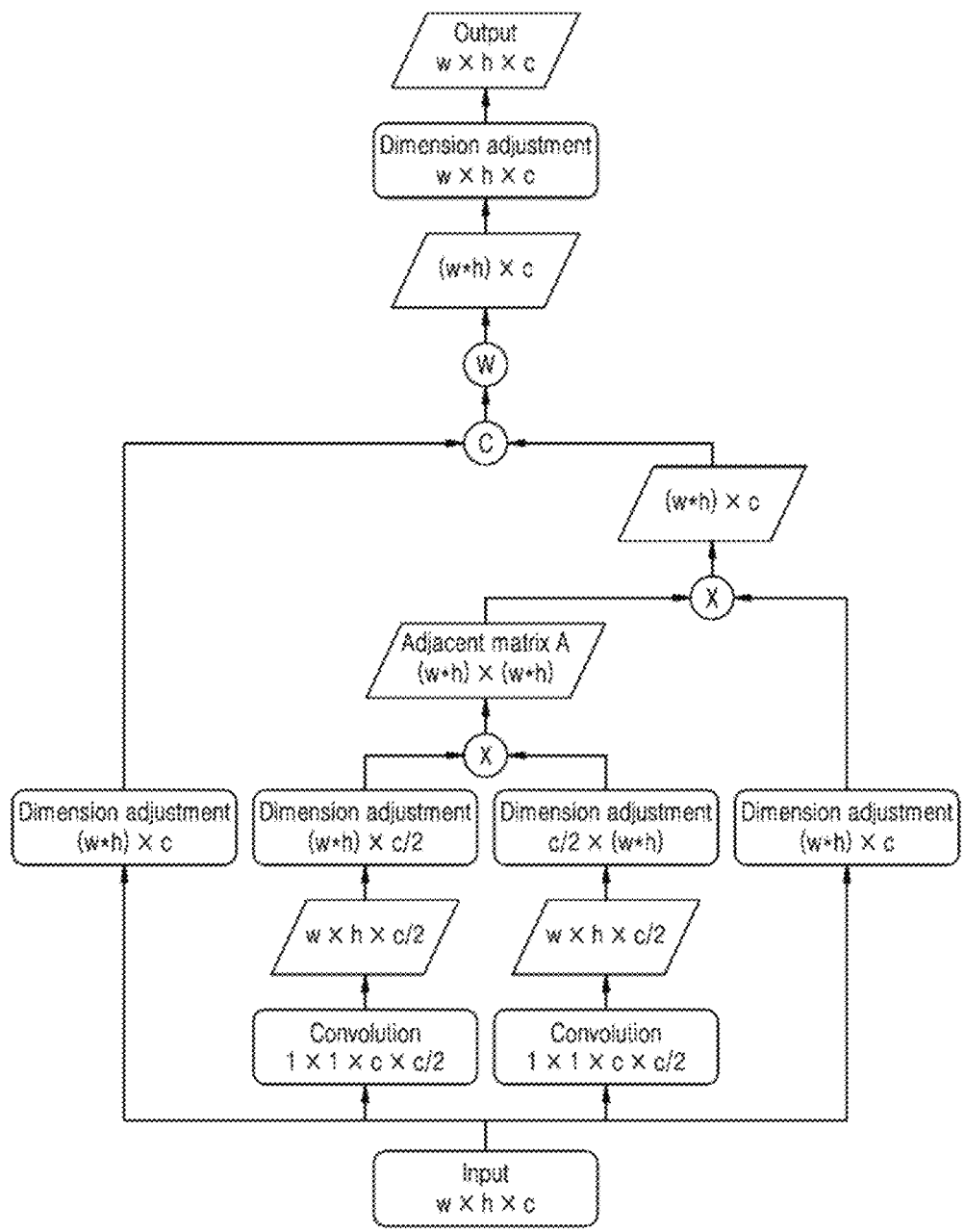
FIG. 32 is a structure diagram of a graph embedding module according to an embodiment of the present application.

In one example, the improved graph conventional network can also be referred to as a graph embedding module. The structure of the graph embedding module is shown in FIG. 32. The features of different scales are used as the input of the graph embedding module to calculate a classification feature image of the feature image of the current scale, i.e., global information containing the feature image, and the classification feature image is used as an output and transmitted to the neural network in one layer. Where, w represents the width of the feature image, h represents the height of the feature image, c represents the number of channels of the feature image, and w×h×c represents the input feature image having a width of w, a height of h and a number c of channels. ⓧ represents matrix multiplication, ⓒ represents the concatenation of two features in the channel, and ⓦ represents the calculation process of the feature image and the weight w and bias b, specifically shown by the following formula:

$$y=x*w+b \quad (1)$$

In the graph embedding module, a 1×1 convolution operation is performed on the input feature to realize channel dimension reduction, so that the model parameters and calculation amount are reduced. Matrix multiplication is performed on the transformed feature to obtain an adjacent matrix A, wherein each element in the adjacent matrix A represents the similarity between every two pixel features. The adjacent matrix is an adjacent matrix with a weight. Then, graph convolution calculation is performed by using the adjacent matrix A and the transformed input feature. Specifically, the first feature image w×h×c is input and subjected to dimension adjustment to obtain a third feature image (w*h)×c. Channel dimension reduction is performed based on 1×1×c×c/2 convolution to obtain a dimension-reduced feature image w×h×c/2. Dimension adjustment is performed on the dimension-reduced feature image to obtain a fourth feature image (w*h)×c/2 and a fifth feature image c/2×(w*h) which are mutually transposed. An adjacent matrix A (w*h)×(w*h) is generated based on the fourth feature image and the fifth feature image, and the adjacent matrix A (w*h)×(w*h) and the third feature image (w*h)×c are multiplied to obtain a sixth feature image (w*h)×c. The third feature image (w*h)×c and the sixth feature image (w*h)×c are concatenated in the channel dimension to obtain a concatenated feature image (w*h)×c. A second feature image is generated based on the concatenated feature image.

For transduction learning, in the process of training the GCN network model, the training data and the test data are known, that is, the training date contains the test data. Since the test data is known during the training process, so it cannot be generalized to unknown data, that is, the performance effect is poor on the unknown data set. In the present application, feature embedding representation is not directly learnt, and a feature aggregation method is learnt to achieve better performance on the unknown data set. The calculation formula is:

$$X^{(l+1)} = \sigma([X^{(l)} \| X_A^{(l)}] W^{(l)} + b^{(l)}) \quad (2)$$

where $X^{(l)} \in \mathbb{R}^{N \times D_{in}}$ represents a feature matrix of the input feature, the input feature matrix $N_f$, $X^{(l+1)} \in \mathbb{R}^{N \times D_{out}}$ for the first layer represents the feature representation of the next layer, N=w*h represents the number of nodes, and $D_{in}/D_{out}$ represents the feature dimension of the input/output. X A(l)=gA, Xl is the feature representation after aggregating neighboring nodes. $g(A, X^{(l)}) = \Lambda^{(-1/2)} A \Lambda^{(-1/2)} \cdot X^{(l)}$, where g(•) is an aggregation function about A and $X^{(l)}$, where A is the adjacent matrix of the image. ∥ represents the concatenation of clustered neighboring nodes and its own node. $W^{(l)}$ and $b^{(l)}$ represent the weight and bias of the first layer, respectively. σ is a nonlinear activation function. In the present application, a rectified linear unit (ReLU) activation function can be used.

The structure of the improved graph convolutional model and the specific process of obtaining a classification feature image in the present application have been described in the above embodiments, and the specific process of determining the blur detection result will be described by specific embodiments with reference to the drawings.

In a possible implementation of the embodiment of the present application, step S1802 of determining the blur detection result of the image based on the classification mask image may include the following steps.

(1) The proportion of a blurred area of the image in the image is determined based on the classification mask image.

Specifically, determining the proportion of a blurred area of the image in the image based on the classification mask image may include the following steps.

The ratio of the number of blurred pixels in the classification mask image to the total number of pixels in the image is determined as the proportion of the blurred area in the image.

Specifically, the number of blurred pixels can be counted by a pixel counting method to obtain the area of the blurred area. The total number of pixels in the image is used as the area of the image. The number of blurred pixels is divided by the total number of pixels in the image to obtain the proportion of the blurred area in the image.

(2) If the proportion is greater than a preset threshold, the blur detection result indicates that the image is a blurred image.

Specifically, if the proportion is greater than the preset threshold, it can be considered that there are more blurred areas in the image; and, if the proportion is less than or equal to the preset threshold, it can be considered that there are fewer blurred areas in the image, and the image is a clear image.

The specific process of determining the blur detection result has been described in the above embodiment, and the specific application scenario of the image processing method will be described below.

In a possible implementation of the embodiment of the present application, the image processing method further includes the following steps.

If the blur detection result indicates that the image is a blurred image, the position of the blurred area in the image is determined based on the classification mask image.

Specifically, the classification mask image contains the specific positions of clear pixels and blurred pixels. The position of the blurred area in the image can be determined according to the distribution of different types of pixels in the classification mask image.

In practical applications, after the position of the blurred area is determined, the blurred area can be recovered, so that the blurred pixels become clear and a clear image is obtained.

The process of recovering the burred area of the image to obtain a clear image will be further described below by embodiments with reference to the drawings.

At present, the main cameras of mobile devices such as mobile phones are all long-focus cameras. In the case of shooting a nearby object, distant objects are out of focus; while in the case of shooting a distant object, nearby objects are out of focus. In order to recover the blurred area to a clear state, in the present application, the raw image is deblurred based on the blur detection.

In a possible implementation of the embodiment of the present application, after the position of the blurred area in the image is detected, the image processing method may further include the following steps.

(1) The image is deblurred to obtain a first recovery image.

The first recovery image is an image obtained by deblurring the whole image. Not only the blurred areas in the image are deblurred, but also the clear areas in the image may be deblurred. However, the pixels obtained by deblurring the clear areas may not be as clear as the original. Therefore, it is necessary to process the first recovery image to obtain a finally processed image. The specific deblurring process will be described in detail below.

(2) Clear pixels in clear areas in the image are extracted based on the classification mask image.

Specifically, the position of the blurred areas in the image can be determined based on the classification mask image, and the position of the clear images can be then determined based on the position of the blurred regions, so that clear pixels in the clear areas are extracted.

(3) Pixels corresponding to clear areas in the first recovery image are replaced with the clear pixels to obtain a second recovery image.

In a possible implementation of the embodiment of the present application, without depending upon the blur detection, the image processing method may include the following steps.

The image is deblurred to obtain a first recovery image.

Clear pixels in clear areas in the image are extracted.

Pixels corresponding to clear areas in the first recovery image are replaced with the clear pixels to obtain a second recovery image.

Specifically, after the pixels in clear areas in the first recovery image are deblurred, the clarity of the obtained pixels may be lower than that of the clear pixels in the image, so that the pixels corresponding to the clear areas in the first recovery image are replaced with the clear pixels to obtain the finally processed second recovery image. The pixels in clear areas in the second recovery image are the pixels in the clear areas in the image, and the pixels in blurred areas in the second recovery image are pixels obtained after deblurring the blurred areas in the image.

The process of deblurring the image will be described below by specific embodiments with reference to the drawings.

In a feasible embodiment, deblurring the image to obtain a first recovery image includes:

performing feature extraction on the image to obtain a first extracted feature; and performing recovery, by at least one recovery module (e.g., a recovery neural network) and based on the first extracted feature, to obtain a first recovery image.

The reconstruction module including at least one recovery module will be described below with reference to FIG. 37.

Specifically, the reconstruction module may include a plurality of recovery modules, which may be referred to as multi-scale feature extraction modules or multi-scale residual group modules (MSRGMs). The features extracted by the previous modules and the deblurring results (i.e., recovery features) are adjusted more finely by the later modules, so that the deblurring effect is gradually improved.

In a feasible embodiment, if there are at least two recovery modules, performing recovery, by at least one recovery module, to obtain a first recovery image includes:

performing recovery, by at least two cascaded recovery modules, to obtain a first recovery image.

Figure 37:
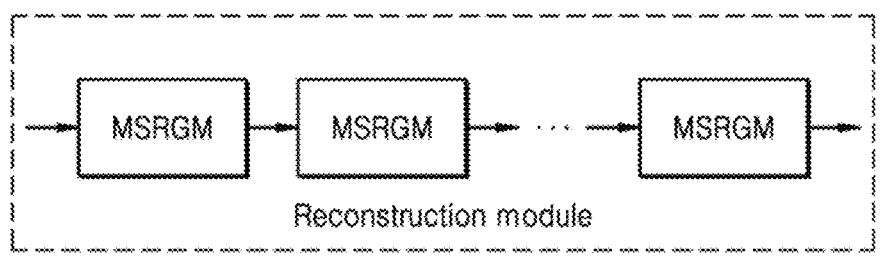
FIG. 37 is a schematic structure diagram of a reconstruction module in an example embodiment of the present application.

As shown in FIG. 37, a plurality of multi-scale feature extraction modules are arranged in cascade, and the features extracted by previous MSRGMs are re-learned and adjusted more finely by later MSRGMs.

In a feasible embodiment, performing recovery by any recovery module includes:

selecting a scale among preset scales based on an input feature of a recovery module;

based on the input feature, performing feature extraction according to the selected scale to obtain a corresponding scale feature; and determining and outputting a corresponding recovery feature based on the scale feature.

In one example, the specific process of performing recovery by each multi-scale residual group module will be described with reference to FIG. 38.

The MSRGM mainly consists of a residual group module (RGM) and a multi-scale feature map attention module. The MSRGM mainly includes feature information of three scales because the use of smaller scales of image features will cause the features to lose more information, which has a negative impact on the deblurring effect. At each scale, features are extracted by the RGM, and the extracted multi-scale features are fused. There are two fusion methods, one of which is concatenation in the channel dimension and the other of which is element-wise addition. As shown in FIG. 38, the size of the input feature MSRGMDE is H/4*W/4*C, and features are extracted by the first RGM. In addition, the input features are down-sampled at two scales to obtain H/8*W/8*C features and H/16*W/16*C features. Features are extracted by the second RGM and the third RGM, and the extracted features are up-sampled and fused with the features extracted by the first RGM and the input features to obtain H/4*W/4*4C features (which can also be referred to as scale features), and the scale features are input to the multi-scale feature map attention module.

Figure 39:
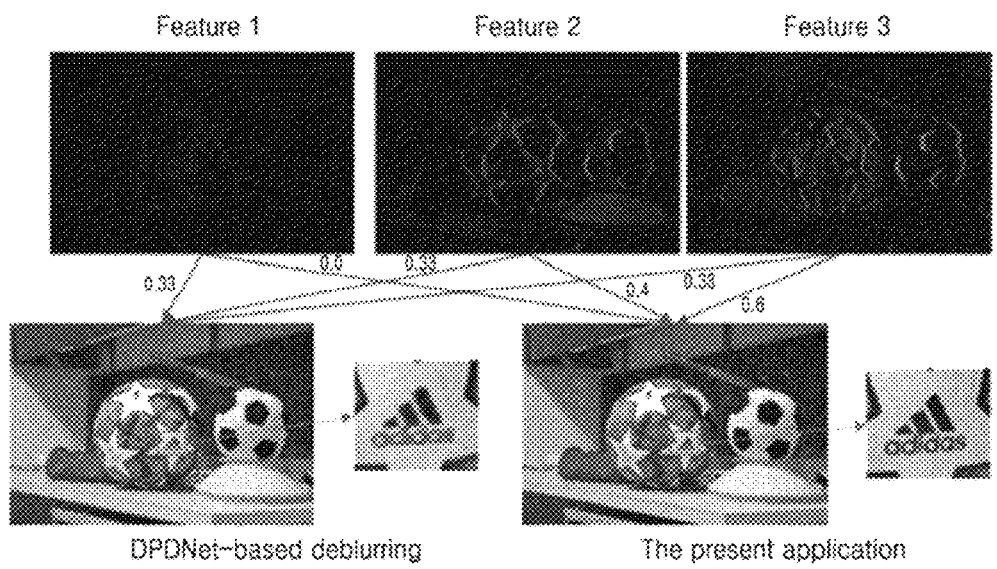
FIG. 39 is a diagram showing the comparison of deblurring effects between the related art and the present application.

Among the fused features, some features contain very little information or contain nose information, resulting in unsatisfactory deblurring effects. As shown in FIG. 39, feature 1 is a noise feature, and features 2 and 3 are useful features containing rich information. If the image is deblurred by the noise feature (based on digital pre-distortion network (DPDNet) deblurring), the deblurring performance will be reduced. Therefore, the present application proposes an adaptive feature selection module (i.e., multi-scale feature map attention module). If the multi-scale feature contains noise information, channel selection is performed for the multi-scale feature to remove the noise information and obtain a recovery feature, so that better deblurring effects are achieved.

Specifically, determining and outputting a corresponding recovery feature based on the scale feature includes: selecting a channel among channels with the scale feature; and, determining and outputting a corresponding recovery feature based on a channel feature corresponding to the selected channel.

Figure 38:
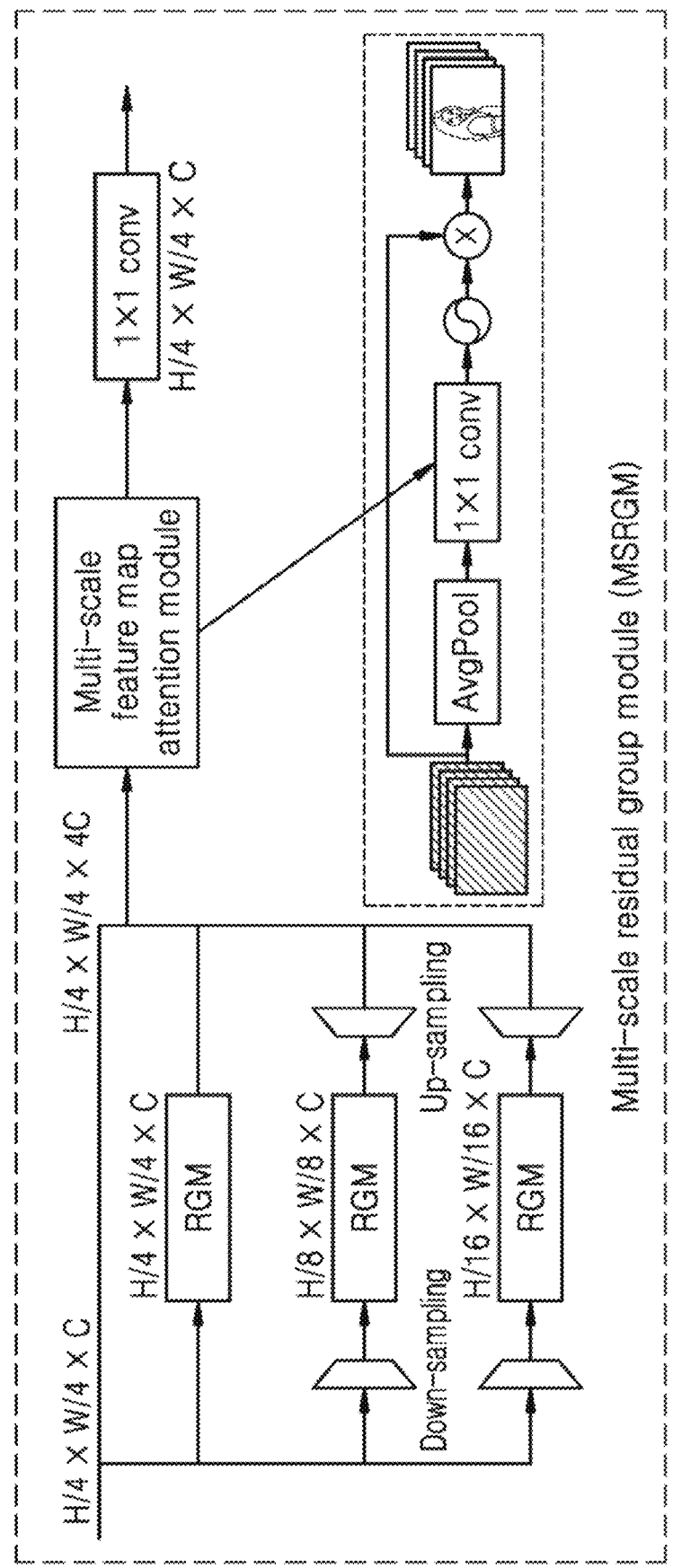
FIG. 38 is a schematic structure diagram of a multi-scale residual group module in an example embodiment of the present application.

As shown in FIG. 38, the multi-scale feature map attention module performs channel attention processing by average pooling (AvgPoll), 1*1 convolution and nonlinear transformation operations (corresponding to ⊙ in the figure, where the operation is an activation function and is then multiplied by the scale feature, so that a channel is selected among channels with the scale feature. The feature output by the multi-scale feature map attention module can be subjected to one 1*1 convolution to obtain a recovery feature.

Figure 40:
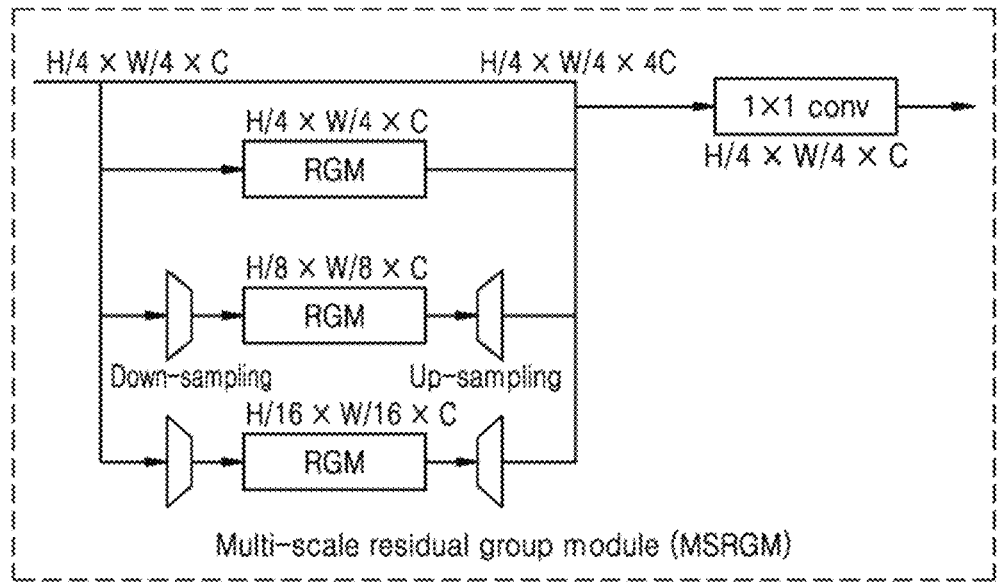
FIG. 40 is a schematic structure diagram of a multi-scale residual group module not including an adaptive feature selection module in an example embodiment of the present application.

In some platforms with limited computing resources, in the present application, the adaptive feature selection module will be omitted to improve the running speed of the network at the expense of some performances. As shown in FIG. 40, there is no multi-scale residual group module of the adaptive feature selection module.

Figure 41:
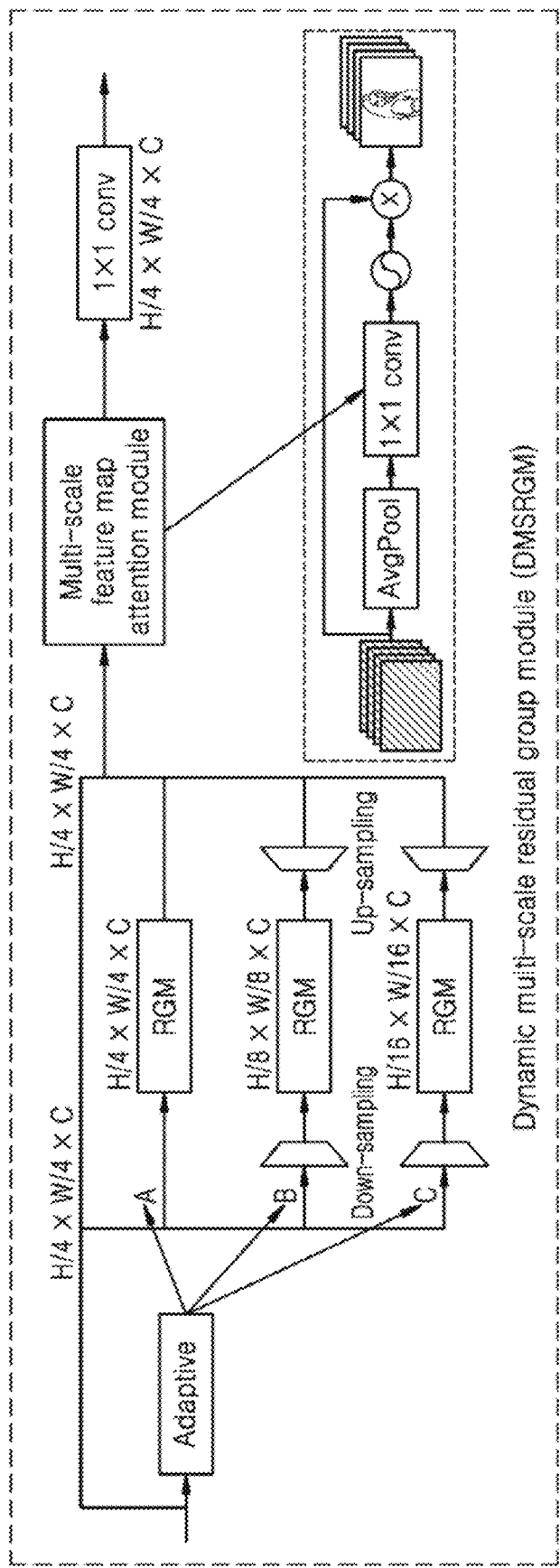
FIG. 41 is a schematic structure diagram of a dynamic multi-scale residual group module in an example embodiment of the present application.

Different blurred area distributions of different images are taken into consideration. If the same multi-scale feature extraction module is used in blurred images with different distributions, the robustness of the model will be very low, resulting in a very good deblurring effect for a certain blur distribution and a very poor deblurring effect for another blur distribution. Therefore, the present application further proposes an adaptive multi-scale residual group module (i.e., a dynamic multi-scale residual group module (DMSRGM), as shown in FIG. 41. In the present application, three learnable parameters (A, B, C) are set, and one or more particular scales for deblurring are adaptively selected according to the input image to improve the deblurring performance.

Figure 42:
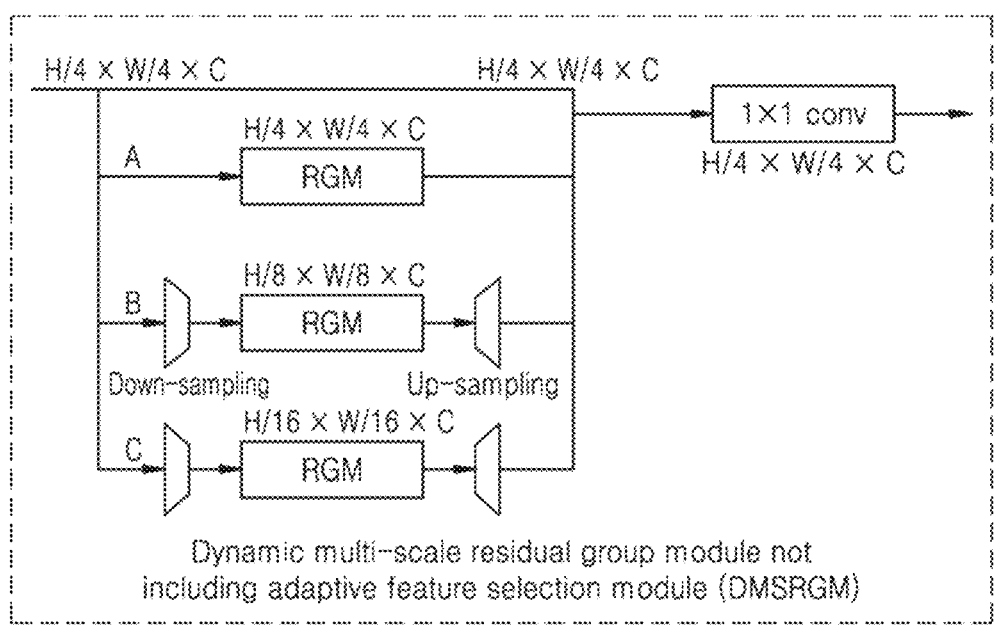
FIG. 42 is a schematic structure diagram of a dynamic multi-scale residual group module not including an adaptive feature selection module in an example embodiment of the present application.

However, when considering omitting the adaptive feature selection module to improve the running speed of the network, a dynamic multi-scale residual group module not including the adaptive feature selection module may be used, as shown in FIG. 42.

Figure 43:
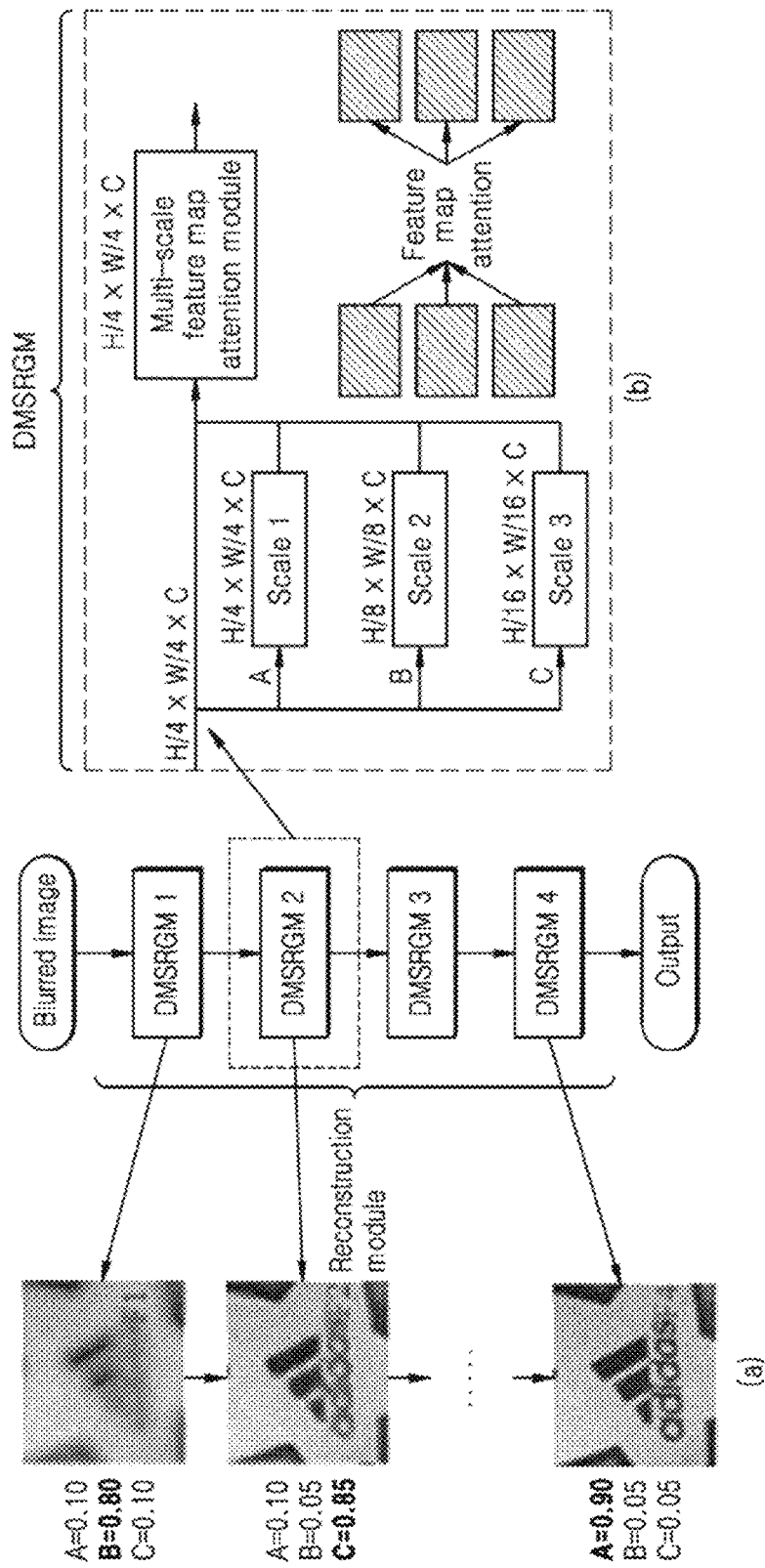
FIG. 43 is a schematic structure diagram of a reconstruction module in an example of the present application.

In specific applications, as shown in (a) of FIG. 43, for an unknown input, deblurring is performed on the second scale. Since the deblurred image contains a large amount of detailed information (the deblurred image from the first DMSRGM), a small-scale image may be selected for recovery in the present application. By adjusting the features extracted by the previous modules and the deblurring results more finely by using the later modules, the deblurred image will become clearer with the deepening of the network. In order to recover the high-quality image, a large scale may be used in the last module to reserve and recover a clearer image. In addition, considering that some feature channels have an adverse effect on deblurring, in the present application, the influence of noise passage on deblurring is reduced by the multi-scale feature map attention module, as shown in (b) of FIG. 43.

The structure of the multi-scale residual group module will be described below with reference to FIGS. 44A and 44B.

Figure 44A:
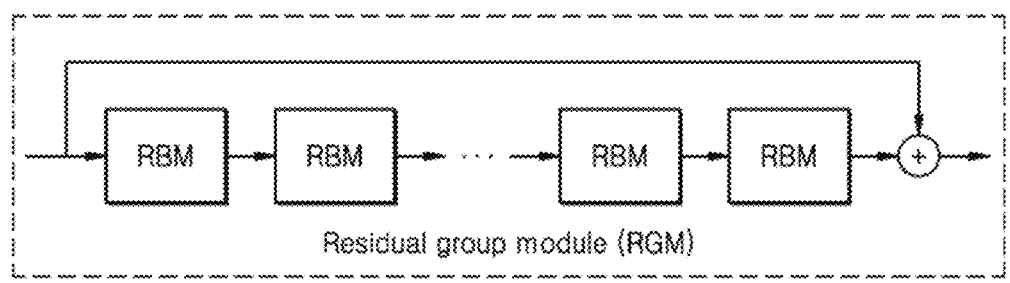
FIG. 44A is a schematic structure diagram of a residual group module in an example embodiment of the present application.
Figure 44B:
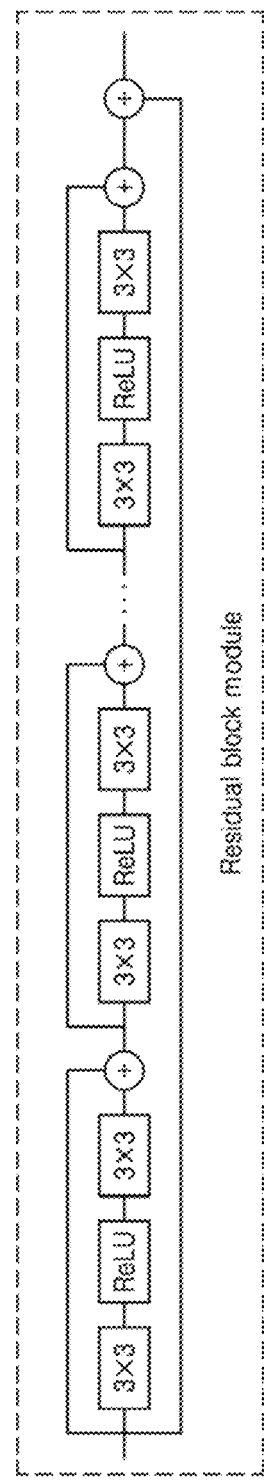
FIG. 44B is a schematic structure diagram of a residual block module in an example embodiment of the present application.

As shown in FIG. 44A, the residual group module (RGM) is the basic constituent unit of the multi-scale residual group module, and mainly consists of a plurality of residual block modules (RBMs). The residual block module (RBM) consists of a plurality of residual modules. As shown in FIG.

44B, the residual module contains two convolution operations (e.g., a convolution operation with a convolution kernel size of 3×3, corresponding to 3×3 in the figure) and one activation function (ReLU) to form a sub-module.

The present application proposes that features of different scales are fused by the multi-scale residual group module (MSRGM) to improve the expression ability and robustness of the model. However, the features of different scales and different channels have different effects on the deblurring result, and some channel features have an adverse effect on the deblurring result. In the present application, the multi-scale feature map attention network is used to focus on features with richer information, and these features with low efficiency are ignored.

In a feasible embodiment, performing recovery by at least one recovery module to obtain a first recovery image includes:

performing dimension raising on the recovery feature output by the last recovery module to obtain a first recovery image.

Figure 33A:
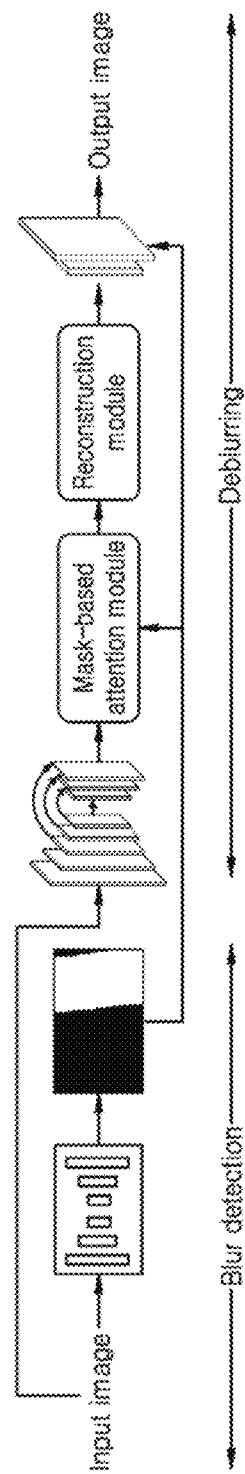
FIG. 33A is a flowchart of blur detection and deblurring in an example embodiment of the present application.
Figure 33B:
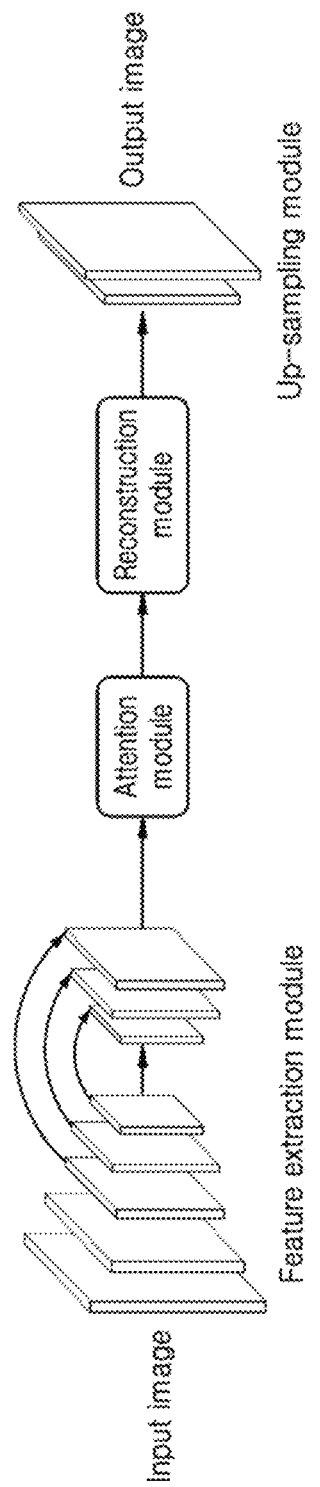
FIG. 33B is a flowchart of deblurring in an example embodiment of the present application.

As shown in FIGS. 33A and 33B, after the recovery feature is obtained by performing recovery based on the reconstruction module (recovery module), dimension raising may be performed on the recovery feature by using an up-sampling module to obtain the output first recovery image.

In a feasible embodiment, as shown in FIGS. 33A and 33B, the image processing method further includes:

determining a similar matrix based on similarity between pixels in the first extracted feature;

determining a corresponding mask matrix based on clear pixels and blurred pixels in the classification mask image; and determining a mask feature based on the similar matrix and the mask matrix, and inputting the mask feature to a recovery module for recovery.

Specifically, as shown in FIGS. 33A and 33B, before the first extracted feature is input into the reconstruction module for processing, the first extracted feature may be input to a mask-based attention module for processing to obtain a mask feature, and the mask feature is used as the input of the reconstruction module.

The structure of the deblurring neural network for deblurring the image according to the embodiment of the present application will be described below with reference to FIG. 33B.

The structure of the deblurring neural network mainly consists of four parts, i.e., a feature extraction module (also referred to as a down-sampling module), a mask-based attention module, a reconstruction module and an up-sampling module.

The feature extraction module may extract and down sample multi-scale features of the input image to quicken the speed of the neural network. Specifically, the image may be down-sampled for a set number of times (e.g., 16 times). The down-sampling may be performed by convolution or pooling at a set step (e.g., a step of 2). The reasoning speed of the network is quickened by down-sampling. Meanwhile, a large amount of detailed information will be lost by down-sampling, so the down-sampled features will be up-sampled for a set number of times (e.g., 4 times) in the present application. On one hand, more detailed information of the input feature is protected; on the other hand, the speed of the network can be quickened.

The mask-based attention module may use pixels in clear areas to enhance pixels in blurred areas while the pixels in the clear areas are not damaged by the pixels in the blurred areas, so that the deblurring effect is improved.

The reconstruction module may include a plurality of multi-scale feature extraction modules. The features extracted by the previous modules and the deblurring result are adjusted more finely by the later modules, so that the deblurring effect is gradually improved.

The up-sampling module may mainly recover the deblurred image to the original input size.

The specific implementation of the mask-based attention module in the structure of the deblurring neural network will be described below with reference to FIG. 34 (it is specifically used to mask the first extracted feature to obtain a mask feature).

Figure 34:
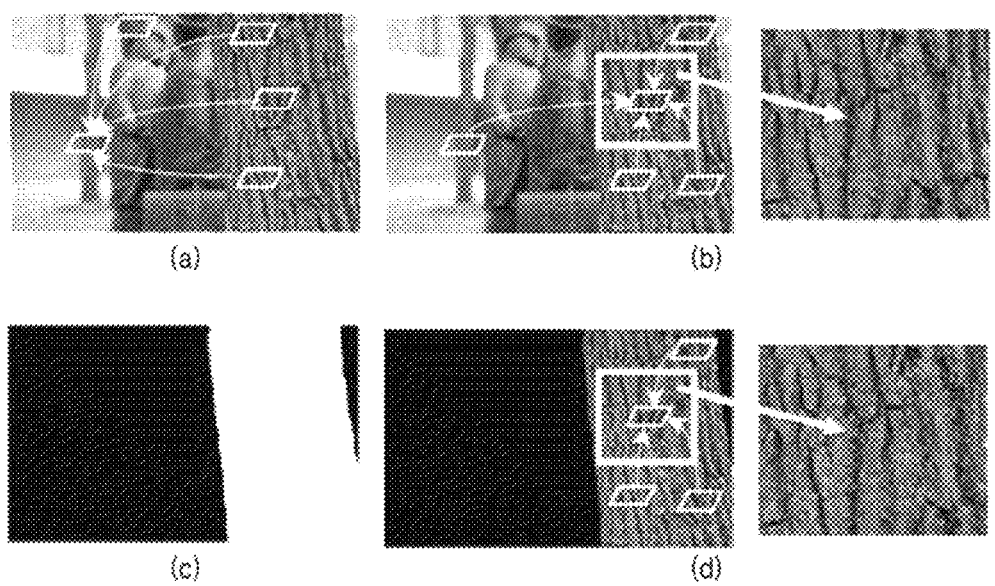
FIG. 34 is a schematic diagram of a mask-based attention mechanism in an example embodiment of the present application.

As shown in FIG. 34, the blurred image contains clear areas and blurred areas. Some areas have similar attributes. For example, four boxes on the right of image (a) of FIG. 34 show the clear trunk and one box on the corresponding left shows the blurred trunk. Because the semantic attributes of these boxes are the trunk, the clear trunk may be used to enhance the blurred trunk, so that the deblurring effect can be improved. However, this action is mutual, that is, clear pixels can enhance blurred pixels, and blurred pixels can also damage clear pixels. As shown in image (b) of FIG. 34, the box on the right shows the clear trunk, but it is damaged by blurred pixels. Therefore, the present application proposes a mask-based attention module which may use clear pixels to enhance blurred pixels while clear pixels will not be damaged by blurred pixels. The blurred mask image is generated by the blur detection network, and may be the classification mask image described above. As shown in image (c) of FIG. 34, the blurred mask image (c) generated by blur detection is used to delete blurred areas in the image so as to avoid the influence of the blurred areas on the clear areas.

Specifically, determining a mask feature based on the similar matrix and the mask matrix includes:

multiplying the similar matrix and the mask matrix to obtain a mask-similar matrix; and multiplying the mask-similar matrix and the first extracted feature to obtain the mask feature.

Figure 35:
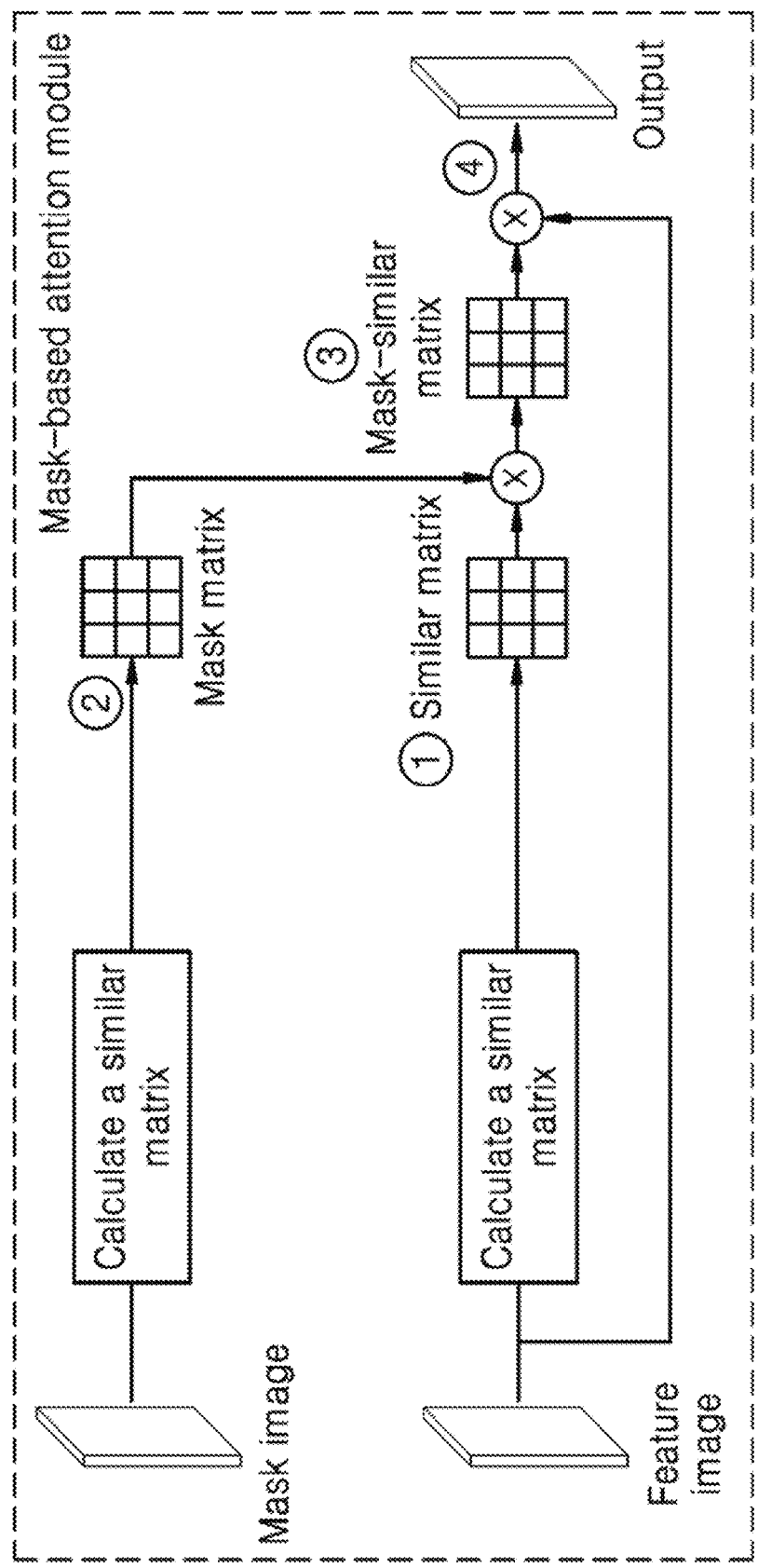
FIG. 35 is a schematic diagram of a mask-based attention module in an example embodiment of the present application.

Specifically, as shown in FIG. 35, in C, for the feature image (the first extracted feature), the similar matrix is determined by calculating the similarity between pixels. By the processing in this operation, the blurred areas can be enhanced by the clear pixels, and the blurred pixels will damage the clear pixels. In ②, in order to enhance the blurred pixels by the clear pixels while the clear pixels are not damaged by the blurred pixels, a mask matrix is proposed.

Any value in the mask matrix represents the relationship between a first pixel and a second pixel in the classification mask image, and the corresponding value in the mask matrix is 0 when the first pixel is a clear pixel and the second pixel is a blurred pixel.

In the mask matrix, the relationship between i and j (the relationship between the first pixel and the second pixel) is represented by (i, j)=1 in the present application. Therefore, in the present application, the relationship between a clear pixel and a blurred pixel is set according to the blurred mask: (blur, clear)=1, and (clear, blur)=0, (blur, clear)=1 indicates that the blurred pixel can be enhanced by the clear pixel (the first pixel is a blurred pixel and the second pixel is a clear pixel), and (clear, blur)=0 indicates that the blurred pixel will not damage the clear pixel (the first pixel is a clear pixel and the second pixel is a blurred pixel). In ③ of FIG. 35, the relationship between clear pixels and blurred pixels in the similar matrix is deleted by the mask matrix to obtain a mask-similar matrix. In ④ of FIG. 35, by multiplying the mask-similar matrix and the first extracted feature, the blurred pixels can be enhanced by the clear pixels while the clear pixels are not damaged by the blurred pixels, and the mask feature is finally output.

The specific processing operation of the mask-based attention module will be described below with reference to FIG. 36.

Figure 36:
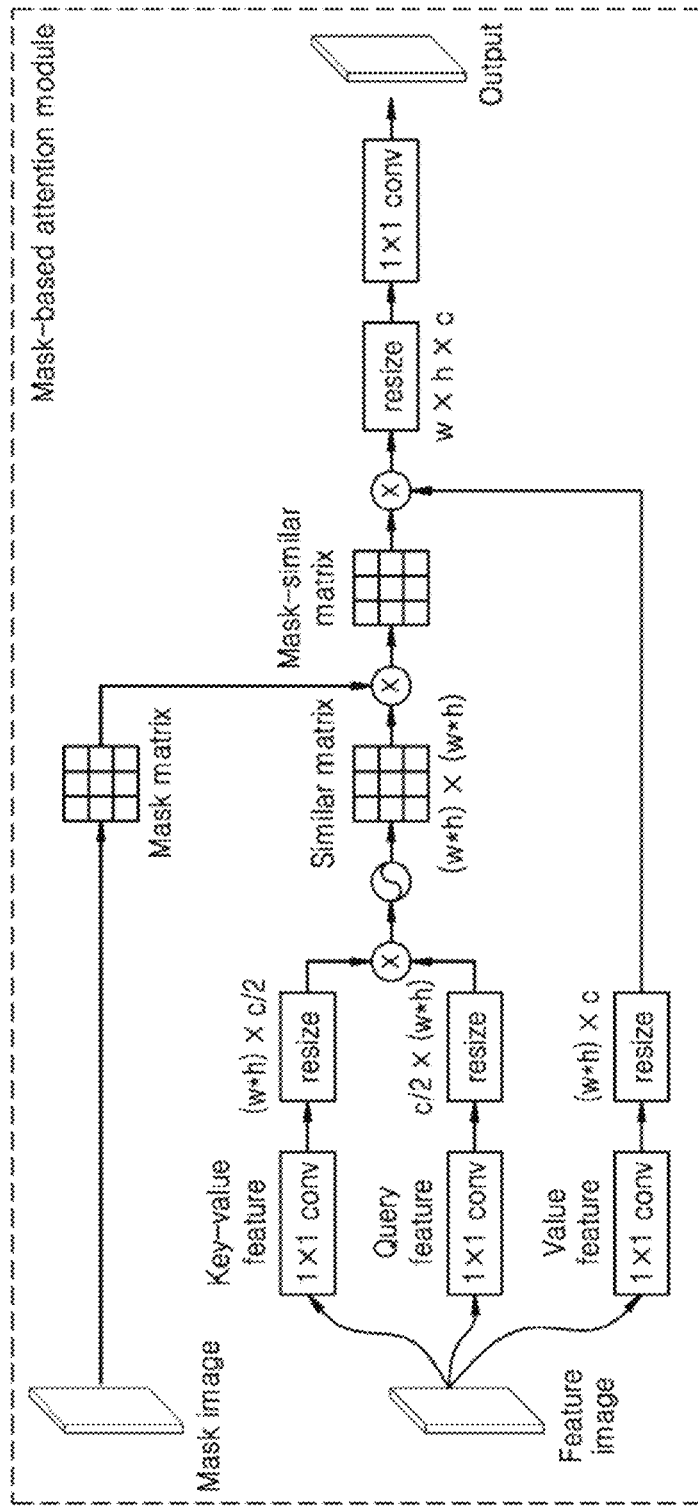
FIG. 36 is a schematic structure diagram of a mask-based attention module in another example embodiment of the present application.

As shown in FIG. 36, a query feature may be input into the convolution operation (e.g., a convolution operation with a convolution kernel size of 1×1, corresponding to 1×1 conv in the figure) for dimension reduction and then subjected to a resize operation to obtain a matrix (h*w)×(c/2), where w represents the width of the feature image (corresponding to the first extracted feature in the above embodiment), h represents the height of the feature image, and c represents the number of channels of the feature image. a key-value feature is subjected to two convolution operations (e.g., convolution operations with a convolution kernel size of 1×1, corresponding to 1×1 conv in the figure) to obtain a key feature (c/2)×(h*w) and a value feature (h*w)×c, respectively. The similarity between the query feature and the key-value feature is calculated to obtain a similar matrix of the two features in the pixel dimension. As shown in FIG. 26, matrix multiplication is performed on the matrix (h*w)×(c/2) and the matrix (c/2)×(h*w), where ⓧ represents matrix multiplication. A similar matrix (w*h)×(w*h) is then obtained by an activation function (e.g., softmax function), where ⓒ represents the activation function.

The similar matrix contains not only the relationship indicating that clear pixels enhance blurred pixels, but also the relationship indicating clear pixels are damaged by blurred pixels. Therefore, in the present application, the relationship between clear pixels and blurred pixels is set as 0 according to the blurred mask image (mask image, corresponding to the classification mask image obtained by performing blur detection on the image in the above embodiment), indicating that the clear pixels will not be affected by the blurred pixels. In the mask matrix, (clear, blur)=0 indicates that the blurred pixels will not damage the clear pixels, and other relationships are set as 1. The relationship between clear pixels and blurred pixels in the similar matrix is deleted by the mask matrix to obtain a mask-similar matrix. Matrix multiplication is performed on the mask-similar matrix and the matrix (h*w)×c and a resize operation is performed to obtain a feature image w×h×c, and a fused feature (mask feature) is obtained by convolution (corresponding to 1×1 conv in the figure). The blurred pixels in the feature can be enhanced by the clear pixels, while the clear pixels will not be damaged, so that the deblurring effect is improved.

In the embodiments of the present application, the algorithm flow of deblurring can be implemented alone, that is, the input image can be directly deblurred, as shown in FIG. 33B. The algorithm flow of deblurring can be implemented in combination with the blur detection algorithm, that is, blur detection is performed firstly, followed by deblurring, as shown in FIG. 33A.

The entire flow of the blur detection and deblurring algorithms used in the present application will be described below with reference to FIG. 33A.

1. The image is input into an image blur detection network to obtain a classification mask image for blur detection.
2. It is determined whether the input image is blurred; the image is directly output if the image is clear; or otherwise, the image is input into a deblurring module.
3. The deblurring module (also referred to as multi-refinement Net, MRNet) recovers the input blurred image to a clear state. The MRNet mainly consists of a down-sampling module, a mask-based attention mechanism module, a reconstruction module and an up-sampling module.
   3.1 The down-sampling module performs multiple down-sampling operations to quicken the running speed of the neural network. On the other hand, the expression ability of features is enhanced by extracting the context information of the output blurred image.
   3.2 The mask-based attention mechanism module uses the mask image generated by the blur detection to make clear pixels enhance blurred pixels without being damaged by the blurred pixels, so that the quality of deblurring is improved.
   3.3 The reconstruction module mainly consists of a plurality of multi-scale feature extraction modules, and aims at recovering the blurred image to a clear state. The later modules adjust the previously recovered features more finely so as to gradually recover the image.
   3.4 The up-sampling module recovers the reconstructed features to the original dimension and outputs the deblurred image.

Specifically, in the present application, the scheme for deblurring only one image can be referred to as Single-MRNet (single-multi-refinement Net).

In a possible implementation of the embodiment of the present application, deblurring the image to obtain a first recovery image may include the following steps.

a. A twin image of the image is obtained, the deviation in spatial position between pixels in the twin image and pixels in the image is less than a preset deviation value.

The twin image may be an image identical to the image, or may be an image different from the image.

In one implementation, the image and the twin image may be obtained using the same camera module. The current sensor for receiving light in the camera module may consist of two photodiodes on the left and right, so two corresponding images will be shot, that is, the image and the twin image are shot. Since there is a positional deviation between the left and right sensors, there will be a small deviation in the spatial position between the pixels in the image and the pixels in the twin image.

b. Feature extraction is performed on the image and the twin image respectively based on a twin network to obtain a first extracted feature and a second extracted feature.

Specifically, in the process of performing feature extraction on the image and the twin image by the twin network, the weight of the twin network is shared.

c. The first extracted feature and the second extracted feature are aligned to obtain an aligned feature.

Specifically, feature alignment may be performed by down-sampling and pooling, or global feature alignment may be performed.

In one implementation, aligning the first extracted feature and the second extracted feature to obtain an aligned feature may include the following steps.

The first extracted feature and the second extracted feature are down-sampled, respectively. The down-sampling may be performed by pooling or convolution to realize feature alignment so as to obtain the aligned feature.

Specifically, the image and the twin image may be down-sampled for a set number of times (e.g., 16 times). The down-sampling may be performed by convolution or pooling at a set step (e.g., a step of 2). The deviation may be eliminated by down-sampling, so that left and right images are aligned. Meanwhile, a large amount of detailed information will be lost by down-sampling, so the down-sampled features will be up-sampled for a set number of times (e.g., 4 times) in the present application. On one hand, more detailed information of the input feature is protected; on the other hand, the speed of the network can be quickened.

In one implementation, aligning the first extracted feature and the second extracted feature to obtain an aligned feature may include the following steps.

c1: Any one of the first extracted feature and the second extracted feature is set as a query feature and the other one is set as a key-value feature.

Specifically, it is possible to set the first extracted feature as a query feature and the second extracted feature as a key-value feature. It is also possible to set the second extracted feature as a query feature and the first extracted feature as a key-value feature.

c2: The query feature is used into the key-value feature to obtain the aligned feature.

Specifically, fusing the query feature into the key-value feature to obtain the aligned feature may include:

① searching for an approximate feature similar to the key-value feature from the query feature, and fusing the approximate feature and the key-value feature to obtain a fused feature; and ② replacing the approximate feature in the query feature with the fused feature to obtain the aligned feature.

Figure 45:
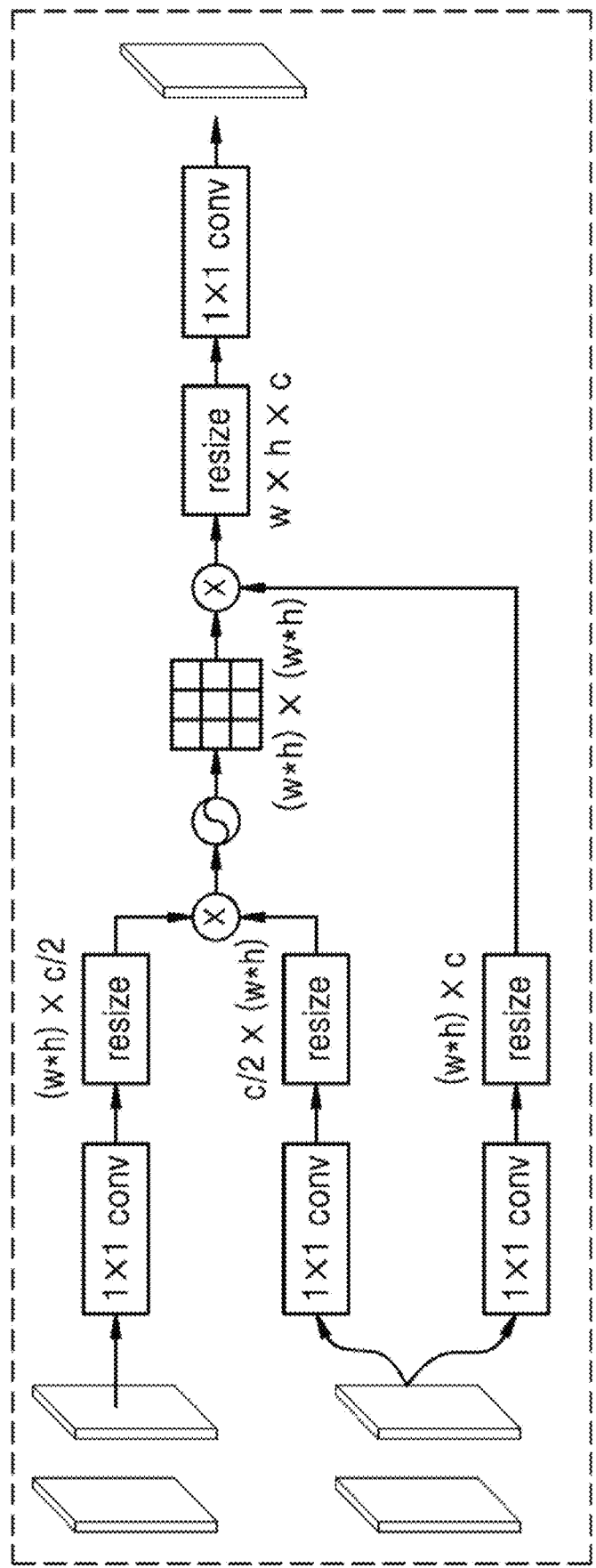
FIG. 45 is a schematic structure diagram of a network for feature alignment in an example embodiment of the present application.

As shown in FIG. 45, the query feature may be input into the convolution operation (e.g., a convolution operation with a convolution kernel size of 1×1, corresponding to 1×1 conv in the figure) for dimension reduction and then subjected to a resize operation to obtain a matrix (h*w)×(c/2), where w represents the width of the feature image, h represents the height of the feature image, and c represents the number of channels of the feature image. The key-value feature is subjected to two convolution operations (e.g., convolution operations with a convolution kernel size of 1×1, corresponding to 1×1 conv in the figure) to obtain a key feature (c/2)×(h*w) and a value feature (h*w)×c, respectively. The similarity between the query feature and the key-value feature is calculated to obtain a similar matrix of the two features in the pixel dimension. As shown in FIG. 28, matrix multiplication is performed on the matrix (h*w)×(c/2) and the matrix (c/2)×(h*w), where represents matrix multiplication. A similar matrix (w*h)×(w*h) is then obtained by an activation function (e.g., softmax function), where ⊙ represents the activation function. Finally, the query feature is fused into the key-value feature through the similar matrix. On one hand, the left and right features extracted by the feature extraction module are aligned; on the other hand, the expression ability of features is improved. As shown in FIG. 45, matrix multiplication is performed on the similar matrix and the matrix (h*w)×c, and a resize operation is performed to obtain a feature image w×h×c. Finally, an aligned feature is obtained by convolution (corresponding to 1×1 conv in the figure).

d. Deblurring is performed based on the aligned feature to obtain the first recovery image.

The deblurring may be performed by the method provided in the above embodiment. For example, one method is to perform feature reconstruction on the aligned feature to obtain the first recovery image. Further, the recovery feature may be output after feature reconstruction, and then dimension raising is performed on the recovery feature to obtain the first recovery image. In addition, the aligned feature may also be firstly input into the mask-based attention module for masking to obtain a mask feature, and the mask feature is then input into the reconstruction module (the method flow shown in FIG. 33A or 33B).

Specifically, features may be reconstructed based on the reconstruction module. The reconstruction module is configured to reconstruct the aligned feature to recover the aligned feature to a clear state. The reconstruction module may consist of a plurality of sub-modules, each of which may include a convolution layer and an activation function. As shown in FIG. 44B, two convolution operations (e.g., convolution operations with a convolution kernel size of 3×3, corresponding to 3×3 in the figure) and one activation function (ReLU) form one sub-module. For example, each sub-module includes one 3×3 convolution operation, one activation function (ReLU) and one 3×3 convolution operation. Then, a plurality of sub-modules form the reconstruction module.

In a possible implementation of the embodiment of the present application, the performing feature extraction on the image and the twin image respectively to obtain a first extracted feature and a second extracted feature includes:

performing feature extraction on the image and the twin image respectively after dimension reduction to obtain a first extracted feature and a second extracted feature.

Specifically, dimension reduction may be performed before feature extraction to quicken the reasoning speed of the network.

The performing feature reconstruction on the aligned feature to obtain the first recovery image may include:

d1: performing feature reconstruction on the aligned feature to obtain a reconstructed feature; and d2: performing dimension raising on the reconstructed feature to obtain the first recovery image.

Specifically, the dimension raising may include up-sampling, deconvolution, nearest interpolation and other methods, so that the reconstructed feature has the same dimension as the image.

Figure 46:
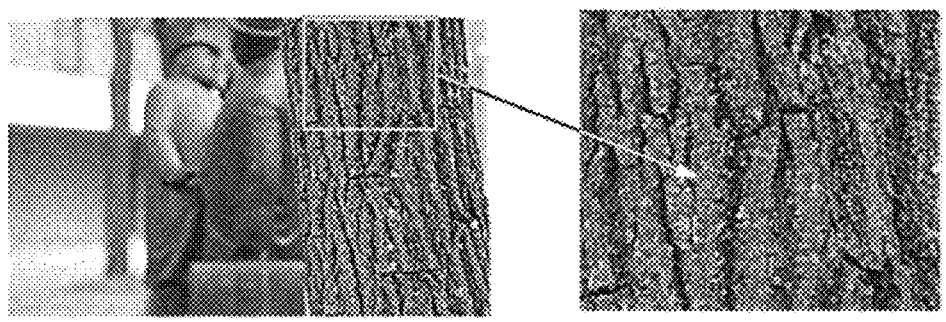
FIGS. 46 and 47 are schematic diagrams showing the comparison between an image and a second recovery image in an example embodiment of the present application.
Figure 47:
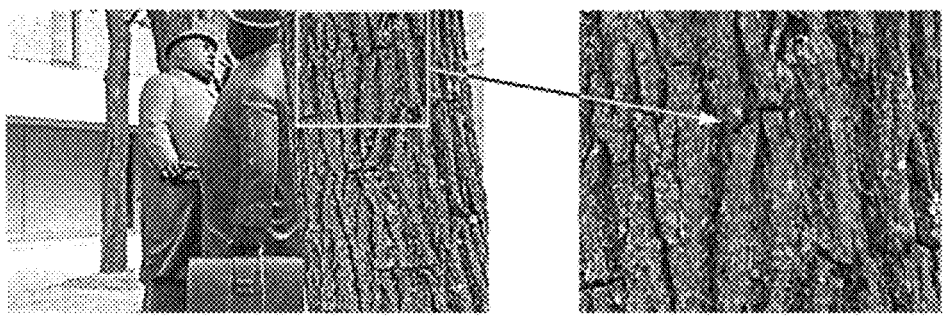

Due to the robustness of the deblurring algorithm, the originally clear area in the image will be affected by the blurred area, so that the originally clear area becomes blurred. As shown in FIG. 46, the left part of FIG. 46 shows the image, and the right part shows the clear area in the image. FIG. 47 is the deblurred image of FIG. 46. It can be known that the originally clear area becomes more blurred after the image is deblurred.

Therefore, in the present application, it is possible that the image is firstly deblurred to obtain a first recovery image and the final second recovery image is then obtained according to the first recovery image and the clear areas in the image. It is also possible that the blurred areas and the clears in the image are separated and only the blurred areas are deblurred.

In the above embodiment, the image is deblurred, and the second recovery image is then obtained in combination with the clear pixels in the image. In another implementation, it is also possible that only blurred areas in the image are deblurred.

Specifically, in the present application, the scheme for deblurring dual inputs corresponding to the twin network may be referred to as dual-multi-refinement network (Dual-MRNet).

Figure 48:
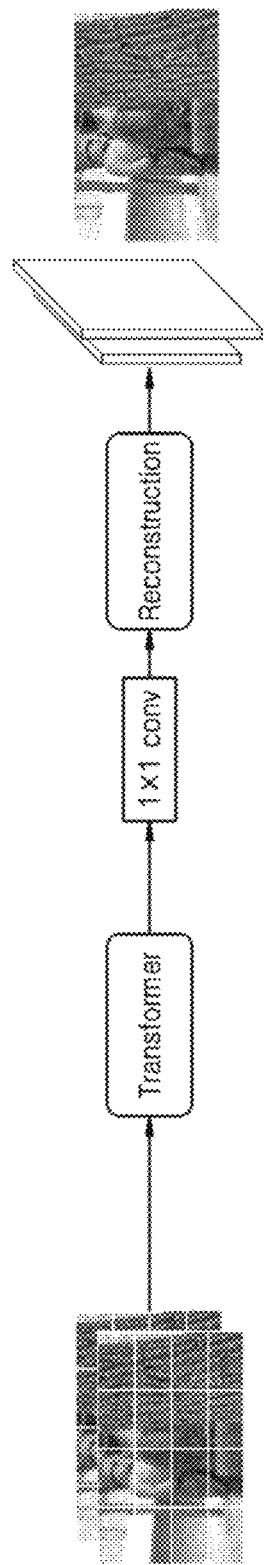
FIG. 48 is an architecture diagram of a transformer based image deblurring neural network in an example embodiment of the present application.

In a feasible embodiment, the present application proposes another implementation of feature extraction. The feature extraction module based on the convolutional neural network is replaced with a transformer architecture to improve the expression ability of the model. Compared with the convolutional neural network, the transformer has a global receptive field, so that global features of the input image may be extracted. Meanwhile, the feature expression ability is very high. However, the transformer requires a lot of data for training. If the amount of data is small, the training effect is not as good as that of the convolutional neural network. The convolutional neural network has strong inductive bias characteristics, and strong fitting capabilities even on small data sets. Therefore, in the present application, the transformer and the CNN are combined to improve the deblurring performance of the image. As shown in FIG. 48, a transformer-based image deblurring neural network architecture is shown. The architecture proposed in the present application may not only take advantage of the strong feature extraction capability of the transformer, but also utilize the strong fitting capability of the CNN, so that the deblurring effect is further improved.

Figure 49:
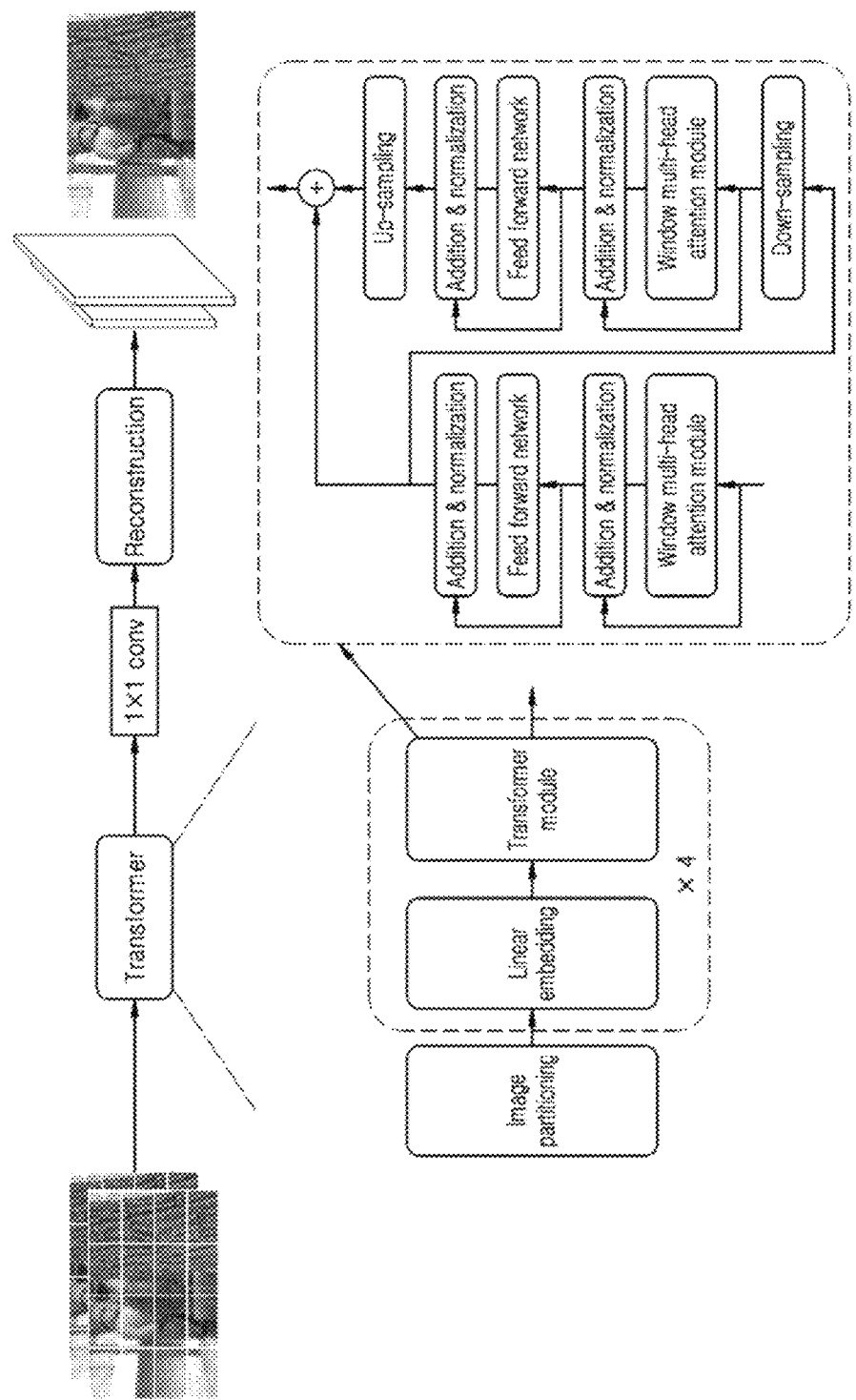
FIG. 49 is an architecture diagram of a transformer in an example embodiment of the present application.

As shown in FIG. 49, the transformer-based image deblurring neural network architecture may include a transformer-based feature extraction module and the existing multi-scale feature reconstruction module. The transformer is configured to extract richer features, and the reconstruction module recovers the blurred image to a clear state by using better features.

Specifically, performing feature extraction on the image to obtain a first extracted feature includes the following steps.
  (1) At least two feature blocks (patches) corresponding to the image are determined. Specifically, the image may be equally divided into a plurality of feature blocks.
  (2) The feature of each feature block is represented by a one-dimensional vector to obtain a feature vector (referred to as a token) corresponding to each feature block.
  (3) Feature extraction is performed on a feature matrix consisting of a plurality of feature vectors to obtain an extracted vector feature.
  (4) Feature reconstruction is performed on the extracted vector feature to obtain a first extracted feature.

Specifically, feature extraction is performed on the feature matrix consisting of a plurality tokens by a transformer module.

The transformer module consists of a plurality of transformer blocks. The transformer may consist of a multi-head attention module, a layer normalization module and a feed forward network.

The performing feature extraction on a feature matrix consisting of a plurality of feature vectors to obtain an extracted vector feature may include:
  determining a vector-similar matrix based on the similarity between feature vectors in the feature matrix consisting of at least two feature vectors; and
  performing, based on the vector-similar matrix, fusion, feedforward and normalization on the feature vectors to obtain the extracted vector feature.

As shown in FIG. 49, for the input embedded features (feature vectors), the similarity between tokens is calculated by the multi-head attention module; information fusion is performed on different embedded features by the vector-similar matrix; the fused feature is subjected to layer normalization and added with the input embedded features; and, feature extraction is completed by the feed forward network and layer normalization.

The most computationally intensive part of the transformer in the related art is the multi-head attention module. Therefore, in the present application, the multi-head attention module in the related art is improved, and a window multi-head attention module is proposed. The specific implementation is to divide each feature into blocks and perform multi-head attention calculation in each block. However, this partitioning strategy will lead to no information communication between windows. Therefore, in the present application, the features are firstly down-sampled (i.e., patch merging) in the next transformer block, and features are extracted by the same window multi-head attention module. Although the windows of the same size are used after down-sampling in the present application, the receptive field will become larger, so that the information that is not originally communicated will be communicated. Finally, the features extracted by the previous transformer block and the information after patch merging are fused.

Figure 50:
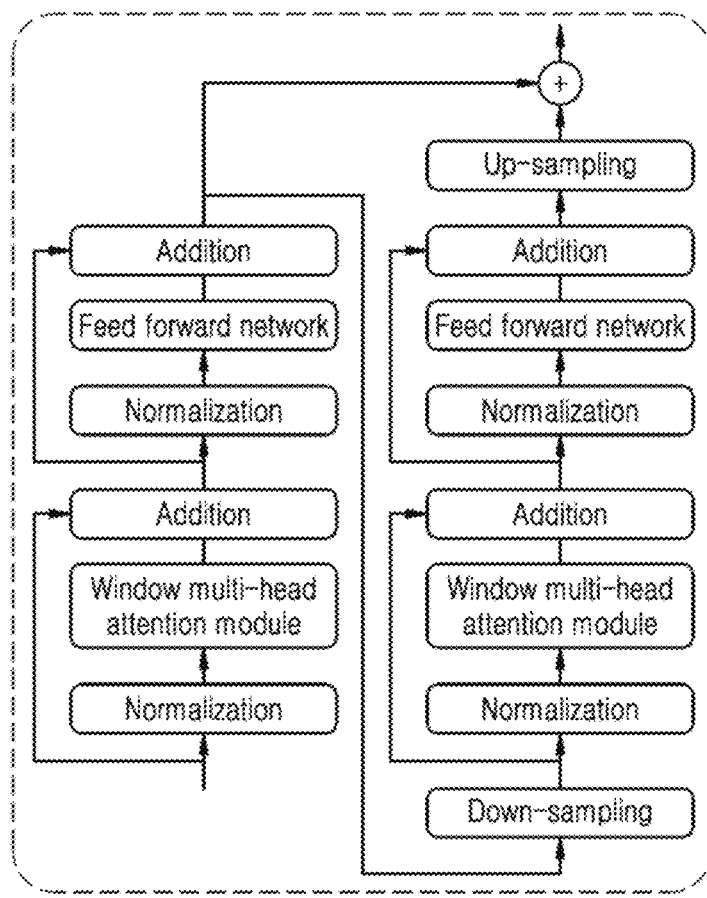
FIG. 50 is an architecture diagram of a transformer in another example embodiment of the present application.

The transformer in FIG. 49 performs post-normalization, but the scheme in the above embodiment may also adopt pre-normalization in FIG. 50.

Feature construction is performed based on the reconstruction module provided in the above embodiment, and the reconstruction module may adopt any form of the multi-scale feature extraction module mentioned above.

In a possible implementation of the embodiment of the present application, after the position of the blurred area in the image is determined, the image processing method may further include the following steps.
  (1) The image is divided into a blurred area and a clear area based on the determined position of the blurred area.
  (2) The blurred area is deblurred to obtain a third recovery image.
  (3) A fourth recovery image is obtained based on the clear area and the third recovery image.

The specific process of deblurring the blurred area may be the same as the process of deblurring the image in the above embodiment, and will not be repeated here.

Specifically, the blurred area and the third recovery image may be concatenated to finally obtain a deblurred fourth recovery image corresponding to the image.

Figure 51A:
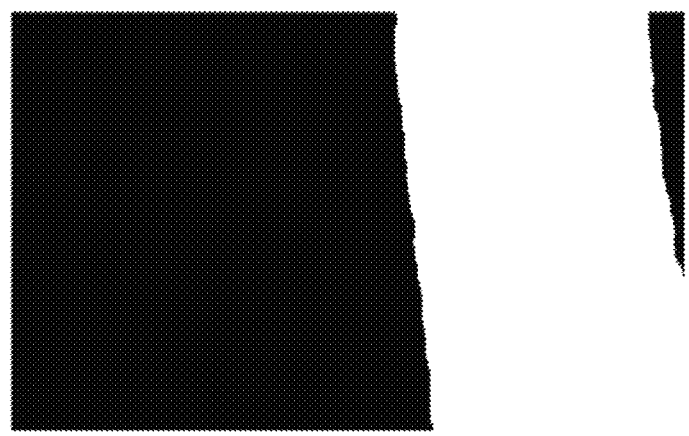
FIG. 51A is a schematic diagram of the blur detection result in an example embodiment of the present application.
Figure 51B:
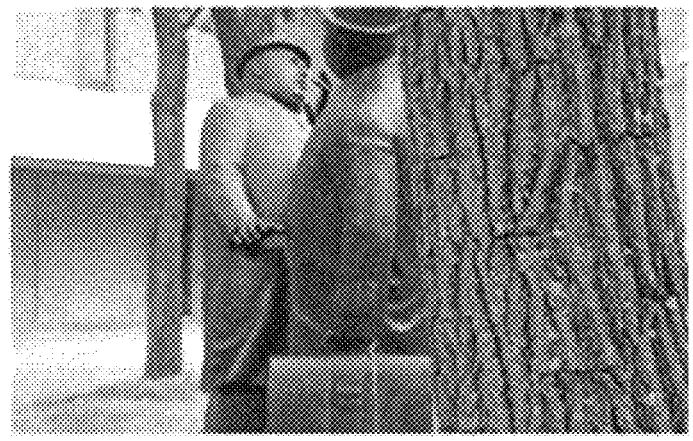
FIG. 51B is a schematic diagram of a fourth recovery image in an example embodiment of the present application.

As shown in FIGS. 51A-51B, FIG. 51A is a schematic diagram of the blur detection result, and FIG. 51B is a schematic diagram of the second recovery image or fourth recovery image obtained by the deblurring method. It can be known that, by firstly determining the position of the blurred area and then using the deblurring method according to the present application, the blurred area in the final recovery image becomes clear and the originally clear area also maintains the original clarity.

In order to explain the deblurring process more clearly, further description will be given below by examples with reference to the drawings.

Figure 52A:
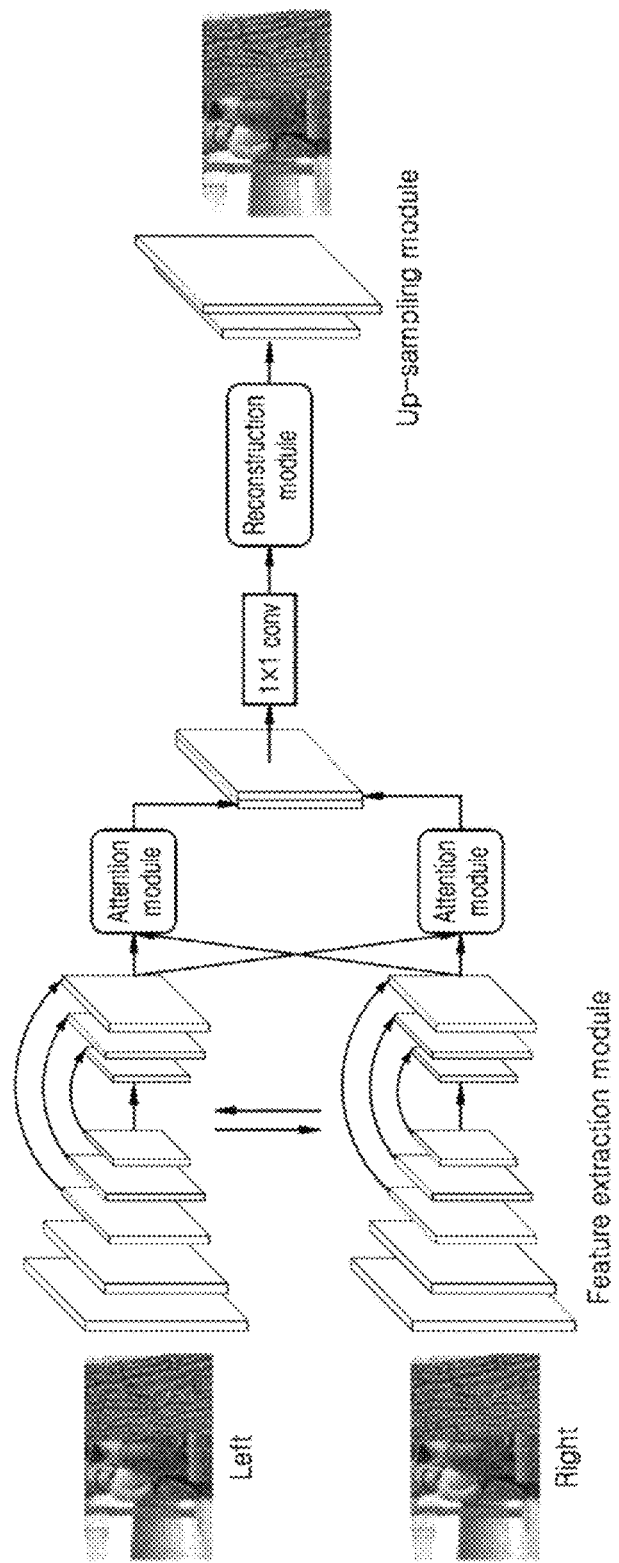
FIG. 52A is a schematic diagram of a deblurring scheme in an example embodiment of the present application.

As shown in FIG. 52A, in one example, image deblurring may be performed by a defocusing and deblurring neural network. The defocusing and deblurring neural network may consist of four modules, i.e., a feature extraction module, an attention module, a reconstruction module and an up-sampling module.

The image deblurring process according to the present application may include the following steps.
  1) A twin image of an image is obtained, the image corresponding to the "left" image in the figure, the twin image corresponding to the "right" image in the feature.

2) Feature extraction is performed on the image and the twin image based on the feature extraction module, respectively, that is, feature extraction is performed on the left image and the right image.
3) The extracted features are aligned based on the attention module to obtain an aligned feature. The neural network structure of the attention module may be implemented as shown in FIG. 45.
4) The aligned feature is reconstructed based on the reconstruction module to obtain a reconstructed feature. The structure of the reconstruction module may be implemented as shown in FIG. 38, 40, 41, 42 or 44B.
5) Dimension raising is performed on the reconstructed feature based on the up-sampling module to obtain a second recovery image.

In the above embodiment, the image is firstly deblurred to obtain a first recovery image, and the final second recovery image is then obtained according to the first recovery image and the clear areas in the image. Alternatively, the blurred areas and clear areas in the image are separated, and only the blurred areas are deblurred. Thus, the blurred areas in the final recovery image become clear, and the originally clear areas also maintain the original clarity.

Figure 52B:
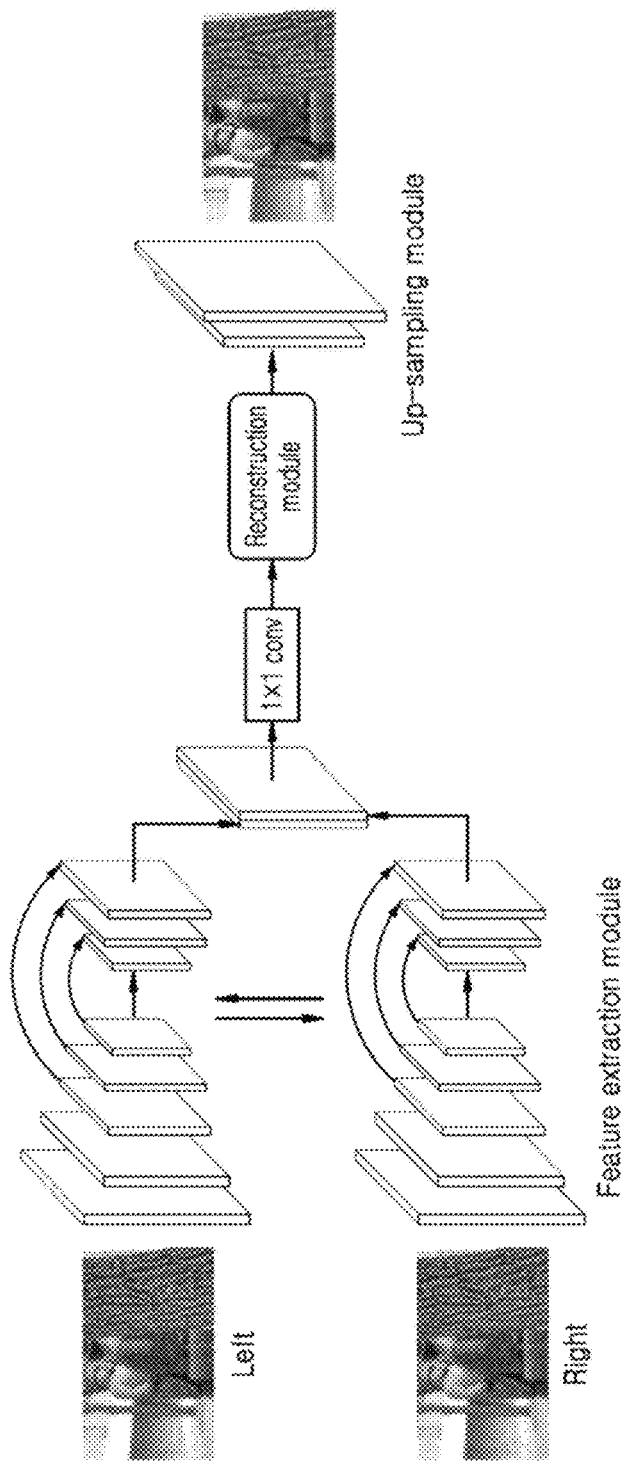
FIG. 52B is a schematic diagram of a deblurring scheme in an example embodiment of the present application.

In addition, the present application proposes that feature alignment may be realized by the feature extraction module since the deviation between the image and the twin image is small, so the defocusing and deblurring neural network may not include the attention module, as shown in FIG. 52B. Thus, the time can be saved, and the complexity of the space can be reduced.

In a possible implementation of the embodiment of the present application, step S1801 of classifying pixels of the image to be processed to obtain a classification mask image may include:
(1) determining the state of a terminal for obtaining the image to be processed; and
(2) obtaining a classification mask image if the terminal is in a static state.

Specifically, it can be determined whether the terminal for acquiring the image is moving by using the change of feature points of the image within a preset period of time. If it is determined that the terminal is moving, the acquired image must be a blurred image. If it is determined that the terminal is in a static state, it is necessary to further determine whether the acquired image is a blurred image, execute the step of obtaining the classification mask image and perform blur detection on the image.

The specific application scenario of the image processing method of the present application will be described below by specific examples.

In one example, the image processing method of the present application may be applied to the real-time blur detection schemes for cameras.

Figure 53:
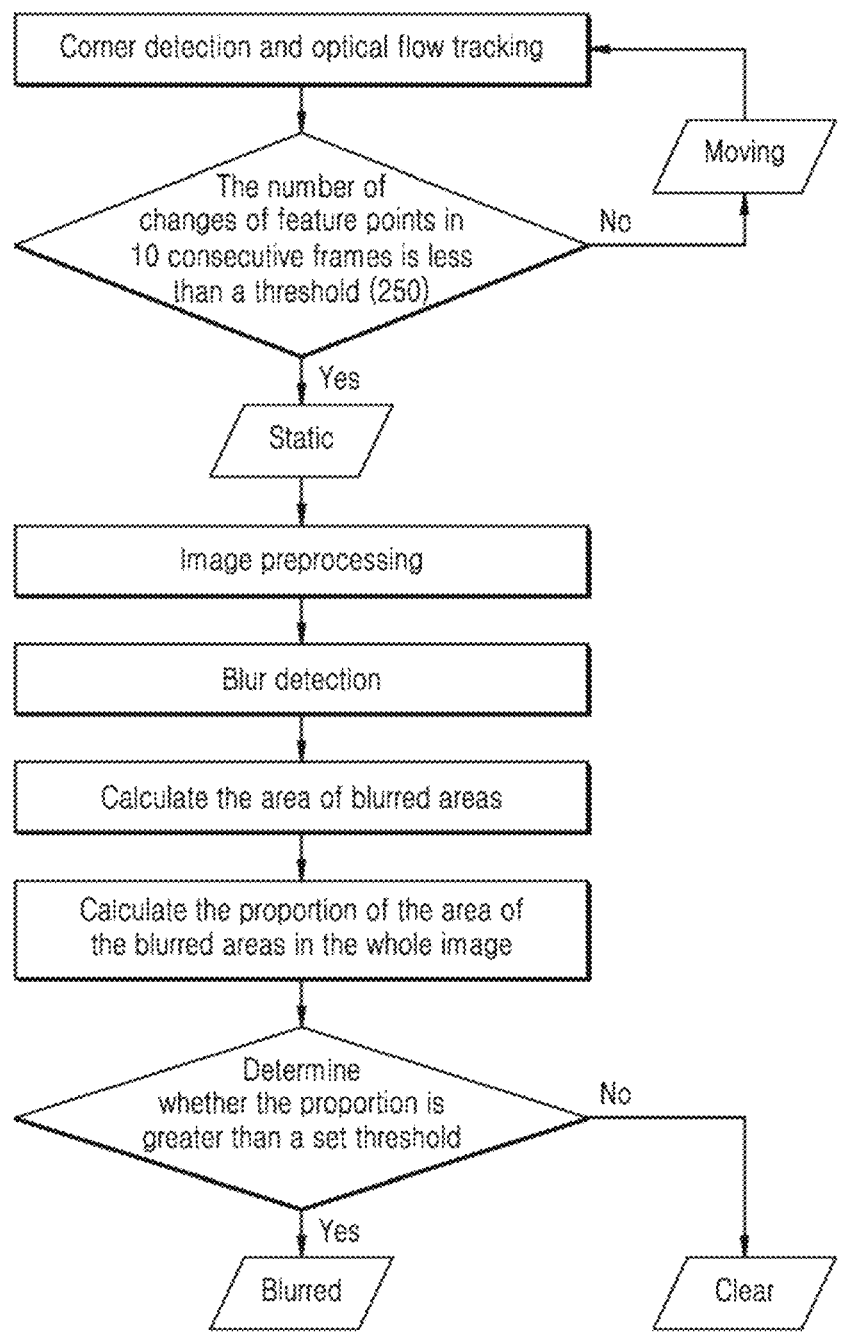
FIG. 53 is a flowchart of an image processing method according to an example embodiment of the present application.

The mobile terminal integration method needs to consume less computing resources, and adopts low-channel, low-dimension and low-input schemes in terms of network model design. Meanwhile, out-of-focus blur often occurs in a close-range scene. As shown in FIG. 53, the algorithm flow designed according to the characteristics will be described below.

S1: It is determined whether the camera is moving.

Specifically, the change of feature points of images acquired by the camera in 10 consecutive frames may be determined according to corner detection and optical flow tracking, and it is determined according to the number of changes of the feature points whether the camera is moving. If the camera is moving, the shot pictures must be in motion blurring; and, when the camera is in a static state, it is determined whether the shot pictures are blurred.

S2: The raw image is preprocessed. Since the raw image has high resolution, in order to quicken calculation, it is necessary to resize and crop the raw image.

S3: Blur detection is performed on the image by using the trained blur detection model.

S4: The proportion of the area of blurred areas in the whole image is calculated.

S5: If the proportion is greater than a set threshold, it is considered that the image is blurred; or otherwise, the image is clear.

Figure 54:
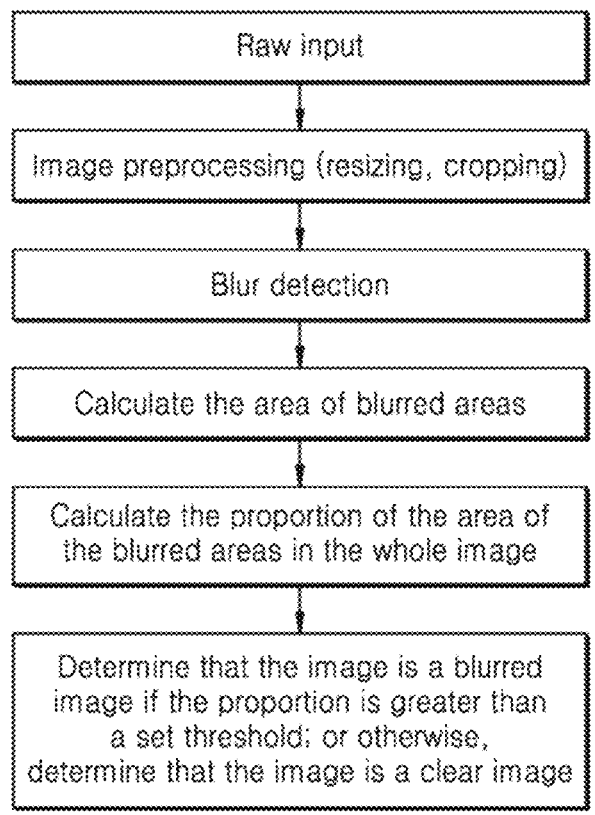
FIG. 54 is a flowchart of an image processing method according to an example of the present application.

In one example, as shown in FIG. 54, the image processing method of the present application may include the following steps.

S1: A raw image is preprocessed.

S2: The preprocessed image is input into the trained neural network model to obtain a classification mask image after blur detection.

S3: The area of blurred areas in the image is calculated. The specific implementation is to count the number of blurred pixels, i.e., the area of blurred areas.

S4: The proportion of the area of the blurred areas in the area of the whole image is calculated.

S5: If the proportion is greater than a set threshold, it is considered that the image is blurred; or otherwise, it is considered that the image is clear.

The effects achieved by the image processing method of the present application will be described below with reference to the drawings.

The blur detection scheme provided by the present application has a high identification rate, and can accurately identify blurred areas in the image when there are holes. Meanwhile, the blurred and non-blurred boundaries can be distinguished more accurately.

In the image processing method, by performing blur classification on pixels in the image to be processed to determine the pixels in the image as clear pixels or blurred images, generating a classification mask image according to the classification result of the pixels, and determining, based on the classification mask image, whether the image is a clear image or a blurred image, the classification is realized in the pixel level, and the accuracy of the blur detection result can be improved.

Further, by firstly resizing or cropping the image, the processing speed of the image can be increased.

Further, features of different scales may be fused by at least one down-sampling, thereby improving the expression ability of features. In addition, by a multi-stage fusion method, the calculation amount of low-scale features is much less than the calculation amount of high-scale features. Thus, multi-scale features may be fused, and the calculation amount is lower.

Further, in the process of extracting second feature images by a graph convolutional network, by fusing the aggregated feature with the features of the central node, it can be ensured that the features of the central node have original information and are assimilated as few as possible, so that the accuracy of the blur detection result is improved.

Further, by using dilated convolution, the receptive field can be increased without performing down-sampling to lose detailed information, and the extracted features are richer.

Further, a global image structure is established for each pixel in the image according to the similarity between features by using the improved graph convolutional network proposed in the present application, and it is determined whether a certain pixel is a blurred pixel from a global perspective. The accuracy of identification can be improved by the feature similarity between pixels. Thus, the problem that the blurred area in the hole cannot be identified can be effectively solved, and the blurred boundary can be determined more accurately.

Furthermore, the image is firstly deblurred to obtain a first recovery image, and the final second recovery image is then obtained according to the first recovery image and the clear areas in the image. Alternatively, the blurred areas and clear areas in the image are separated, and only the blurred areas are deblurred. Thus, the blurred areas in the final recovery image become clear, and the originally clear areas also maintain the original clarity.

Figure 55:
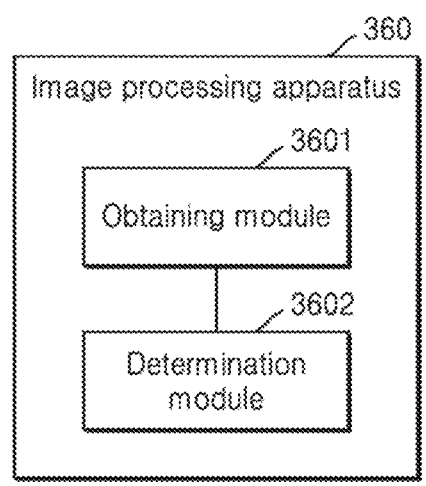
FIG. 55 is a schematic structure diagram of an image processing apparatus according to an embodiment of the present application.

The image processing method has been described in the above embodiments from the perspective of method flow, and will be described below from the perspective of virtual module, specifically:

An embodiment of the present application provides an image processing apparatus 360. As shown in FIG. 55, the apparatus 360 may include an obtaining module 3601 and a determination module 3602.

The obtaining module 3601 is configured to perform blur classification on pixels of an image to be processed to obtain a classification mask image.

The determination module 3602 is configured to determine the blur detection result of the image based on the classification mask image.

In a possible implementation of the embodiment of the present application, when the obtaining module 3601 performs blur classification on pixels of the image to be processed to obtain a classification mask image, it is specifically configured to:

perform feature extraction on the image to be processed via a number of cascaded first feature extraction units to obtain at least one corresponding first feature image;

perform, for at least one first feature image, feature extraction via a second feature extraction unit to obtain a corresponding second feature image, the second feature image being determined based on the relationship between different pixels on the first feature image; and generate the classification mask image based on at least one second feature image.

In a possible implementation of the embodiment of the present application, the second feature extraction unit is a graph convolutional network; and, when the obtaining module 3601 performs feature extraction for at least one first feature image via the second feature extraction unit, it is specifically configured to:

for at least one first feature image, construct a corresponding intimacy image, the intimacy image including a plurality of nodes and a plurality of edges, each of the plurality of nodes representing a pixel of the first feature image, each of the plurality of edges representing the similarity between the two pixels connected by the edge; and perform, according to the constructed intimacy image, by using the graph convolutional network, feature extraction to obtain a corresponding second feature image.

In a possible implementation of the embodiment of the present application, when the obtaining module 3601 performs, according to the constructed intimacy image, by using the graph convolutional network, feature extraction to obtain a corresponding second feature image, it is specifically configured to:

use at least one node in the intimacy image as a central node, and aggregating features of neighboring nodes of the central node to obtain an aggregated feature;

fuse the aggregated feature and the feature of the central node to obtain a first fused feature; and update the feature of the central node in the first feature image to the corresponding first fused feature to generate a second feature image.

When the obtaining module 3601 performs, for at least one first feature image, feature extraction to obtain a corresponding second feature image, it is specifically configured to:

divide the first feature image into at least two image blocks;

extract local features of each image block and global features between adjacent image blocks;

fuse the local features and the global features to obtain a second fused feature; and generate a second feature image based on the second fused feature.

When the obtaining module 3601 divides the first feature image into at least two image blocks, it is specifically configured to:

divide the first feature image into at least two image blocks, and determine the confidence of each image block, the confidence being used to represent the clarity of the image block; and continuously divide the image blocks with the confidence within a preset range until the confidence corresponding to any image block obtained by the division is outside the preset range.

When the obtaining module 3601 divides the first feature image into at least two image blocks, it is further configured to:

compare the size of the image block with a preset size; and based on the result of comparison, divide the image block based on the preset size.

Each of the at least two image blocks obtained by the division may include only blurred pixels or only clear pixels.

When the obtaining module 3601 extracts, by using a graph convolutional network, global features between adjacent image blocks, it is specifically configured to:

perform dimension reduction on the features of each image block; and extract, based on the features of each image block after the dimension reduction, by using a graph convolutional network, global features between adjacent image blocks.

In a possible implementation of the embodiment of the present application, when the obtaining module 3601 performs, for at least one first feature image, feature extraction to obtain a corresponding second feature image, it is specifically configured to:

determine a connection relationship between pixels on the first feature image, and generate an adjacent matrix corresponding to the first feature image based on the determined connection relationship; and determine a second feature image based on the adjacent matrix and the first feature image.

In a possible implementation of the embodiment of the present application, when the obtaining module 3601 determines a connection relationship between pixels on the first feature image and generates an adjacent matrix corresponding to the first feature image based on the determined connection relationship, it is specifically configured to:

perform channel dimension reduction on the first feature image to obtain a dimension-reduced feature image;

adjust the dimension-reduced feature image at different dimensions to obtain a fourth feature image and a fifth feature image, the fourth feature image and the fifth feature image being transposed matrices; and perform matrix multiplication on the fourth feature image and the fifth feature image to obtain the adjacent matrix.

In a possible implementation of the embodiment of the present application, when the obtaining module 3601 determines a second feature image based on the adjacent matrix and the first feature image, it is specifically configured to:

adjust the dimension of the first feature image to obtain a third feature image; and determine a second feature image based on the adjacent matrix and the third feature image.

In a possible implementation of the embodiment of the present application, when the obtaining module 3601 determines a second feature image based on the adjacent matrix and the third feature image, it is specifically configured to:

perform matrix multiplication on the adjacent matrix and the third feature image to obtain a sixth feature image;

concatenate the third feature image and the sixth feature image in a channel dimension to obtain a concatenated feature image; and generate the second feature image based on the concatenated feature image.

In a possible implementation of the embodiment of the present application, the image processing apparatus further includes a position determination module configured to:

determine the position of the blurred area in the image based on the classification mask image, if the blur detection result indicates that the image is a blurred image.

In a possible implementation of the embodiment of the present application, the image processing apparatus further includes a deblurring module configured to:

deblur the image to obtain a first recovery image;

extract clear pixels in clear areas in the image based on the classification mask image;

replace pixels corresponding to clear areas in the first recovery image with the clear pixels to obtain a second recovery image.

When the deblurring module deblurs the image to obtain a first recovery image, it is specifically configured to:

perform feature extraction on the image to obtain a first extracted feature; and perform recovery, by at least one recovery module and based on the first extracted feature, to obtain a first recovery image.

If there are at least two recovery modules, when the deblurring module performs recovery, by at least one recovery module, to obtain a first recovery image, it is specifically configured to:

perform recovery, by at least two cascaded recovery modules, to obtain a first recovery image.

When the deblurring module performs recovery by any recovery module, it is specifically configured to:

select a scale among preset scales based on an input feature of a recovery module;

based on the input feature, perform feature extraction according to the selected scale to obtain a corresponding scale feature; and determine and output a corresponding recovery feature based on the scale feature.

The deblurring module determines and outputs a corresponding recovery feature based on the scale feature, including:

selecting a channel among channels with the scale feature; and determining and outputting a corresponding recovery feature based on a channel feature corresponding to the selected channel.

When the deblurring module performs recovery by at least one recovery module to obtain a first recovery image, it is specifically configured to:

perform dimension raising on the recovery feature output by the last recovery module to obtain a first recovery image.

The deblurring module is further specifically configured to:

determine a similar matrix based on similarity between pixels in the first extracted feature;

determine a corresponding mask matrix based on clear pixels and blurred pixels in the classification mask image; and determine a mask feature based on the similar matrix and the mask matrix, and input the mask feature to a recovery module for recovery.

When the deblurring module determines a mask feature based on the similar matrix and the mask matrix, it is specifically configured to:

multiply the similar matrix and the mask matrix to obtain a mask-similar matrix; and multiply the mask-similar matrix and the first extracted feature to obtain the mask feature.

Any value in the mask matrix represents the relationship between a first pixel and a second pixel in the classification mask image, and the corresponding value in the mask matrix is 0 when the first pixel is a clear pixel and the second pixel is a blurred pixel.

In a possible implementation of the embodiment of the present application, when the deblurring module deblurs the image to obtain a first recovery image, it is specifically configured to:

obtain a twin image of the image;

perform feature extraction on the image and the twin image respectively based on a twin network to obtain a first extracted feature and a second extracted feature;

align the first extracted feature and the second extracted feature to obtain an aligned feature; and deblur based on the aligned feature to obtain the first recovery image.

In a possible implementation of the embodiment of the present application, when the deblurring module aligns the first extracted feature and the second extracted feature to obtain an aligned feature, it is specifically configured to:

set any one of the first extracted feature and the second extracted feature as a query feature and the other one as a key-value feature; and fuse the query feature into the key-value feature to obtain the aligned feature.

In a possible implementation of the embodiment of the present application, when the deblurring module fuses the query feature into the key-value feature to obtain the aligned feature, it is specifically configured to:

search for an approximate feature similar to the key-value feature from the query feature, and fuse the approximate feature and the key-value feature to obtain a fused feature; and replace the approximate feature in the query feature with the fused feature to obtain the aligned feature.

When the deblurring module performs feature extraction ob the image to obtain a first extracted feature, it is specifically configured to:

determine at least two feature blocks corresponding to the image;

represent the feature of each feature block by a one-dimensional vector to obtain a feature vector corresponding to each feature block;

perform feature extraction on a feature matrix consisting of at least two feature vectors to obtain an extracted vector feature; and perform feature reconstruction on the extracted vector feature to obtain a first extracted feature.

When the deblurring module performs feature extraction on a feature matrix consisting of a plurality of feature vectors to obtain an extracted vector feature, it is specifically configured to:

determine a vector-similar matrix based on the similarity between feature vectors in the feature matrix consisting of at least two feature vectors; and perform, based on the vector-similar matrix, fusion, feed-forward and normalization on the feature vectors to obtain the extracted vector feature.

In the image processing apparatus, by performing blur classification on pixels in the image to be processed to determine the pixels in the image as clear pixels or blurred images, generating a classification mask image according to the classification result of the pixels, and determining, based on the classification mask image, whether the image is a clear image or a blurred image, the classification is realized in the pixel level, and the accuracy of the blur detection result can be improved.

In the above embodiment, by firstly resizing or cropping the image, the processing speed of the image can be increased.

Further, features of different scales may be fused by at least one down-sampling, thereby improving the expression ability of features. In addition, by a multi-stage fusion method, the calculation amount of low-scale features is much less than the calculation amount of high-scale features. Thus, multi-scale features may be fused, and the calculation amount is lower.

Further, in the process of extracting second feature images by a graph convolutional network, by fusing the aggregated feature with the features of the central node, it can be ensured that the features of the central node have original information and are assimilated as few as possible, so that the accuracy of the blur detection result is improved.

Further, by using dilated convolution, the receptive field can be increased without performing down-sampling to lose detailed information, and the extracted features are richer Further, a global image structure is established for each pixel in the image according to the similarity between features by using the improved graph convolutional network proposed in the present application, and it is determined whether a certain pixel is a blurred pixel from a global perspective. The accuracy of identification can be improved by the feature similarity between pixels. Thus, the problem that the blurred area in the hole cannot be identified can be effectively solved, and the blurred boundary can be determined more accurately.

Furthermore, the image is firstly deblurred to obtain a first recovery image, and the final second recovery image is then obtained according to the first recovery image and the clear areas in the image. Alternatively, the blurred areas and clear areas in the image are separated, and only the blurred areas are deblurred. Thus, the blurred areas in the final recovery image become clear, and the originally clear areas also maintain the original clarity.

Figure 56:
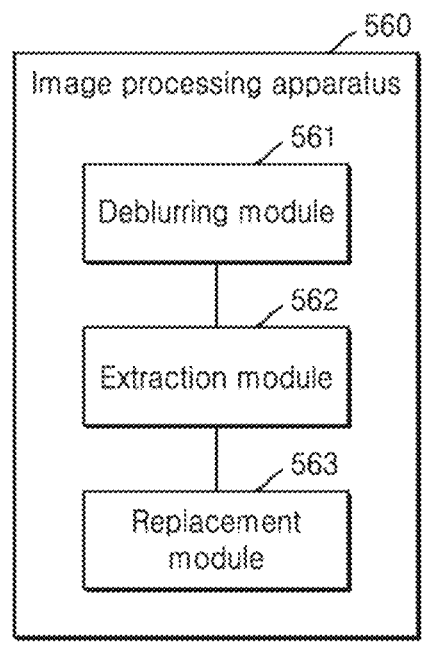
FIG. 56 is a schematic structure diagram of an image processing apparatus according to an embodiment of the present application.

An embodiment of the present application further provides an image processing apparatus 560, as shown in FIG. 56, including a deblurring module 561, an extraction module 562 and a replacement module 563.

The deblurring module 561 is configured to deblur an image to obtain a first recovery image; the extraction module 562 is configured to extract clear pixels in clear areas in the image; and, the replacement module 563 is configured to replace pixels corresponding to clear areas in the first recovery image with the clear pixels to obtain a second recovery image.

When the deblurring module 561 deblurs the image to obtain a first recovery image, it is specifically configured to:

perform feature extraction on the image to obtain a first extracted feature; and perform recovery, by at least one recovery module and based on the first extracted feature, to obtain a first recovery image.

If there are at least two recovery modules, when the deblurring module 561 performs recovery, by at least one recovery module, to obtain a first recovery image, it is specifically configured to:

perform recovery, by at least two cascaded recovery modules, to obtain a first recovery image.

When the deblurring module 561 performs recovery by any recovery module, it is specifically configured to:

select a scale among preset scales based on an input feature of a recovery module;

based on the input feature, perform feature extraction according to the selected scale to obtain a corresponding scale feature; and determine and output a corresponding recovery feature based on the scale feature.

When the deblurring module 561 determines and outputs a corresponding recovery feature based on the scale feature, it is specifically configured to:

select a channel among channels with the scale feature; and determine and output a corresponding recovery feature based on a channel feature corresponding to the selected channel.

When the deblurring module 561 performs recovery by at least one recovery module to obtain a first recovery image, it is specifically configured to:

perform dimension raising on the recovery feature output by the last recovery module to obtain a first recovery image.

The image processing apparatus provided in the embodiments of the present disclosure can execute the image processing method provided in the embodiments of the present disclosure, and the implementation principles thereof are similar. The acts executed by the modules in the image processing apparatus provided in the embodiments of the present disclosure correspond to the steps in the image processing method provided in the embodiments of the present disclosure. The detailed functional description of the modules in the image processing apparatus can refer to the description of the corresponding image processing method described above and will not be repeated here.

For the apparatuses provided in the embodiments of the present application, at least one of the plurality of modules can be realized by an artificial intelligence (AI) model. The functions associated with AI can be executed by a non-volatile memory, a volatile memory and a processor.

The processor may include one or more processors. In this case, the one or more processor may be a general-purpose processor (e.g., a CPU, an application processor (AP), etc.), or a pure graphics processing unit (e.g., a graphics processing unit (GPU), a visual processing unit (VPU)), and/or an AI specific processor (e.g., a neural processing unit (NPU)).

The one or more processors control the processing of the input data according to the predefined operation rule or AI model stored in the non-volatile memory and the volatile memory. The predefined operation rule or AI model is provided by training or learning.

Here, providing by learning means that the predefined operation rule or AI model with desired features is obtained by applying a learning algorithm to multiple pieces of learning data. The learning may be executed in the device in which the AI according to the embodiments is executed, and/or may be implemented by a separate server/system.

The AI model may consist of a plurality of neural network layers. Each layer has a plurality of weights, and the calculation in one layer is executed by using the result of calculation in the previous layer and the plurality of weights of the current layer. Examples of the neural network include, but not limited to: convolutional neural networks (CNNs), deep neural networks (DNNs), cyclic neural networks (RNNs), restricted Boltzmann machines (RBMs), deep belief networks (DBNs), bidirectional cyclic deep neural networks (BRDNNs), generative confrontation networks (GANs) and deep Q networks.

The learning algorithm is a method of training a predetermined target apparatus (e.g., a robot) by using multiple pieces of learning data to enable, allow or control the target apparatus to determine or predict. Examples of the learning algorithm include, but not limited to: supervised learning, semi-supervised learning or reinforced learning.

The image processing apparatus provided in the embodiments of the present application have been described from the perspective of functional modularization. Next, the electronic device provided in the embodiments of the present application will be described from the perspective of hardware materialization, and the computing system of the electronic device will also be described.

Based on the same principles as the methods shown in the embodiments of the present disclosure, an embodiment of the present disclosure further provides an electronic device. This electronic device may include, but not limited to: a processor and a memory, wherein the memory is configured to store computer operated instructions, and the processor is configured to execute the image processing method shown in the embodiments by calling the computer operated instructions. Compared with the prior art, the image processing method in the present application can improve the accuracy of the blur detection result.

Figure 57:
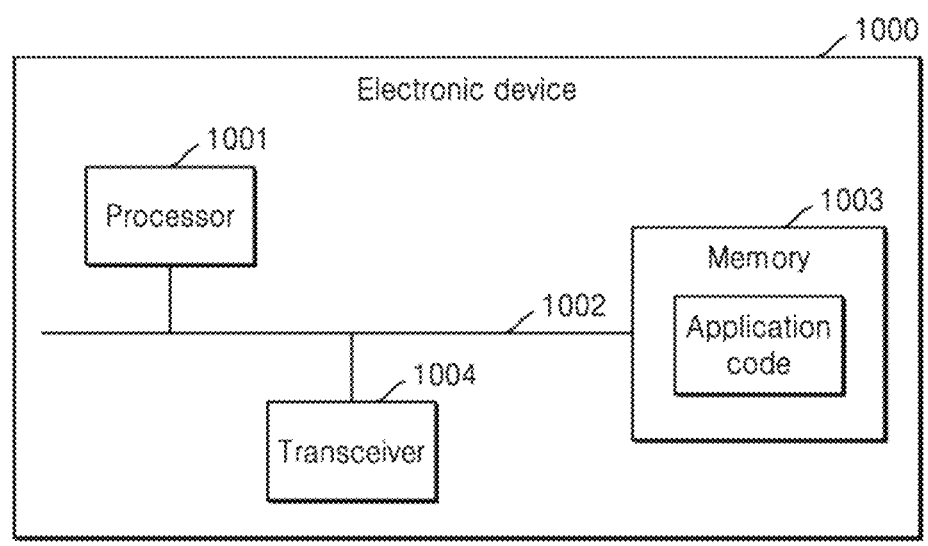
FIG. 57 is a schematic structure diagram of an electronic device according to an embodiment of the present application.

In an embodiment, an electronic device is provided, as shown in FIG. 57. The electronic device 1000 shown in FIG. 57 includes a processor 1001 and a memory 1003. The processor 1001 is connected to the memory 1003, for example, via a bus 1002. The electronic device 1000 may further include a transceiver 1004. It is to be noted that, in practical applications, the number of the transceiver 1004 is not limited to 1, and the structure of the electronic device 1000 also does not constitute any limitations to the embodiments of the present application.

The processor 1001 may be a central processing unit (CPU), a general-purpose processor, a digital signal processor (DSP), an application specific integrated circuit (ASIC), a field programmable gate array (FPGA) or other programmable logic devices, a transistor logic device, a hardware component or any combination thereof. The processor may be implemented with various exemplary logic blocks, modules and circuits described in the contents of the present application. The processor 1001 can also be a combination of one or more microprocessors, a combination of DSPs and microprocessors, etc.

The bus 1002 may include a passageway for transferring information between the above components. The bus 1002 may be a peripheral component interconnect (PCI) bus, an extended industry standard architecture (EISA) bus, etc. The bus 1002 may be classified into an address bus, a data bus, a control bus or the like. For ease of representation, the bus is represented by only one bold line in FIG. 57, but it does not mean that there is only one bus or one type of buses.

The memory 1003 may be, but not limited to, a read only memory (ROM) or other types of static storage devices capable of storing static information and instructions, a random access memory (RAM) or other types of dynamic storage devices capable of storing information and instructions, or an electrically erasable programmable read only memory (EEPROM), compact disc read only memory (CD-ROM) or other optical disk storages, optical disc storages (including compact disc, laser disc, optical disc, digital versatile optical disc, Blu-ray disc, etc.), magnetic disk storage media or other magnetic storage devices, or any other media that may be used to carry or store desired program codes in form of instructions or data structures and may be accessed by a computer.

The memory 1003 is configured to store application codes for executing the solutions in the present application and is controlled by the processor 1001. The processor 1001 is configured to execute the application codes stored in the memory 1003 to implement the contents in the above method embodiments.

The electronic device includes, but not limited to: mobile terminals, such as mobile phones, notebook computers, digital broadcast receivers, PDAs, PADs, PMPs, vehicle-mounted terminals (e.g., vehicle-mounted navigation terminals); and, fixed terminals, such as digital TVs and desktop computers. The electronic device shown in FIG. 57 is merely an example, an should not constitute any limitations to the functions and application range of the embodiments of the present disclosure.

An embodiment of the present application provides a computer-readable storage medium, wherein the computer-readable storage medium is stored with computer programs that, when run on a computer, enable the computer to execute the corresponding contents in the above method embodiments. Compared with the prior art, the image processing method in the present application can improve the accuracy of the blur detection result.

It should be understood that, although the steps in the flowcharts in the accompanying drawings are described successively in an order indicated by the arrows, those steps may not be successively executed in the order indicated by the arrows. Unless otherwise stated, the execution of those steps is not limited to a specific order and they may be executed in other orders. Moreover, at least some of the steps in the flowcharts shown in the drawings may include multiple sub-steps or multiple stages. These sub-steps or stages are not necessarily performed at the same moment of time, and instead, may be performed at different moments of time. The sub-steps or stages are not necessarily performed sequentially, and instead, may be performed in turn or alternately with other steps or at least some of the sub-steps or stages of other steps.

It is to be noted that, the computer-readable medium described in the present disclosure may be a computer-readable signal medium, a computer-readable storage medium or any combination of the both. For example, the computer-readable storage medium may be, but not be limited to: electrical, magnetic, optical, electromagnetic, infrared or semiconductor systems, apparatuses or devices, or a combination thereof. A more specific example of the computer-readable storage medium may include, but not limited to: electric connections having one or more leads, portable computer disks, hard disks, RAMs, ROMs, EPROMs or flash memories, optical fiber, portable CD-ROMs, optical storage devices, magnetic storage devices or any suitable combination thereof. In the present disclosure, the computer-readable storage medium may be any tangible medium containing or stored with programs. The programs may be used by an instruction execution system, apparatus or device or used with the instruction execution system, apparatus or device. In the present disclosure, the computer-readable signal medium may include data signals propagated in basebands or as part of carriers, in which computer-readable program codes are carried. The propagated data signals may be in various forms, including but not limited to electromagnetic signals, optical signals or any suitable combination thereof. The computer-readable signal medium may also be any computer-readable medium except for computer-readable storage mediums. The computer-readable signal medium may send, propagate or transmit programs for use by an instruction execution system, apparatus or device or for use with the instruction execution system, apparatus or device. The program codes contained in the computer-readable medium may be transmitted by any suitable medium, including but not limited to: wires, optical cables, RF, or any suitable combination thereof.

The computer-readable medium may be included in the electronic device, or may exist alone without being assembled into the electronic device.

The computer-readable medium carries one or more programs that, when executed by the electronic device, cause the electronic device to execute the methods described in the above embodiments.

The computer program codes for executing the operations in the present disclosure may be written in one or more programming languages or combinations thereof, including object-oriented programming languages such as Java, Smalltalk or C++, and conventional procedural programming languages such as "C" language or similar programming languages. The program codes may be executed entirely on the user's computer, partly on the user's computer, as a stand-alone software package, partly on the user's computer and partly on a remote computer, or entirely on a remote computer or server. In a scenario involving the remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate the architecture, functionality and operation of possible implementations of systems, methods and computer program products according to various embodiments of the present disclosure. In this regard, each block in the flowcharts or block diagrams may represent a module, a program segment or a part of a code, which includes one or more executable instructions for implementing the specified logical function. It is to be noted that, in some alternative implementations, the functions marked in the blocks may occur in an order different from that marked in the drawings. For example, two successive blocks may actually be executed substantially concurrently, or may sometimes be executed in a reverse order, depending upon the functions involved. It will also be noted that each block of the block diagrams and/or flowchart illustration, and combinations of blocks in the block diagrams and/or flowchart illustration, may be implemented by special purpose hardware-based systems that perform the specified functions or operations, or combinations of special purpose hardware and computer instructions.

The modules involved in the embodiments of the present disclosure may be implemented by software or hardware. The name of the module does not define the module itself in some cases. For example, the obtaining module may also be described as "a module for obtaining a classification mask image".

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing method, comprising:
 performing blur classification on pixels of an image by:
  applying an adaptive portioning method, in which the image is divided into image blocks and any image block with a confidence score within a predetermined confidence range is recursively subdivided into smaller image blocks immediately before further image portioning causes the confidence score of any image block to fall outside the present conference range, and
  processing the image blocks, which has varying sizes as a result of the adaptive portioning method, using a graph convolutional network;
 determining a blurred area and a clear area in the image based on the blur classification;
 determining a mask matrix from a classification mask image that is obtained as a result of the blur classification;
 obtaining a masked similarity matrix by applying the mask matrix that indicates clear pixels in the clear area as active elements to be considered and blurred pixels in the blurred area to be ignored, to a similarity matrix that indicate similarity values between the blurred pixels and the clear pixels, wherein the mask matrix, a positive relationship of the clear pixels to the blurred pixels is indicated to enhance the blurred pixels using the clear pixels, and a negative relationship of the blurred pixels to the clear pixels is indicated to prevent the blurred pixels from damaging the clear pixels; and
 deblurring the image based on the masked similarity matrix.

2. The method according to claim 1, wherein the performing the blur classification comprises:
 performing feature extraction on the image via a plurality of cascaded first feature extraction layers of a feature extraction neural network to obtain at least one first feature image;
 performing feature extraction on the at least one first feature image via a second feature extraction layer of the feature extraction neural network, based on a relationship between different pixels in the first feature image, to obtain a second feature image; and
 generating the classification mask image based on the second feature image.

3. The method according to claim 2, wherein the performing the feature extraction on the at least one first feature image comprises:
dividing the at least one first feature image into the image blocks;
extracting, by the graph convolutional network, local features of each of the image blocks and global features between adjacent image blocks;
fusing the local features and the global features to obtain a second fused feature; and
generating the second feature image based on the second fused feature.

4. The method according to claim 3, wherein at least one of the image blocks obtained at a first partitioning step of the adaptive portioning method comprises both blurred pixels and clear pixels, and none of the image blocks obtained after a last partitioning step of the adaptive portioning method comprises both blurred pixels and clear pixels.

5. The method according to claim 3, wherein the extracting the global features comprises:
performing dimension reduction on each of the image blocks to obtain dimension reduced image blocks; and
extracting from the dimension reduced image blocks the global features between the adjacent image blocks.

6. The method according to claim 1, wherein the deblurring the image comprises:
obtaining a first recovery image based on a determination of the blurred area of the image;
extracting the clear pixels in clear areas in the image based on the classification mask image that is obtained as a result of the blur classification; and
replacing pixels corresponding to clear areas in the first recovery image with the clear pixels to obtain a second recovery image.

7. The method according to claim 6, wherein the deblurring the image further comprises:
performing feature extraction on the image to obtain a first extracted feature; and
performing recovery, by at least one recovery neural network and based on the first extracted feature, to obtain the first recovery image.

8. The method according to claim 7, wherein the performing the recovery comprises:
selecting a scale from a plurality of preset scales based on an input feature of the at least one recovery neural network;
based on the input feature, performing the feature extraction according to the selected scale to obtain a scale feature; and
determining and outputting a recovery feature based on the scale feature.

9. The method according to claim 8, wherein the determining and outputting the recovery feature comprises:
selecting a channel from a plurality of channels based on the scale feature; and
determining and outputting the recovery feature based on a channel feature corresponding to the selected channel.

10. The method according to claim 7, wherein the performing the recovery comprises:
performing dimension raising on a recovery feature output from the least one recovery neural network to obtain the first recovery image.

11. The method according to claim 1,
wherein a value in the mask matrix represents a relationship between a first pixel and a second pixel in the classification mask image, the value in the mask matrix is 0 when the first pixel is a clear pixel and the second pixel is a blurred pixel, and the value in the mask matrix is 1 when the first pixel is the blurred pixel and the second pixel is the clear pixel.

12. The method according to claim 6, wherein the deblurring the image further comprises:
obtaining a twin image of the image;
performing feature extraction on the image and the twin image based on a twin network to obtain a first extracted feature and a second extracted feature;
aligning the first extracted feature and the second extracted feature to obtain an aligned feature; and
deblurring the image based on the aligned feature to obtain the first recovery image.

13. The method according to claim 12, wherein the aligning the first extracted feature and the second extracted feature comprises:
setting any one of the first extracted feature and the second extracted feature as a query feature and the other one as a key-value feature; and
fusing the query feature into the key-value feature to obtain the aligned feature.

14. An image processing apparatus, comprising:
a memory storing one or more instructions; and
at least one processor configured to execute the one or more instructions to:
perform blur classification on pixels of an image by:
applying an adaptive portioning method, in which the image is divided into image blocks and any image block with a confidence score within a predetermined confidence range is recursively subdivided into smaller image blocks immediately before further image portioning causes the confidence score of any image block to fall outside the present conference range, and
processing the image blocks, which has varying sizes as a result of the adaptive portioning method, using a graph convolutional network;
determine a blurred area and a clear area in the image based on the blur classification;
obtain a masked similarity matrix by applying a mask matrix that indicates clear pixels in the clear area as active elements to be considered and blurred pixels in the blurred area to be ignored, to a similarity matrix that indicate similarity values between the blurred pixels and the clear pixels, wherein the mask matrix, a positive relationship of the clear pixels to the blurred pixels is indicated to enhance the blurred pixels using the clear pixels, and a negative relationship of the blurred pixels to the clear pixels is indicated to prevent the blurred pixels from damaging the clear pixels; and
deblur the image based on the masked similarity matrix.

15. The image processing apparatus according to claim 14, the at least one processor further configured to execute the one or more instructions to:
perform feature extraction on the image via a plurality of cascaded first feature extraction layers of a feature extraction neural network to obtain at least one first feature image;
perform feature extraction on the at least one first feature image via a second feature extraction layer of the feature extraction neural network, based on a relationship between different pixels in the first feature image, to obtain a second feature image; and generate a classification mask image based on the second feature image.

16. A non-transitory computer-readable storage medium storing a program that is executable by at least one processor to perform an image processing method comprising:
  performing blur classification on pixels of an image by:
    applying an adaptive portioning method, in which the image is divided into image blocks and any image block with a confidence score within a predetermined confidence range is recursively subdivided into smaller image blocks immediately before further image portioning causes the confidence score of any image block to fall outside the present conference range, and
    processing the image blocks, which has varying sizes as a result of the adaptive portioning method, using a graph convolutional network;
  determining a blurred area and a clear area in the image based on the blur classification;
  obtaining a masked similarity matrix by applying a mask matrix that indicates clear pixels in the clear area as active elements to be considered and the blurred pixels in the blurred area to be ignored, to a similarity matrix that indicate similarity values between the blurred pixels and the clear pixels, wherein the mask matrix, a positive relationship of the clear pixels to the blurred pixels is indicated to enhance the blurred pixels using the clear pixels, and a negative relationship of the blurred pixels to the clear pixels is indicated to prevent the blurred pixels from damaging the clear pixels; and
  deblurring the image based on the masked similarity matrix.

* * * * *